US010459450B2

(12) United States Patent
Sibley

(10) Patent No.: US 10,459,450 B2
(45) Date of Patent: Oct. 29, 2019

(54) ROBOT DELIVERY SYSTEM

(71) Applicant: ZIPPY INC., Santa Clara, CA (US)

(72) Inventor: Gabriel T Sibley, Menlo Park, CA (US)

(73) Assignee: Autonomy Squared LLC, Menlo Park, CA (US)

(*) Notice: Subject to any disclaimer, the term of this patent is extended or adjusted under 35 U.S.C. 154(b) by 0 days.

(21) Appl. No.: 15/707,468

(22) Filed: Sep. 18, 2017

(65) Prior Publication Data

US 2018/0327184 A1    Nov. 15, 2018

Related U.S. Application Data

(60) Provisional application No. 62/505,801, filed on May 12, 2017, provisional application No. 62/534,674, (Continued)

(51) Int. Cl.
*G05D 1/02* (2006.01)
*B66F 9/075* (2006.01)
(Continued)

(52) U.S. Cl.
CPC ............ *G05D 1/0225* (2013.01); *B25J 5/007* (2013.01); *B25J 9/1694* (2013.01); *B60P 1/04* (2013.01);
(Continued)

(58) Field of Classification Search
CPC .......... B65G 1/04; B23Q 7/10; B23Q 7/1442; B66F 9/063; B66F 9/0755;
(Continued)

(56) References Cited

U.S. PATENT DOCUMENTS 2,035,218 A    3/1936 Bloom
3,253,806 A    5/1966 Eickmann
(Continued)

FOREIGN PATENT DOCUMENTS

CN    205507865 U    8/2016
CN    106428263 A    2/2017
(Continued)

OTHER PUBLICATIONS

"A social influence model of consumer participation in network- and small-group-based virtual communities", International Journal of Research in Marketing, 2004 by Utpal M, Dholakia et al. (pp. 23) http://www-bcf.usc.edu/-douglast/620/bettina1.pdf.
(Continued)

*Primary Examiner* — Saul Rodriguez
*Assistant Examiner* — Ashley K Romano
(74) *Attorney, Agent, or Firm* — Intellectual Innovations Legal Advisors

(57) ABSTRACT

A system for delivering an article from a first location to a second location with a robot having a closeable transport container for housing the article during transport. A closeable recipient container is provided at the second location for receiving the article. At least one computer configured to navigate the robot over an outdoor transportation network between locations is provided. The robot has a robot article transport mechanism controlled by the at least one computer for removing the article from the transport container and the recipient container has a recipient article transport mechanism for moving the article inside the recipient container.

23 Claims, 36 Drawing Sheets

Related U.S. Application Data filed on Jul. 19, 2017, provisional application No. 62/555,970, filed on Sep. 8, 2017.

(51) Int. Cl.

| | | |
|---|---|---|
| *B66F 9/06* | (2006.01) | |
| *B25J 5/00* | (2006.01) | |
| *B60P 3/00* | (2006.01) | |
| *B60P 1/04* | (2006.01) | |
| *B25J 9/16* | (2006.01) | |
| *H04W 4/02* | (2018.01) | |
| *G05B 19/418* | (2006.01) | |
| *G06Q 10/08* | (2012.01) | |
| *G07B 17/00* | (2006.01) | |
| *G07C 9/00* | (2006.01) | |

(52) U.S. Cl.
CPC .............. *B60P 3/007* (2013.01); *B66F 9/063* (2013.01); *B66F 9/0755* (2013.01); *G06Q 10/0832* (2013.01); *G06Q 10/0833* (2013.01); *G06Q 10/08355* (2013.01); *G07B 17/00* (2013.01); *H04W 4/02* (2013.01); *G05B 19/41895* (2013.01); *G06Q 10/0837* (2013.01); *G07C 2009/0092* (2013.01)

(58) Field of Classification Search
CPC ........... G05B 19/41895; G05D 1/0229; G05D 1/0225; G06Q 10/0832; G06Q 10/0837; G06Q 10/0833; G06Q 10/08355; B25J 5/007; B25J 9/1694; B60P 1/04; B60P 3/007; H04W 4/02; G07C 2009/0092
See application file for complete search history.

(56) References Cited

U.S. PATENT DOCUMENTS

| | | | |
|---|---|---|---|
| 3,556,438 A | 1/1971 | Ludwig | |
| 3,762,669 A | 10/1973 | Curci | |
| 4,119,163 A | 10/1978 | Ball | |
| 4,127,856 A * | 11/1978 | Bickel | B65G 69/003 14/71.1 |
| 4,161,843 A | 7/1979 | Hui | |
| 4,375,354 A | 3/1983 | Henriksson | |
| 4,556,198 A | 12/1985 | Tominaga | |
| 4,698,775 A | 10/1987 | Koch et al. | |
| 4,779,203 A | 10/1988 | McClure et al. | |
| 4,914,605 A | 4/1990 | Loughmiller, Jr. et al. | |
| 4,996,468 A | 2/1991 | Field et al. | |
| 5,006,988 A | 4/1991 | Borenstein et al. | |
| 5,032,989 A | 7/1991 | Tornetta | |
| 5,050,844 A | 9/1991 | Hawk | |
| 5,199,686 A | 4/1993 | Fletcher | |
| 5,208,750 A | 5/1993 | Kurami et al. | |
| 5,211,523 A | 5/1993 | Andrada et al. | |
| 5,325,294 A | 6/1994 | Keene | |
| 5,372,211 A | 12/1994 | Wilcox et al. | |
| 5,521,817 A | 5/1996 | Burdoin et al. | |
| 5,540,296 A | 7/1996 | Strothmann | |
| 5,577,567 A | 11/1996 | Johnson et al. | |
| 5,581,630 A | 12/1996 | Bonneau, Jr. | |
| 5,584,025 A | 12/1996 | Keithley et al. | |
| 5,590,062 A | 12/1996 | Nagamitsu et al. | |
| 5,617,319 A | 4/1997 | Arakawa et al. | |
| 5,630,103 A | 5/1997 | Smith et al. | |
| 5,671,342 A | 9/1997 | Millier et al. | |
| 5,720,363 A | 2/1998 | Kipp | |
| 5,751,245 A | 5/1998 | Janky et al. | |
| 5,774,133 A | 6/1998 | Neave et al. | |
| 5,794,207 A | 8/1998 | Walker et al. | |
| 5,805,810 A | 9/1998 | Maxwell | |
| 5,819,269 A | 10/1998 | Uomini | |
| 5,826,244 A | 10/1998 | Huberman | |
| 5,831,664 A | 11/1998 | Wharton et al. | |
| 5,835,896 A | 11/1998 | Fisher et al. | |
| 5,852,810 A | 12/1998 | Sotiroff et al. | |
| 5,904,214 A | 5/1999 | Lin | |
| 5,905,499 A | 5/1999 | McDowall et al. | |
| 5,907,322 A | 5/1999 | Kelly et al. | |
| 5,926,765 A | 7/1999 | Sasaki | |
| 5,930,474 A | 7/1999 | Dunworth et al. | |
| 5,931,262 A | 8/1999 | Greenlaw et al. | |
| 5,937,413 A | 8/1999 | Hyun et al. | |
| 5,940,806 A | 8/1999 | Danial | |
| 5,991,737 A | 11/1999 | Chen | |
| 6,010,239 A | 1/2000 | Hardgrave et al. | |
| 6,024,288 A | 2/2000 | Gottlich et al. | |
| 6,029,141 A | 2/2000 | Bezos et al. | |
| 6,029,195 A | 2/2000 | Herz | |
| 6,034,618 A | 3/2000 | Tatebayashi et al. | |
| 6,036,601 A | 3/2000 | Heckel | |
| 6,047,194 A | 4/2000 | Andersson | |
| 6,047,236 A | 4/2000 | Hancock et al. | |
| 6,049,778 A | 4/2000 | Walker et al. | |
| 6,059,263 A | 5/2000 | Otema et al. | |
| 6,073,138 A | 6/2000 | De L'etraz et al. | |
| 6,078,906 A | 6/2000 | Huberman | |
| 6,088,702 A | 7/2000 | Plantz et al. | |
| 6,092,076 A | 7/2000 | McDonough et al. | |
| 6,092,105 A | 7/2000 | Goldman | |
| 6,101,484 A | 8/2000 | Halbert et al. | |
| 6,108,639 A | 8/2000 | Walker et al. | |
| 6,122,592 A | 9/2000 | Arakawa et al. | |
| 6,134,486 A | 10/2000 | Kanayama | |
| 6,148,260 A | 11/2000 | Musk et al. | |
| 6,148,289 A | 11/2000 | Virdy | |
| 6,175,831 B1 | 1/2001 | Weinreich et al. | |
| 6,199,076 B1 | 3/2001 | Logan et al. | |
| 6,199,722 B1 | 3/2001 | Ohgi | |
| 6,229,533 B1 | 5/2001 | Farmer et al. | |
| 6,236,990 B1 | 5/2001 | Geller et al. | |
| 6,269,369 B1 | 7/2001 | Robertson | |
| 6,300,873 B1 | 10/2001 | Kucharczyk et al. | |
| 6,308,177 B1 | 10/2001 | Israni et al. | |
| 6,317,718 B1 | 11/2001 | Fano | |
| 6,328,525 B1 | 12/2001 | Greenlaw et al. | |
| 6,336,111 B1 | 1/2002 | Ashby et al. | |
| 6,339,745 B1 | 1/2002 | Novik | |
| 6,356,834 B2 | 3/2002 | Hancock et al. | |
| 6,381,537 B1 | 4/2002 | Chenault et al. | |
| 6,401,085 B1 | 6/2002 | Gershman et al. | |
| 6,405,123 B1 | 6/2002 | Rennard et al. | |
| 6,408,243 B1 | 6/2002 | Yofu | |
| 6,408,307 B1 | 6/2002 | Semple et al. | |
| 6,445,983 B1 | 9/2002 | Dickson et al. | |
| 6,453,339 B1 | 9/2002 | Schultz et al. | |
| 6,470,268 B1 | 10/2002 | Ashcraft et al. | |
| 6,474,912 B1 | 11/2002 | Meeks | |
| 6,480,885 B1 | 11/2002 | Olivier | |
| 6,487,583 B1 | 11/2002 | Harvey et al. | |
| 6,498,982 B2 | 12/2002 | Bellesfield et al. | |
| 6,505,093 B1 | 1/2003 | Thatcher et al. | |
| 6,507,776 B1 | 1/2003 | Fox, III | |
| 6,513,069 B1 | 1/2003 | Abato et al. | |
| 6,519,629 B2 | 2/2003 | Harvey et al. | |
| 6,532,007 B1 | 3/2003 | Matsuda | |
| 6,542,813 B1 | 4/2003 | Kovacs | |
| 6,542,817 B2 | 4/2003 | Miyaki | |
| 6,542,936 B1 | 4/2003 | Mayle et al. | |
| 6,553,313 B1 | 4/2003 | Froeberg | |
| 6,557,013 B1 | 4/2003 | Ziff et al. | |
| 6,587,787 B1 | 7/2003 | Yokota | |
| 6,597,983 B2 | 7/2003 | Hancock | |
| 6,600,418 B2 | 7/2003 | Francis et al. | |
| 6,611,751 B2 | 8/2003 | Warren | |
| 6,615,039 B1 | 9/2003 | Eldering | |
| 6,622,085 B1 | 9/2003 | Amita et al. | |
| 6,622,086 B2 | 9/2003 | Polidi | |
| 6,629,136 B1 | 9/2003 | Naidoo | |
| 6,633,311 B1 | 10/2003 | Douvikas et al. | |
| 6,636,803 B1 | 10/2003 | Hartz, Jr. et al. | |
| 6,640,187 B1 | 10/2003 | Chenault et al. | |
| 6,643,663 B1 | 11/2003 | Dabney et al. | |

(56) References Cited

U.S. PATENT DOCUMENTS

| | | |
|---|---|---|
| 6,646,568 B2 | 11/2003 | MacPhail et al. |
| 6,647,383 B1 | 11/2003 | August et al. |
| 6,654,800 B1 | 11/2003 | Rieger, III |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,684,196 B1 | 1/2004 | Mini et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,802,143 B1 | 10/2004 | Rachowitz et al. |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,853,875 B1 | 2/2005 | Moritz et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,892,195 B2 | 5/2005 | Lee et al. |
| 6,907,405 B2 | 6/2005 | Brett |
| 6,918,576 B2 | 7/2005 | Finkbeiner et al. |
| 6,926,233 B1 | 8/2005 | Corcoran, III |
| 6,931,419 B1 | 8/2005 | Lindquist |
| 6,950,722 B2 | 9/2005 | Mountz |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,047,888 B2 | 5/2006 | Richards |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,076,409 B2 | 7/2006 | Agrawala et al. |
| 7,076,741 B2 | 7/2006 | Miyaki |
| 7,079,943 B2 | 7/2006 | Flann et al. |
| 7,080,019 B2 | 7/2006 | Hurzeler |
| 7,080,096 B1 | 7/2006 | Imamura |
| 7,085,650 B2 | 8/2006 | Anderson |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger et al. |
| 7,155,336 B2 | 12/2006 | Dorfman et al. |
| 7,158,878 B2 | 1/2007 | Rasmussen et al. |
| 7,158,941 B1 | 1/2007 | Thompson |
| 7,162,330 B2 | 1/2007 | Mayer |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,197,376 B2 | 3/2007 | Berdelle-Hilge |
| 7,209,803 B2 | 4/2007 | Okamoto et al. |
| 7,218,993 B2 | 5/2007 | Yasukawa et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders et al. |
| 7,251,647 B2 | 7/2007 | Hoblit |
| 7,254,559 B2 | 8/2007 | Florance et al. |
| 7,269,590 B2 | 9/2007 | Hull et al. |
| 7,287,349 B1 | 10/2007 | MacDonald et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,330,826 B1 | 2/2008 | Porat et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | Distefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos et al. |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,539,557 B2 | 5/2009 | Yamauchi |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,609,156 B2 | 10/2009 | Mullen |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,698,029 B2 | 4/2010 | Atmur et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,751,971 B2 | 7/2010 | Chang et al. |
| 7,761,789 B2 | 7/2010 | Erol et al. |
| 7,792,815 B2 | 9/2010 | Aravamudan et al. |

(56) References Cited

U.S. PATENT DOCUMENTS

| | | |
|---|---|---|
| 7,797,256 B2 | 9/2010 | Zuckerberg et al. |
| 7,797,267 B2 | 9/2010 | Horvitz |
| 7,801,542 B1 | 9/2010 | Stewart |
| 7,802,290 B1 | 9/2010 | Bansal et al. |
| 7,805,388 B2 | 9/2010 | Weston et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,818,090 B2 | 10/2010 | Okamoto |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong et al. |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,912,633 B1 | 3/2011 | Dietsch et al. |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,505 B2 | 8/2011 | Lert, Jr. et al. |
| 7,991,703 B1 | 8/2011 | Watkins |
| 7,996,109 B2 | 8/2011 | Zini et al. |
| 7,996,270 B2 | 8/2011 | Sundaresan |
| 8,010,230 B2 | 8/2011 | Zini et al. |
| 8,027,943 B2 | 9/2011 | Juan et al. |
| 8,041,456 B1 | 10/2011 | Blackwell et al. |
| 8,046,269 B2 | 10/2011 | Lee et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,061,461 B2 | 11/2011 | Couture et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,107,879 B2 | 1/2012 | Pering et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,661 B1 | 3/2012 | Billman et al. |
| 8,145,703 B2 | 3/2012 | Frishert et al. |
| 8,149,113 B2 | 4/2012 | Diem |
| 8,152,092 B2 | 4/2012 | Zulkowski et al. |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,276,739 B2 | 10/2012 | Bastian et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,511 B2 | 10/2012 | Shroff et al. |
| 8,301,743 B2 | 10/2012 | Curran et al. |
| 8,306,833 B2 | 11/2012 | Hurpin |
| 8,315,389 B2 | 11/2012 | Qiu et al. |
| 8,326,091 B1 | 12/2012 | Jing et al. |
| 8,326,315 B2 | 12/2012 | Phillips et al. |
| 8,328,130 B2 | 12/2012 | Goossen |
| 8,352,183 B2 | 1/2013 | Thota et al. |
| 8,364,757 B2 | 1/2013 | Scott et al. |
| 8,370,003 B2 | 2/2013 | So et al. |
| 8,380,382 B2 | 2/2013 | Sung et al. |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski et al. |
| 8,412,675 B2 | 4/2013 | Alvarado et al. |
| 8,418,386 B1 | 4/2013 | Key et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker et al. |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste et al. |
| 8,504,284 B2 | 8/2013 | Brulle-Drews et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,565,912 B2 | 10/2013 | Wappling et al. |
| 8,577,517 B2 | 11/2013 | Phillips et al. |
| 8,584,091 B2 | 11/2013 | Champion et al. |
| 8,589,330 B2 | 11/2013 | Petersen et al. |
| 8,590,828 B2 | 11/2013 | Marcus |
| 8,594,715 B1 | 11/2013 | Stewart |
| 8,595,076 B2 | 11/2013 | Jean et al. |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,635,015 B2 | 1/2014 | Anderson |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |

(56) References Cited

U.S. PATENT DOCUMENTS

| | | |
|---|---|---|
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,194 B2 | 4/2014 | Waltz et al. |
| 8,694,605 B1 | 4/2014 | Burrell et al. |
| 8,695,919 B2 | 4/2014 | Shachor et al. |
| 8,706,297 B2 | 4/2014 | Letsky |
| 8,712,441 B2 | 4/2014 | Haney |
| 8,713,055 B2 | 4/2014 | Callahan et al. |
| 8,713,143 B2 | 4/2014 | Centola et al. |
| 8,718,814 B1 | 5/2014 | Clark et al. |
| 8,718,910 B2 | 5/2014 | Gueziec et al. |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,736,820 B2 | 5/2014 | Choe et al. |
| 8,738,545 B2 | 5/2014 | Abhyanker |
| 8,775,269 B2 | 7/2014 | Mesaros |
| 8,775,405 B2 | 7/2014 | Gross |
| D710,454 S | 8/2014 | Barajas et al. |
| 8,794,566 B2 | 8/2014 | Hutson |
| 8,798,784 B1 | 8/2014 | Clark et al. |
| 8,799,253 B2 | 8/2014 | Valliani et al. |
| 8,800,695 B2 | 8/2014 | Couture et al. |
| 8,812,147 B2 | 8/2014 | Keller et al. |
| 8,818,081 B1 | 8/2014 | Lookingbill et al. |
| 8,820,365 B2 | 9/2014 | Aguerre et al. |
| 8,825,226 B1 | 9/2014 | Worley, III et al. |
| 8,832,556 B2 | 9/2014 | Steinberg |
| 8,989,053 B1 | 3/2015 | Skaaksrud et al. |
| 9,044,543 B2 | 6/2015 | Levien et al. |
| 9,076,122 B2 | 7/2015 | Hoshino |
| 9,080,367 B2 * | 7/2015 | Orton ................ E05F 15/70 |
| 9,127,872 B1 | 9/2015 | Chainey |
| 9,146,557 B1 | 9/2015 | Ahmed et al. |
| 9,195,950 B2 | 11/2015 | Schenken |
| 9,244,147 B1 | 1/2016 | Soundararajan et al. |
| 9,256,852 B1 | 2/2016 | Myllymaki |
| 9,266,624 B2 | 2/2016 | Valenzuela et al. |
| 9,305,280 B1 | 4/2016 | Berg et al. |
| 9,457,970 B1 | 10/2016 | Zevenbergen et al. |
| 9,459,620 B1 | 10/2016 | Schaffalitzky |
| 9,489,655 B1 | 11/2016 | Lecky |
| 9,508,264 B2 | 11/2016 | Chan et al. |
| 9,524,648 B1 | 12/2016 | Gopalakrishnan et al. |
| 9,527,605 B1 | 12/2016 | Gentry et al. |
| 9,536,216 B1 | 1/2017 | Lisso |
| 9,540,121 B2 | 1/2017 | Byers et al. |
| 9,561,941 B1 | 2/2017 | Watts |
| 9,563,652 B2 | 2/2017 | Morimoto et al. |
| 9,567,081 B1 | 2/2017 | Beckman et al. |
| 9,567,168 B1 | 2/2017 | Tibbens et al. |
| 9,625,909 B2 | 4/2017 | Hu et al. |
| 9,645,581 B1 | 5/2017 | Yang et al. |
| 9,688,489 B1 | 6/2017 | Zevenbergen et al. |
| 9,778,656 B2 | 10/2017 | Waltz et al. |
| 9,786,187 B1 | 10/2017 | Bar-Zeev et al. |
| 9,811,796 B2 | 11/2017 | Ogilvie et al. |
| 9,862,543 B2 | 1/2018 | Toebes et al. |
| 9,914,452 B1 | 3/2018 | Ferguson et al. |
| 9,916,558 B2 | 3/2018 | Wiechers |
| 9,946,265 B2 | 4/2018 | Sullivan et al. |
| 9,952,589 B1 | 4/2018 | Brazeau |
| 10,028,606 B1 | 7/2018 | Ritchie |
| 10,245,993 B1 | 4/2019 | Brady et al. |
| 2001/0005829 A1 | 6/2001 | Raveis |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0034631 A1 | 10/2001 | Kiselik |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0052688 A1 | 5/2002 | Yofu |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0065762 A1 | 5/2002 | Lee et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger et al. |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0130967 A1 | 9/2002 | Sweetser |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0033176 A1 | 2/2003 | Hancock |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0079129 A1 | 4/2003 | Lindsay |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0216835 A1 | 11/2003 | Wakui |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |

(56) References Cited

U.S. PATENT DOCUMENTS

| | | |
|---|---|---|
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0035315 A1 | 2/2004 | Richards |
| 2004/0039581 A1 | 2/2004 | Wheeler |
| 2004/0049960 A1 | 3/2004 | Percy |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0164847 A1 | 8/2004 | Hale |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0182614 A1 | 9/2004 | Wakui |
| 2004/0186766 A1 | 9/2004 | Fellenstein et al. |
| 2004/0205016 A1 | 10/2004 | Lin et al. |
| 2004/0210661 A1 | 10/2004 | Thompson |
| 2004/0211834 A1 | 10/2004 | Fleckenstein et al. |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0006525 A1 | 1/2005 | Byers et al. |
| 2005/0012598 A1 | 1/2005 | Berquist |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0024189 A1 | 2/2005 | Weber |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0113990 A1 | 5/2005 | Peless et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131645 A1 | 6/2005 | Panopoulos |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0238465 A1 | 10/2005 | Razumov |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0011721 A1 | 1/2006 | Olsen, III |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0053534 A1 | 3/2006 | Mullen |
| 2006/0058921 A1 | 3/2006 | Okamoto |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell, Jr. |
| 2006/0125616 A1 | 6/2006 | Song |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |

(56) References Cited

U.S. PATENT DOCUMENTS

| | | |
|---|---|---|
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184482 A1 | 8/2006 | Flinn et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293843 A1 | 12/2006 | Morita et al. |
| 2006/0293892 A1 | 12/2006 | Pathuel |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0073436 A1 | 3/2007 | Sham |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo, Jr. |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0129849 A1 | 6/2007 | Zini et al. |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0160449 A1* | 7/2007 | Girn ..................... B65G 67/02 414/390 |
| 2007/0162432 A1 | 7/2007 | Armstrong et al. |
| 2007/0162458 A1 | 7/2007 | Fasciano et al. |
| 2007/0162547 A1 | 7/2007 | Ross |
| 2007/0162942 A1 | 7/2007 | Hamynen |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1 | 10/2007 | Abhyanker |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer et al. |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0004995 A1 | 1/2008 | Klingenberg et al. |
| 2008/0005076 A1 | 1/2008 | Payne et al. |
| 2008/0005231 A1 | 1/2008 | Kelley et al. |
| 2008/0009984 A1 | 1/2008 | Lee et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese et al. |
| 2008/0039974 A1 | 2/2008 | Sandin et al. |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg et al. |
| 2008/0048065 A1 | 2/2008 | Kuntz |

(56) References Cited

U.S. PATENT DOCUMENTS

| | | |
|---|---|---|
| 2008/0051932 A1 | 2/2008 | Jermyn et al. |
| 2008/0059992 A1 | 3/2008 | Amidon et al. |
| 2008/0065321 A1 | 3/2008 | Dacosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109246 A1 | 5/2008 | Russell |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington et al. |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1 | 10/2008 | Zavoli |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0252417 A1 | 10/2008 | Thomas et al. |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269960 A1 | 10/2008 | Kostmann |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani et al. |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043440 A1 | 2/2009 | Matsukawa et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0108017 A1 | 4/2009 | Schifman et al. |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2009/0299551 A1 | 12/2009 | So et al. |
| 2009/0313095 A1 | 12/2009 | Hurpin |
| 2010/0011081 A1 | 1/2010 | Crowley et al. |
| 2010/0012769 A1 | 1/2010 | Alber et al. |
| 2010/0023388 A1 | 1/2010 | Blumberg et al. |
| 2010/0024045 A1 | 1/2010 | Sastry et al. |
| 2010/0049391 A1 | 2/2010 | Nakano |
| 2010/0051740 A1 | 3/2010 | Yoeli |
| 2010/0057341 A1 | 3/2010 | Bradburn et al. |
| 2010/0057555 A1 | 3/2010 | Butterfield et al. |

(56) References Cited

U.S. PATENT DOCUMENTS

| | | |
|---|---|---|
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082491 A1 | 4/2010 | Rosenblatt et al. |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0131121 A1 | 5/2010 | Gerlock |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0222925 A1 | 9/2010 | Anezaki |
| 2010/0231383 A1 | 9/2010 | Levine et al. |
| 2010/0234990 A1 | 9/2010 | Zini et al. |
| 2010/0243794 A1 | 9/2010 | Jermyn |
| 2010/0255899 A1 | 10/2010 | Paulsen |
| 2010/0256852 A1 | 10/2010 | Mudalige |
| 2010/0263275 A1 | 10/2010 | Anderson |
| 2010/0263948 A1 | 10/2010 | Couture et al. |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0017863 A1 | 1/2011 | Goossen et al. |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0084162 A1 | 4/2011 | Goossen et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0107938 A1* | 5/2011 | Weidemann ............ B61D 3/18 104/29 |
| 2011/0112976 A1 | 5/2011 | Ryan et al. |
| 2011/0114398 A1* | 5/2011 | Bianco .................... B60K 1/04 180/65.1 |
| 2011/0125323 A1 | 5/2011 | Gutmann et al. |
| 2011/0128144 A1 | 6/2011 | Baron, Sr. et al. |
| 2011/0131172 A1 | 6/2011 | Herzog et al. |
| 2011/0137462 A1 | 6/2011 | Nakamura et al. |
| 2011/0151898 A1 | 6/2011 | Chandra et al. |
| 2011/0163160 A1 | 7/2011 | Zini et al. |
| 2011/0166707 A1 | 7/2011 | Romanov et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2011/0304633 A1 | 12/2011 | Beardsley et al. |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0065773 A1 | 3/2012 | Bretschneider |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Gueziec et al. |
| 2012/0126974 A1 | 5/2012 | Phillips et al. |
| 2012/0138732 A1 | 6/2012 | Olm et al. |
| 2012/0143482 A1 | 6/2012 | Goossen et al. |
| 2012/0163206 A1 | 6/2012 | Leung et al. |
| 2012/0166935 A1 | 6/2012 | Abhyanker |
| 2012/0191606 A1 | 7/2012 | Milne et al. |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239224 A1 | 9/2012 | McCabe et al. |
| 2012/0239238 A1 | 9/2012 | Harvey et al. |
| 2012/0239483 A1 | 9/2012 | Yankovich et al. |
| 2012/0239503 A1 | 9/2012 | Cohen |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0320343 A1 | 12/2012 | Papaefstathiou et al. |
| 2012/0331002 A1 | 12/2012 | Carrington |
| 2013/0005307 A1 | 1/2013 | Kim et al. |
| 2013/0024108 A1 | 1/2013 | Gruen |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0063026 A1 | 3/2013 | Stickley |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker et al. |
| 2013/0103437 A1 | 4/2013 | Nelson |
| 2013/0105635 A1 | 5/2013 | Alzu'Bi et al. |
| 2013/0110631 A1 | 5/2013 | Mitchell et al. |
| 2013/0146553 A1 | 6/2013 | Preidt et al. |
| 2013/0151455 A1 | 6/2013 | Odom et al. |
| 2013/0159127 A1 | 6/2013 | Myslinski |
| 2013/0173380 A1 | 7/2013 | Akbari et al. |
| 2013/0190963 A1 | 7/2013 | Kuss et al. |
| 2013/0204437 A1 | 8/2013 | Koselka et al. |
| 2013/0238117 A1 | 9/2013 | Yagawa |
| 2013/0240673 A1 | 9/2013 | Schlosser et al. |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste et al. |
| 2013/0303197 A1 | 11/2013 | Chandra et al. |
| 2013/0317999 A1 | 11/2013 | Zimberoff et al. |
| 2013/0325325 A1 | 12/2013 | Djugash |
| 2014/0009612 A1 | 1/2014 | King |
| 2014/0022051 A1 | 1/2014 | Levien et al. |
| 2014/0025201 A1 | 1/2014 | Ryu et al. |
| 2014/0025230 A1 | 1/2014 | Levien et al. |
| 2014/0032034 A1 | 1/2014 | Raptopoulos et al. |
| 2014/0040179 A1 | 2/2014 | Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0077410 A1 | 3/2014 | Takatsugi et al. |
| 2014/0081445 A1 | 3/2014 | Villamar |
| 2014/0081450 A1 | 3/2014 | Kuehnrich et al. |
| 2014/0087780 A1 | 3/2014 | Abhyanker et al. |
| 2014/0095293 A1 | 4/2014 | Abhyanker |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |

(56) References Cited

U.S. PATENT DOCUMENTS

| | | |
|---|---|---|
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0135039 A1 | 5/2014 | Sartipi et al. |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |
| 2014/0175762 A1 | 6/2014 | Zanderléhn et al. |
| 2014/0180914 A1 | 6/2014 | Abhyanker |
| 2014/0203584 A1 | 7/2014 | White et al. |
| 2014/0204360 A1 | 7/2014 | Dowski, Jr. et al. |
| 2014/0222908 A1 | 8/2014 | Park et al. |
| 2014/0254896 A1 | 9/2014 | Zhou et al. |
| 2014/0277834 A1 | 9/2014 | Levien et al. |
| 2014/0277900 A1 | 9/2014 | Abhyanker |
| 2014/0316243 A1 | 10/2014 | Niedermeyer |
| 2014/0316570 A1 | 10/2014 | Sun et al. |
| 2014/0316616 A1 | 10/2014 | Kugelmass |
| 2014/0330456 A1 | 11/2014 | Lopez Morales et al. |
| 2014/0351163 A1 | 11/2014 | Tussy |
| 2015/0006005 A1 | 1/2015 | Yu et al. |
| 2015/0032252 A1 | 1/2015 | Galluzzo et al. |
| 2015/0120094 A1 | 4/2015 | Kimchi et al. |
| 2015/0142248 A1 | 5/2015 | Han et al. |
| 2015/0183528 A1 | 7/2015 | Walsh et al. |
| 2015/0185034 A1 | 7/2015 | Abhyanker et al. |
| 2015/0202770 A1 | 7/2015 | Patron et al. |
| 2015/0203213 A1 | 7/2015 | Levien et al. |
| 2015/0206230 A1 | 7/2015 | McCary, Sr. |
| 2015/0234386 A1 | 8/2015 | Zini et al. |
| 2015/0242806 A1 | 8/2015 | Cousins et al. |
| 2015/0248640 A1 | 9/2015 | Srinivasan et al. |
| 2015/0269520 A1 | 9/2015 | Knapp et al. |
| 2015/0302495 A1 | 10/2015 | Stuckman et al. |
| 2015/0317596 A1 | 11/2015 | Hejazi |
| 2015/0336671 A1 | 11/2015 | Winn et al. |
| 2015/0370251 A1 | 12/2015 | Siegel et al. |
| 2015/0379796 A1 | 12/2015 | Glasgow et al. |
| 2016/0012393 A1 | 1/2016 | Wang et al. |
| 2016/0033966 A1 | 2/2016 | Farris et al. |
| 2016/0059412 A1 | 3/2016 | Oleynik |
| 2016/0068264 A1 | 3/2016 | Ganesh et al. |
| 2016/0090248 A1 | 3/2016 | Worsley et al. |
| 2016/0104099 A1 | 4/2016 | Villamar |
| 2016/0107838 A1 | 4/2016 | Swinkels et al. |
| 2016/0110788 A1 | 4/2016 | Stephenson |
| 2016/0159496 A1 | 6/2016 | O'Toole |
| 2016/0176638 A1 | 6/2016 | Toebes |
| 2016/0209847 A1 | 7/2016 | Kuegle |
| 2016/0231751 A1 | 8/2016 | Mecklinger et al. |
| 2016/0239803 A1 | 8/2016 | Borley et al. |
| 2016/0280461 A1 | 9/2016 | Geiger et al. |
| 2016/0292872 A1 | 10/2016 | Hammond et al. |
| 2016/0306355 A1 | 10/2016 | Gordon et al. |
| 2016/0314429 A1 | 10/2016 | Gillen et al. |
| 2017/0011333 A1 | 1/2017 | Greiner et al. |
| 2017/0024688 A1 | 1/2017 | Wiechers |
| 2017/0038780 A1 | 2/2017 | Fandetti |
| 2017/0039510 A1 | 2/2017 | Ogilvie et al. |
| 2017/0041451 A1 | 2/2017 | Wilkinson |
| 2017/0066490 A1 | 3/2017 | Fauroux et al. |
| 2017/0090484 A1 | 3/2017 | Obaidi |
| 2017/0097983 A1 | 4/2017 | Morimoto et al. |
| 2017/0109667 A1 | 4/2017 | Marcu et al. |
| 2017/0110017 A1 | 4/2017 | Kimchi et al. |
| 2017/0124512 A1 | 5/2017 | Harvey |
| 2017/0129603 A1 | 5/2017 | Raptopoulos et al. |
| 2017/0132566 A1 | 5/2017 | High et al. |
| 2017/0183159 A1 | 6/2017 | Weiss |
| 2017/0193686 A1 | 7/2017 | Mullins |
| 2017/0203857 A1 | 7/2017 | O'Toole |
| 2017/0207980 A1 | 7/2017 | Hudis et al. |
| 2017/0286773 A1 | 10/2017 | Skaff et al. |
| 2017/0300878 A1 | 10/2017 | Hansen |
| 2017/0323253 A1 | 11/2017 | Enssle et al. |
| 2017/0364089 A1 | 12/2017 | Strautmann et al. |
| 2018/0002120 A1 | 1/2018 | Allegretti et al. |
| 2018/0008076 A1 | 1/2018 | Mitra et al. |
| 2018/0022405 A1 | 1/2018 | Gecchelin et al. |
| 2018/0053147 A1 | 2/2018 | Zhang et al. |
| 2018/0068139 A1 | 3/2018 | Aalund et al. |
| 2018/0215545 A1 | 8/2018 | High et al. |
| 2018/0215546 A1 | 8/2018 | High et al. |
| 2018/0232839 A1 | 8/2018 | Heinla et al. |
| 2018/0253805 A1 | 9/2018 | Kelly et al. |
| 2018/0261112 A1 | 9/2018 | O'Brien |
| 2018/0281657 A1 | 10/2018 | Healey et al. |
| 2018/0330313 A1 | 11/2018 | Clarke et al. |
| 2018/0330319 A1 | 11/2018 | Liang et al. |
| 2018/0330325 A1 | 11/2018 | Sibley et al. |
| 2018/0354130 A1 | 12/2018 | Preisinger et al. |
| 2019/0031075 A1 | 1/2019 | Koch |
| 2019/0033856 A1 | 1/2019 | Ferguson et al. |
| 2019/0047356 A1 | 2/2019 | Ferguson et al. |

FOREIGN PATENT DOCUMENTS

| | | |
|---|---|---|
| DE | 102007003458 A1 | 7/2008 |
| EP | 1426876 A1 | 6/2004 |
| EP | 2338727 A1 | 6/2011 |
| GB | 814714 A | 6/1959 |
| JP | S5878835 A | 5/1983 |
| KR | 101069834 B1 | 10/2011 |
| KR | 20120121376 A | 11/2012 |
| KR | 20150104863 A | 9/2015 |
| WO | WO-9808055 A1 | 2/1998 |
| WO | WO-9956143 A1 | 11/1999 |
| WO | WO-0054170 A2 | 9/2000 |
| WO | WO-0163423 A1 | 8/2001 |
| WO | WO-0201455 A2 | 1/2002 |
| WO | WO-0219236 A1 | 3/2002 |
| WO | WO-0241115 A2 | 5/2002 |
| WO | WO-03058540 A1 | 7/2003 |
| WO | WO-2005103624 A2 | 11/2005 |
| WO | WO-2006020471 A1 | 2/2006 |
| WO | WO-2007065649 A2 | 6/2007 |
| WO | WO-2007108927 A2 | 9/2007 |
| WO | WO-2007108928 A2 | 9/2007 |
| WO | WO-2007113844 A1 | 10/2007 |
| WO | WO-2008085547 A2 | 7/2008 |
| WO | WO-2008103149 A1 | 8/2008 |
| WO | WO-2008105766 A1 | 9/2008 |
| WO | WO-2008108772 A1 | 9/2008 |
| WO | WO-2008118119 A1 | 10/2008 |
| WO | WO-2008123851 A1 | 10/2008 |
| WO | WO-2008111929 A3 | 11/2008 |
| WO | WO-2009138559 A1 | 11/2009 |
| WO | WO-2010103163 A1 | 9/2010 |
| WO | WO-2013095297 A1 | 6/2013 |
| WO | WO-2013188762 A1 | 12/2013 |
| WO | WO-2014080389 A2 | 5/2014 |
| WO | WO-2014121145 A1 | 8/2014 |
| WO | WO2015166339 A1 * | 4/2015 ............ H04L 67/12 |

OTHER PUBLICATIONS

Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-neighborhoods/.

Canvas Technology Develops Automotive-Level Autonomy for Goods Delivery, Robotics business review article, 6 pages.

(56) References Cited

OTHER PUBLICATIONS

Castle S., "Boulder Company Developing Self-Driving Vehicles for Factories," 2016, 3 pages.
"ChipIn—the easy way to collect money", Louis' Really Useful Finds, Mar. 12. (p. 1) http://reallyusefulthings.tumblr.com/post/28688782/chipin-the-easy-way-to-collect-money.
"Computer Systems and the Design of Organizational Interaction", by Fernando Flores et al. (pp. 20) http://cpe.njit.edu/dlnotes/CIS/CIS735/ComputerSystemsandDesign.pdf.
Coxworth, Ben, "HorseFly delivery drone would use a van as its base-on-the-go", Jun. 6, 2014.
"Crowdsourcing: Those that are willing to test & learn will be those that will win", Newsline, Mar. 1 , 2011 by Neil Perkin, http://mediatel.co.uk/newsline/2011/03/01/crowdsourcing-those-that-are-willing-to-test -learn-will-be-those-that-will-win/.
"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.
Dispatch—Making Delivery Smart, Blog—Dispatch, Apr. 6, 2016(/blog/2016/4/6/automating-delivery), Retrieved from Internet: http://dispatch.ai/blog/ on Apr. 12, 2017, 3 pages.
EDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Facebook Engineers bring Google+ Circles to Facebook, Article on ZDNet by Emil Protalinski , Jul. 3, 2011, (pp. 2) http://www.zdnet.com/blog/facebook/facebook-engineers-bring-google-circles-to-facebook/1885.
Fatdoor CEO Talks About Balancing Security with Community, Wired Magazine, May 31, 2007, by Terrence Russell (2 Pages) http://www.wired.com/2007/05/fatdoor_ceo_tal/.
Fatdoor Founder Sues Benchmark Capital, Saying It Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Food delivery robots are rolling out in San Francisco, CNET article, Marble, Apr. 12, 2017, 3 pages.
"Friends and Neighbors on the Web", 2001 by Lada A. Adamic et al. (pp. 9), http://www.hpl.hp.com/research/idl/papers/web10/fnn2.pdf.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.
Lonsdorf K., "Hungry? Cali Your Neighborhood Delivery Robot," Robotics, Robots Deliver Takeout Orders on the Streets of Washington, D.C., Mar. 23, 2017, Retrieved from Internet: https://www.npr.org/sections/alltechconsidered/2017/03/23/520848983/hungry-call-your-neighborhood-delivery-robot on Apr. 12, 2017, 13 pages.
Morris C., "Tech Gadgets Soar to New Heights," Robots, drones, and driverless cars may be the future of delivery—QSR magazine, Aug. 2016, Retrieved from the Internet: https://www.qsrmagazine.com/technology/tech-gadgets-soar-new-heights on Apr. 12, 2017, 3 pages.
"Notification for Shared Annotation of Digital Documents", Technical Report MSR—TR-2001—87, Sep. 19, 2001 by A. J. Bemheim Brush et al. (pp. 9) http://research.microsoft.com/pubs/69880/tr-2001-87.pdf.
Pettitt J., "Forget Delivery Drones, Meet your New Delivery Robot," New Frontiers of Intelligence, GMIC Beijing 2017, Nov. 2, 2015, Retrieved from Internet: https://www.cnbc.com/2015/11/02/forget-delivery-drones-meet-your-new-delivery-robot.html on Apr. 12, 2017, 5 pages.
Robinson M., "Tiny self-driving robots have started delivering food on-demand in Silicon Valley—take a look," Business Insider, Mar. 24, 2017, Retrieved from Internet: http://www.businessinsider.in/Tiny-self-driving-robots-have-started-delivering-food-on-demand-in-Silicon-Valley-take-a-look/articleshow/57817085.cms on Apr. 12, 2017, 21 pages.
Ryan J., Boulder's Canvas Technology breaks out of stealth, revealing just what their robots do, built in Colorado, Sep. 28, 2016, 5 pages.
Said C., "Robots to Deliver Yelp Eat24 Dinners in Two SF Neighborhoods," SF Gate, Remarketing (Text Ads)—Free Milgard W, Retrieved from Internet: http://www.sfgate.com/news/article/Robots-to-deliver-Yelp-Eat24-dinners-in-two-SF-11066641.php on Apr. 12, 2017, 3 pages.
San Francisco Gets a Taste of Robotic Food Delivery, NDTV, Apr. 13, 2017, Retrieved from Internet: https://www.ndtv.com/world-news/san-francisco-gets-a-taste-of-robotic-food-delivery-1680605 on Apr. 12, 2017, 5 page.
Screenshot of patch media website, Aug. 27, 2014 (pp. 6) http://patch.com/.
Solomon B., "Self-Driving Delivery Robots Are Coming to a Sidewalk Near You," Forbes, Retrieved from Internet: https://www.forbes.com/sites/briansolomon/2016/04/06/self-driving-delivery-robots-are-coming-to-a-sidewalk-near-you/#2f76155d63a4 on Apr. 12, 2017, 5 pages.
Suzuki, et al; Automatic Battery Replacement System for UAVs: Analysis and Design; J Intell Robot Syst.; Sep. 9, 2011.
Tobe F., "The technology gap left by Amazon's acquisition of Kiva Systems," The Robot report—Tracking the business of Robotics, Retrieved from the Internet on Apr. 25, 2017, 5 pages.
Wikipedia entry AirBnB website—Aug. 21, 2014 (pp. 16) http://en.wikipedia.org/wiki/Airbnb.
Wikipedia entry Autonomous car—Aug. 27, 2014 (pp. 15) http://en.wikipedia.org/wiki/Autonomous_car.
Wikipedia entry Google driverless car—Aug. 27, 2014 (pp. 4) http://en.wikipedia.org/wiki/Google_driverless_car.
Wikipedia entry Google Maps website—Aug. 27, 2014 (p. 18) http://en.wikipedia.org/wiki/Google_Maps.
Wikipedia entry Meetup website—Aug. 27, 2014 (p. 1) http://en.wikipedia.org/wiki/Meetup_ (website).
Wikipedia entry Patch Media website—Aug. 27, 2014 (pp. 2) http://en.wikipedia.org/wiki/Patch_Media.
Wikipedia entry the Freecycle Network website—Aug. 27, 2014 (pp. 3) http://en.wikipedia.org/wiki/The_Freecycle_Network.
Wikipedia entry Uber (company)—Aug. 27, 2014 (pp. 7) http://en.wikipedia.org/wiki/Uber_(company).
Wikipedia entry Yahoo! Groups website—Aug. 27, 2014 (pp. 7) http://en.wikipedia.org/wiki/Yahoo_groups.
Written Opinion received in related PCT/EP2015/057152 dated May 15, 2015.
Amendment after Non-Final dated Nov. 5, 2018 for Non-final Office Action dated Jun. 5, 2018 for U.S. Appl. No. 15/707,430, filed Sep. 18, 2017, pp. 1-12.
Applicant Initiated Interview Summary dated Jan. 17, 2018 for U.S. Appl. No. 15/707,313, filed Sep. 1, 2017, 1 page.
Examiner Initiated Interview Summary dated Feb. 4, 2019 for U.S. Appl. No. 15/707,430, filed Sep. 18, 2017, 3 pages.
Final Office Action dated Aug. 13, 2018 for for U.S. Appl. No. 15/707,743, filed Sep. 18, 2017, 29 pages.
Final Office Action dated Aug. 24, 2018 for for U.S. Appl. No. 15/707,549, filed Sep. 18, 2017, 12 pages.
Final Office Action dated Jan. 24, 2019 for U.S. Appl. No. 15/707,549, filed Sep. 18, 2017, pp. 1-7.
Murphy, Mike, "The future is here: Drones are delivering Domino's pizzas", Nov. 16, 2016 (https://qz.com/838254/dominos-is-delivering-pizza-with-autonomous-drones-to-customers-in-new-zealand/) last accessed May 25, 2019.

(56) References Cited

OTHER PUBLICATIONS

Non-Final Office Action dated Nov. 1, 2017 for U.S. Appl. No. 15/707,627, filed Sep. 18, 2017, pp. 1-22.
Non-Final Office Action dated Jan. 2, 2018 for U.S. Appl. No. 15/707,549, filed Sep. 18, 2017, pp. 1-11.
Non-Final Office Action dated Jan. 5, 2018 for U.S. Appl. No. 15/707,743, filed Sep. 18, 2017, pp. 1-28.
Non-Final Office Action dated Aug. 29, 2018 for for U.S. Appl. No. 15/707,313, filed Sep. 18, 2017, 10 pages.
Notice of Allowance and Examiner Initiated Interview Summary dated May 9, 2019 for U.S. Appl. No. 15/707,313, filed Sep. 19, 2017, pp. 1-11.
Notice of Allowance dated Feb. 1, 2019 for U.S. Appl. No. 15/707,430, filed Sep. 18, 2017, pp. 1-5.
Notice of Allowance dated Mar. 21, 2019 for U.S. Appl. No. 15/707,430, filed Sep. 18, 2017, pp. 1-5.
Notice of Allowance dated Feb. 22, 2019 for U.S. Appl. No. 15/707,549, filed Sep. 18, 2017, pp. 1-5.
Examiner Initiated Interview Summary dated Jan. 17, 2018 for U.S. Appl. No. 15/707,313, filed Sep. 18, 2017, 1 page.
Response dated Jul. 2, 2018 for Non-Final Office action dated Jan. 2, 2018 for U.S. Appl. No. 15/707,549, filed Sep. 18, 2017, pp. 1-12.
Response dated Jul. 5, 2018 for Non-Final Office action dated Jan. 5, 2018 for U.S. Appl. No. 15/707,743, filed Sep. 18, 2017, pp. 1-8.
Response dated Jan. 14, 2019 for Final Office Action dated Aug. 13, 2018 for U.S. Appl. No. 15/707,743, filed Sep. 18, 2017, pp. 1-12.
Response dated Jun. 20, 2018 for Restriction Requirement dated Dec. 20, 2017 for U.S. Appl. No. 15/707,313, filed Sep. 18, 2017, pp. 1-5.
Response dated Jan. 29, 2019 for Non-Final Office Action dated Aug. 29, 2018 for U.S. Appl. No. 15/707,313, filed Sep. 28, 2017, pp. 1-9.
Restriction Requirement/Election dated Dec. 20, 2017 for U.S. Appl. No. 15/707,313, filed Sep. 18, 2017, pp. 1-6.
Non-Final Office Action dated Jun. 5, 2018 for U.S. Appl. No. 15/707,430, filed Sep. 18, 2017, 13 pages.
Non-Final Office Action dated May 29, 2019 for U.S. Appl. No. 15/707,430, filed Sep. 18, 2017, 12 pages.

* cited by examiner

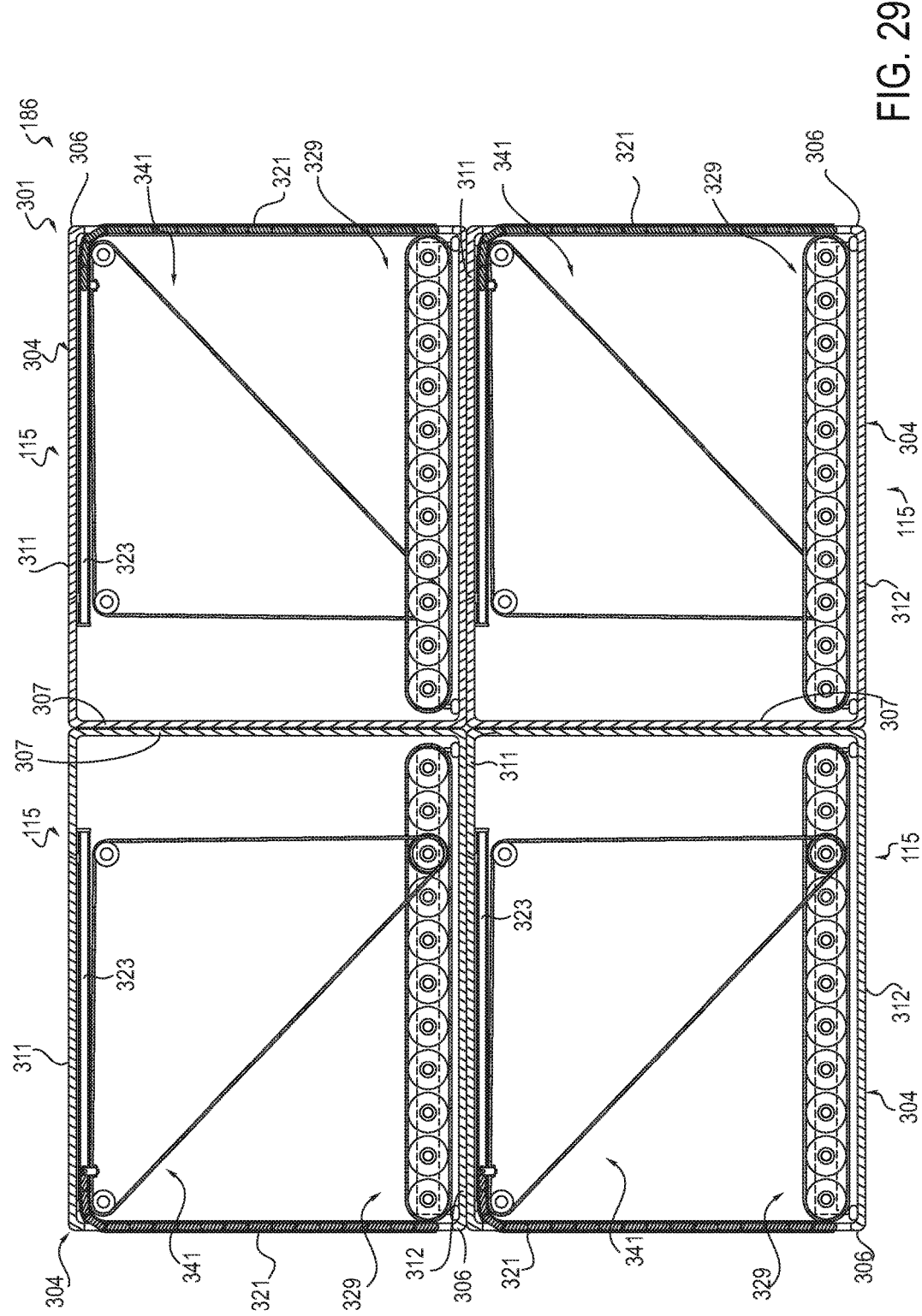

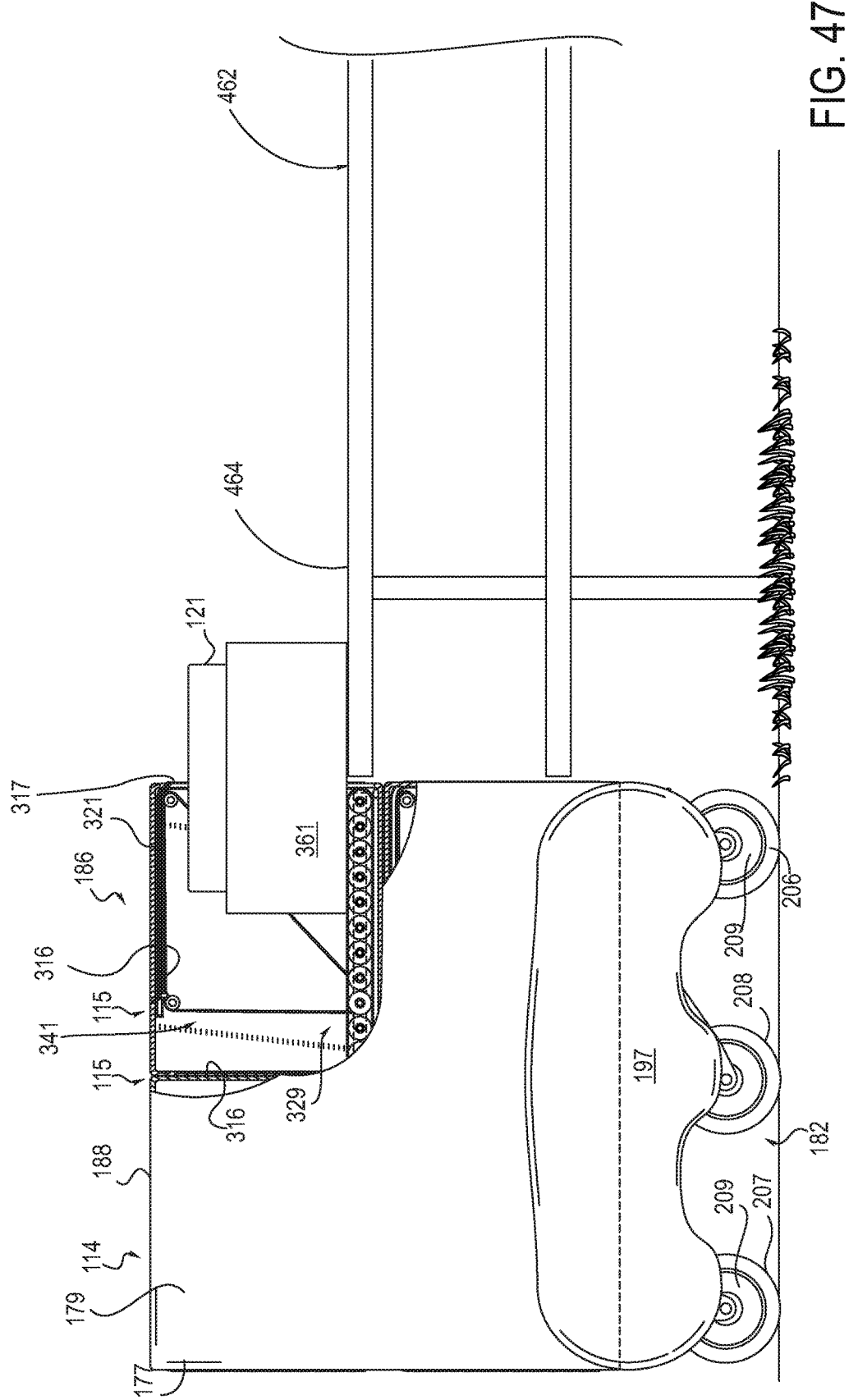

ROBOT DELIVERY SYSTEM

CROSS REFERENCE TO RELATED APPLICATIONS

This application claims priority to U.S. provisional patent application Ser. No. 62/505,801 filed May 12, 2017, U.S. provisional patent application Ser. No. 62/534,674 filed Jul. 19, 2017 and U.S. provisional patent application Ser. No. 62/555,970 filed Sep. 8, 2017, the entire content of each of which is incorporated herein by this reference.

FIELD OF THE INVENTION

The present invention relates to a delivery method and system and, more particularly, to a delivery method and system using a robot.

BACKGROUND OF THE INVENTION

Methods and systems have been provided for delivering articles over roads and sidewalks to a location. Such systems have used wheeled vehicles. Recently disclosed systems utilize mixed autonomous wheeled vehicles.

What is needed is a method, system and robot that can permit autonomous delivery of articles, including goods and products, over a variety of outdoor transportation networks.

BRIEF DESCRIPTION OF THE DRAWINGS

The drawings described herein are for illustration purposes only and are not intended to limit the scope of the present disclosure in any way.

FIG. 29 is a side cross sectional view of one embodiment of a container assembly for use with the robot of FIG. 5.

FIG. 47 is one embodiment of a method for delivering an article from a robot of FIG. 5 to a delivery location, for example the location designated in FIG. 46.

DETAILED DESCRIPTION OF THE INVENTION

Figure 1:
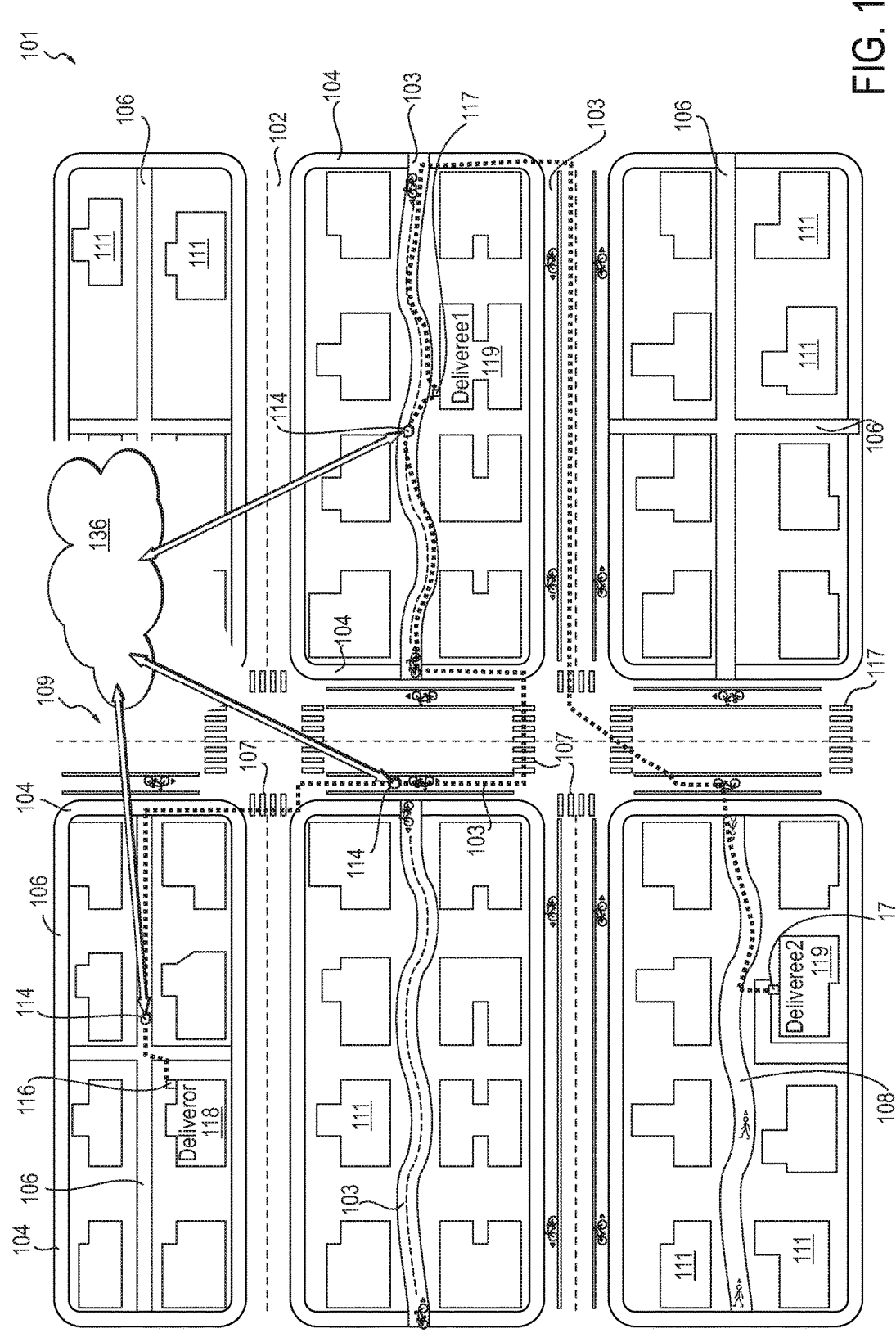
FIG. 1 is a plan view of one embodiment of a robot delivery system of the present invention for use on an outdoor land transportation network that can include roads, bike paths and sidewalks.

A method and system 113 for delivering articles, objects, products or goods from one location to another location using a robot 114 is provided. The terms articles, objects, products or goods may be used interchangeably herein. The method can optionally be computer implemented, either partially or totally. The robot 114 can optionally be remotely controlled, semiautonomous or mixed autonomous. The robot can optionally be one or a plurality of robots, for example one of a plurality of identical robots. The robot 114 can have legs, wheels, tracks or any combination of the foregoing. The robot can optionally be a biped, two wheels, three wheels, four wheels or any combination of the foregoing. In any embodiment, the robot 114 can optionally be a driverless robot, which can be referred to as driverless vehicle or robot, an autonomous vehicle or robot, an autonomous wheeled vehicle or robot, a driverless biped, an autonomous biped or any combination of such terms. The system 113 may be referred to as a wheeled vehicle or robotic delivery system, a driverless vehicle or robotic delivery system, an autonomous vehicle or robotic delivery system, a driverless or autonomous biped delivery system or any combination of the foregoing. The method and system can optionally be used on an outdoor land transportation network, which can include roads, bike paths, sidewalks, alleys, paths, crosswalks, any route on which a wheeled vehicle can travel, any route on which a biped can travel or any combination of the foregoing. The network 101 can be referred to as an outdoor network, and outdoor transportation network, a land transportation network or a transportation network. Transportation network 101 can optionally include roads 102, bike paths 103, sidewalks 104, alleys 106, crosswalks 107 and walking paths 108 (see FIG. 1). The roads 102 can be of any suitable type, including main thoroughfares and side streets, whether in a city, suburb, rural or any other setting. The bike paths 103 can be in any suitable location, including alongside a road or separate or distinct from a road. In any embodiment, network 101 can optionally include a grid 109 of roads 102. In any embodiment, the network 101 provides access to a plurality of buildings 111. In any embodiment, the method and system can optionally be used indoors, for example in a warehouse, factory, store, distribution center or any other building containing articles, products or goods. In any embodiment, the method and system can optionally be used both indoors and on an outdoor land transportation network, including any of those discussed above.

In any embodiment of the system of the invention, a system 113 can optionally be provided that can include a robot 114 of any suitable type, including any of the vehicles or robots disclosed herein. System 113 can optionally include a fleet of vehicles or other robots, for example a fleet of standardized vehicles or other robots that are each substantially identical or a fleet of a plurality of sub fleets of standardized vehicles or other robots in which each vehicle or other robot in a sub fleet is substantially identical. System 113 can optionally include a fleet of standardized vehicles or other robots that are not substantially identical or a fleet of a plurality of sub fleets of standardized vehicles or other robots that are not substantially identical. In any embodiment, vehicle or other type or robot 114 of the fleet can optionally be configured or adapted to travel on the transportation network 101, and has a size, shape and functionality to permit it to travel on the desired transportation network. In any embodiment, the vehicle or other robot can optionally be configured to travel on at least roads, bike paths and sidewalks. When traveling on roads, the vehicle or other robot can travel along the side of the road, along the center of the road or in any lane of the road. In any embodiment, the vehicle or other robot can optionally be configured to travel or move about in a building, including a warehouse, factory, store, distribution center or any other building containing articles, products or goods, and has a size, shape and functionality to permit it to travel in a building. In any embodiment, the vehicle or other robot can optionally be configured to travel on any suitable transportation network, including any of those disclosed herein, and in a building of any suitable type, and has a size, shape and functionality to permit such travel and movement. In any embodiment, the vehicle or other robot can optionally be free of a human driver compartment, that is the vehicle or other robot does not include a human driver compartment. It is appreciated that a robot 114 can optionally be provided to travel on any type of transportation network, and for example scaled accordingly.

In any embodiment, the vehicle or other robot 114 can travel, partially autonomously, fully autonomously or otherwise, on the transportation network for carrying or transporting one or more articles, which can also be referred to as products or goods, from a first location to a second location. In any embodiment, the vehicle or other robot can pick up an article at the first location and deliver the article to the second location. In any embodiment, the vehicle or other robot can pick up a plurality of articles at the first location and deliver the plurality of articles to a second location or to a respective plurality of second locations. In any embodiment, the pickup of one or more articles by the vehicle or other robot can optionally be accomplished without human assistance, for example autonomously. In any embodiment, the delivery of one or more articles by the vehicle or other robot can optionally be accomplished without human assistance, for example autonomously. In any embodiment, the pickup and delivery of one or more articles by the vehicle or other robot can optionally be autonomous, for example accomplished without human assistance. As used herein, the terms autonomous and without human assistance, which can also be referred to as free of human assistance, can mean without the assistance of a human at the location of pickup or delivery and without the assistance of a human remote of the location of pickup or delivery for controlling any aspect of the pickup or delivery including any movement or other control of the vehicle or other robot. As used herein, the terms autonomous and without human assistance can mean under the control of non-human processing equipment or computing devices. The delivery of an article to a location can optionally include the pickup of the article by a first vehicle or other robot and the delivery of the article by a second vehicle or other robot. The transfer of the article between the first vehicle or other robot and the second vehicle or other robot can occur directly, for example directly from the first vehicle or other robot to the second vehicle or other robot, or indirectly. Such indirect transfer of the article can optionally include by any number of additional vehicles or robots, by the delivery of the article to an intermediate location by one vehicle or other robot and the pickup of the article at the intermediate location by another vehicle or other robot, or any combination of the foregoing.

The pickup location can be of any suitable type, and can optionally include the location of a deliverer, a courier, a vendor or a store, a location at which an article or product of a vendor or store is located, a warehouse, an autonomous or any other type of vehicle or robot, an autonomous or any other type of truck or any combination the foregoing. The drop off, recipient or delivery location can be of any suitable type, and can optionally include the location of a deliveree, a courier, a user, a vendee or a purchaser, a location in which an article or product of a vendee or purchaser is located, a warehouse, an autonomous or any other type of vehicle or robot, and autonomous or any other type of truck or any combination the foregoing.

System 113 can optionally include a container of any suitable type for housing the article at the pickup location, at the drop off, recipient or other delivery location, at an intermediate location, any location between the pickup location and such delivery location, during transport between locations, any other location on or along transportation network 101 or any combination of the foregoing. When a container is provided at a location, the pickup location, such delivery location or any intermediate location can optionally be inside the container. The container can be referred to as a compartment, receptacle or box. In any embodiment, a container 115 can optionally be provided that has an interior, for example a cavity, accessible by at least one opening. The container can optionally be referred to as a closeable container, and can optionally include a door at the opening which can optionally be opened and closed for selectively accessing the interior of the container. The opening and door can be at any location on the container 115, for example at the top or on a side of the container. In any embodiment, the container can optionally include an opening and door on the side of the container, for example at one end of the container. In any embodiment, the container can optionally be a lockable container, and can optionally include a suitable lockable door. Such a lockable container can be referred to as a tamperproof container.

In any embodiment of system 113, the size and shape of the container 115 can optionally be standardized throughout the system. In any embodiment of system 113, a plurality of classes of containers can optionally be used, with each class of container having a standardized size and shape.

The robot can optionally include a mechanism, assembly, apparatus or device of any suitable type, which can optionally be carried by the container, for removing or assisting in the removal of the contents of the container, for moving articles between containers, for placing or moving or assisting in the placement or movement of articles into the container or any combination the foregoing. In any embodiment, one or more of the containers of the system 113 can optionally include such mechanisms. The mechanism, which can be referred to as a robot mechanism, a vehicle mechanism, a pickup mechanism, a recipient mechanism, a transport mechanism, an article transport mechanism, a removal mechanism, a translation mechanism, a delivery mechanism, a drop off mechanism, a loading mechanism, a receiving mechanism, a retrieval mechanism, an unloading mechanism or any combination of such terms, can optionally include a crane, a pick up or other arm, a scoop, a shovel, a pulley, a claw, a magnet, a conveyor, a belt, rollers, balls, a movable surface, a movable wall, a slide, a grasping device or any combination the foregoing. Articles can optionally be moved into a container, out of the container or both from the top of the container, from the side of the container, from the bottom the container or any combination the foregoing by the mechanism or otherwise. The mechanism can optionally be at least partially disposed in the container. In any embodiment, the mechanism can optionally be carried inside the container, for example so as to be part of the container. In any embodiment, the mechanism can optionally be a conveyor mechanism or system of any suitable type that moves articles from one location to another, for example along or across a substantially planar surface, which can optionally include belts, rollers, balls, a movable surface or any combination the foregoing.

In any embodiment, robot 114 can optionally include a plurality of containers 115. In any embodiment, the plurality of containers 115 can optionally be arranged in a grid or array on at least one side of the robot 114, for example either or both sides of the robot, the rear end of the robot, the front end of the robot or any combination the foregoing. In any embodiment, each of the containers 115 has an opening accessible from at least such side of the robot 114. In any embodiment, the openings of each of the containers 115 on a side of the robot 114 can optionally be flush with the side of the robot. In any embodiment, each of the containers 115 has a self-contained transport mechanism for delivering articles to such side of the robot 114.

In any embodiment, a plurality of containers 115 can optionally be provided and arranged in a grid or array with the opening of each of the containers accessible from one planar face or side of the array. In any embodiment, each of the containers 115 has a self-contained transport mechanism for delivering articles to such face or side of the array.

In any embodiment, at least one container 115 can optionally be referred to as a pickup container 116, and for example be provided at the location where the article is picked up by the robot 114. In any embodiment, at least one container 115 can optionally be referred to as a drop off or recipient container 117, and for example be provided at the location where the article is delivered by the robot 114 for receiving the article. One or both of the pickup container 116 and the recipient container 117 can optionally be a stationary container, for example secured to any suitable support such as a mailbox, a building, an exterior of a building, on a wall of a building or into the wall of a building. In any embodiment, robot 114 can pick up the article from pickup container 116 without human assistance. In any embodiment, the robot 114 can deliver the article to recipient container 117 without human assistance. The pickup container 116 can optionally be associated with a deliverer 118 of the article and can optionally be located at the deliverer's location, nearby the deliverer's location, rented or leased to the deliverer, assigned to the deliverer or otherwise associated with the deliverer 118. In any embodiment, the deliverer 118 can optionally be a vendor or seller of the article. The recipient container 117 can optionally be associated with a deliveree 119 of the article or user of system 113, and can optionally be located at the deliveree or user's location, nearby the deliveree or user's location, rented or leased to do the deliveree or user, assigned to the deliveree or user or otherwise associated with the deliveree or user. A pickup container can additionally be a recipient container, and the recipient container can additionally be a pickup container. In any embodiment, the deliveree or user 119 can optionally be a vendee or purchaser of the article, which can optionally be a product. The article being transported, which can optionally include article 121, can optionally be a single article, a plurality of articles, a group of articles, a purchase order, a delivery order or any combination of the foregoing.

Figure 2:
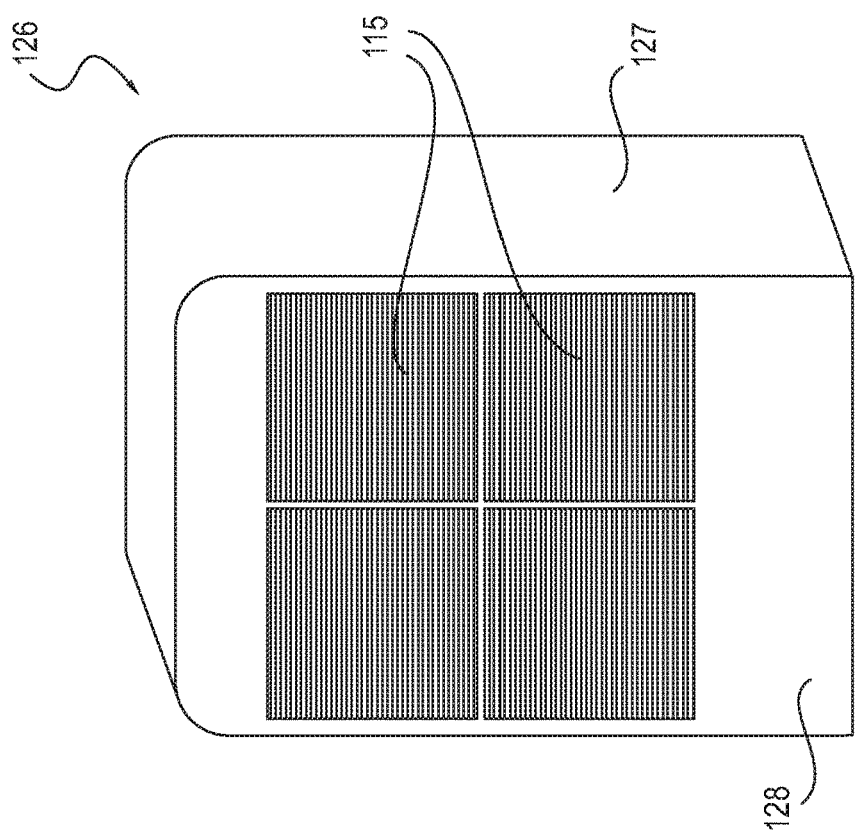
FIG. 2 is a perspective view of one embodiment of a container assembly or array for use in the robot delivery system of FIG. 1.

In any embodiment, a plurality of containers 115 can optionally be grouped together in an assembly or array 126, for example for permitting a plurality of pickups or deliveries at a location (see FIG. 2). In any embodiment, assembly 126 can optionally include a housing 127, which can serve as a framework or support structure for the plurality of containers 115. An assembly 126 of containers 115 may be particularly suitable at a location associated with a deliverer 118 of goods or products, for example a store. An assembly 126 of containers 115 may be particularly suitable at a location associated with a plurality of deliverees 119, for example in front of a multitenant building, in a crowded neighborhood, along the street in a city, at a school, at an office building or any other building in which a plurality of people work or reside. The containers 115 can optionally be arranged in housing 127 in an array, for example in rows or columns, with at least one surface of each container 115 accessible from the exterior of the housing 127 for accessing the interior of each container 115. In any embodiment, a plurality of containers 115 can optionally be arranged in a grid of at least one row, at least one column or both, and each have one end accessible at a side surface 128 of the housing 127 for accessing the interior of the container 115, for example by means of an opening in the container. In any embodiment, the side surface 128 can optionally be at the front of the housing 127 and a plurality of respective container openings can optionally be accessible at the front of the housing.

Figure 3:
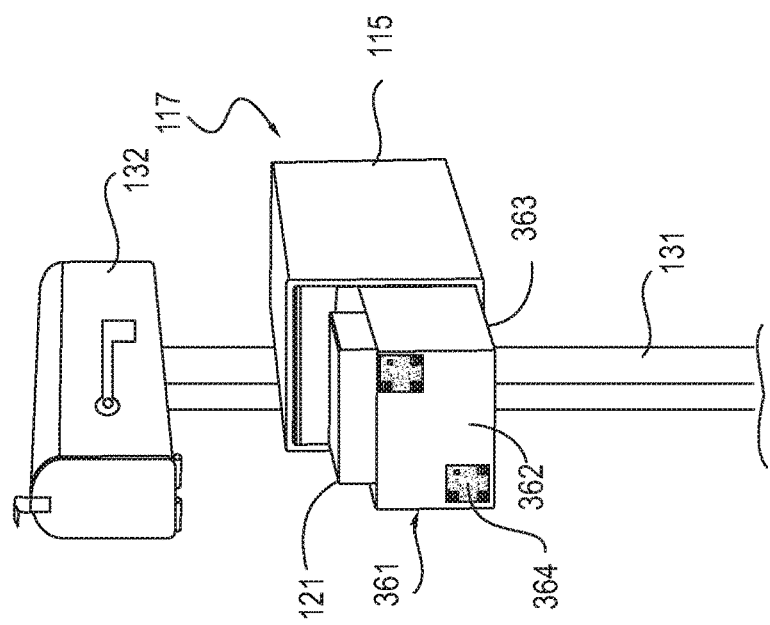
FIG. 3 is a perspective view of one embodiment of a stationary container for use in the robot delivery system of FIG. 1.

In any embodiment of a recipient container 117, suitable for example for use in a suburban or rural setting, a single container 115 can optionally be mounted to a post 131 below a mailbox 132 carried by the post 131 (see FIG. 3). In any embodiment, the container 115 can optionally be spaced above the ground at any location. At least one surface of the container 115 can optionally be accessible for accessing the interior of the container, for example by means of an opening in the container. In any embodiment, at least one end of the container 115 can optionally be accessible and parallel to the opening of the mailbox 132.

System 113 can optionally include at least one computer configured to control all or parts of the system. The at least one computer can optionally be programmed with firmware, software or both to control all or parts of the system. In any embodiment, the at least one computer has computer-executable instructions stored in a non-transitory computer-readable storage medium to control all or parts of the system. The at least one computer can navigate robot 114 over the transportation network 101 from a first location to a second location as at least part of the process for delivering an article, can control all operations of the robot 114, which can include a pickup of the article and a delivery of the article by the robot, can be configured to receive one or more inputs from one or more sensors carried by the robot as part of such navigation, can receive a request to pick up an article, deliver an article or both, can be configured to receive one or more inputs from one or more sensors carried by the robot to map the terrain encountered by the robot throughout all or part of the delivery process, can include a computing device associated with the deliverer 118, can include a computing device associated with the deliveree 119, can include a computing device carried by the robot 114, can include a computing device associated with a pickup container, a drop off container or both, can include one or more backend servers or other computing devices remote of the robot 114, deliverer 118, deliveree 119 and any container of system 113, which can be referred to as cloud computers or cloud-based computers, for assisting in or accomplishing any of the foregoing, or any combination of the foregoing. In any embodiment, the at least one computer can optionally include a network of computing devices, which can be referred to as a computer network 136.

In any embodiment, the computer network 136 contains an identification and address for each container 115 of the system 113. In any embodiment, the computer network 136 can optionally include the classifications of the containers 115 of the system, for example including a list of all containers 115 in each such class. Such classifications can optionally include classifications by size, shape or any other physical characteristic of the container. Each container 115 can optionally include any suitable identifier thereon (not shown), which can include the address, the class, any characteristic of the class of the container or any combination of the foregoing. Such identifier can optionally include any machine-readable identifier, such as a barcode.

Figure 4:
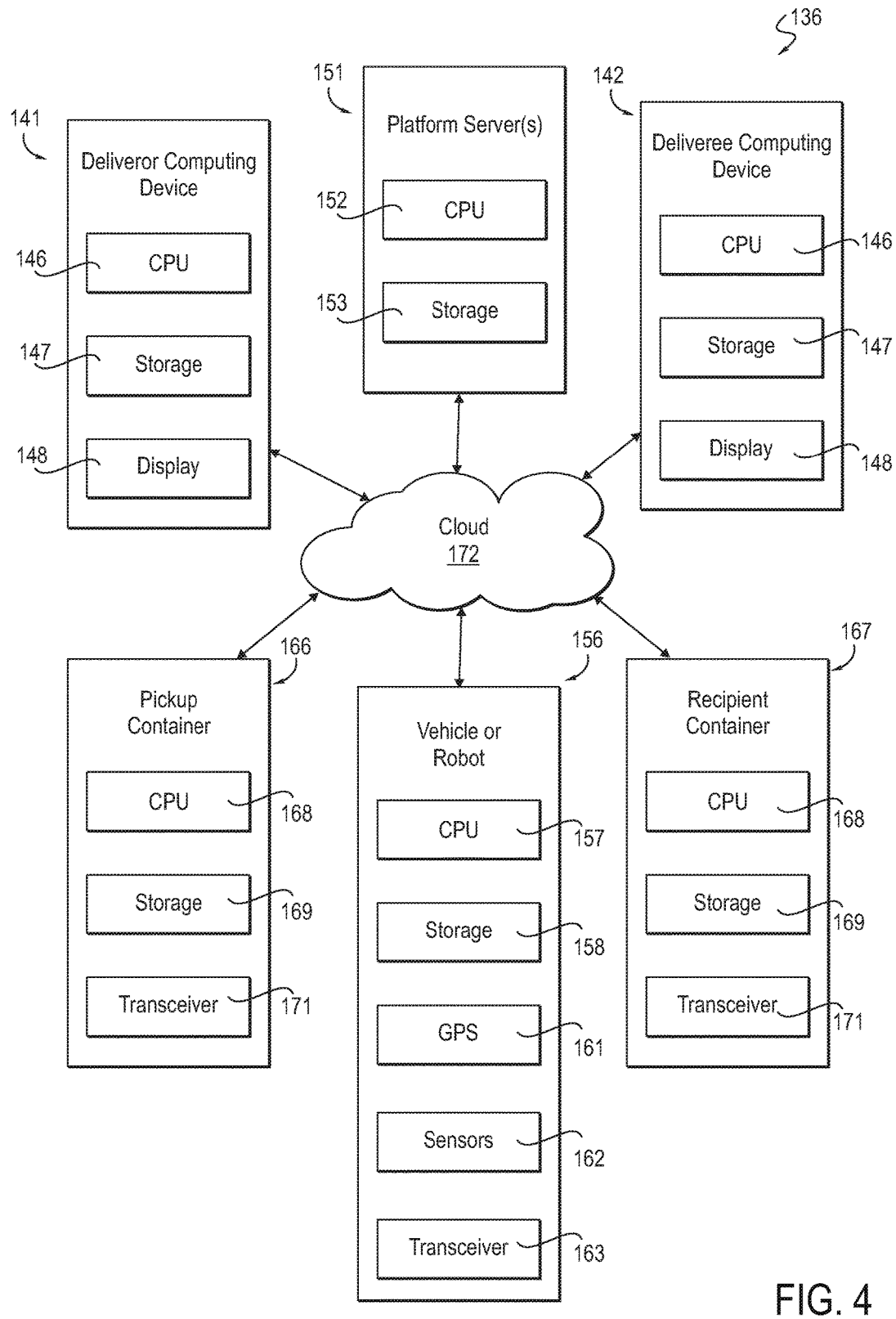
FIG. 4 is a schematic view of the robot delivery system of FIG. 1.

As indicated, computer network 136 of system 113 can be of any suitable type. Computer network 136 can optionally include at least one deliverer computing device 141 and at least one deliveree computing device 142 (see FIG. 4). In any embodiment, the computer network 136 can optionally include a deliverer computing device 141 for each deliverer 118 of the system 113 and a deliveree computing device 142 for each deliveree 119 of the system. Each deliverer computing device 141 can be of any suitable type and can optionally include, for example, at least one central processing unit 146 and storage or memory 147 of any suitable type. Each deliverer computing device 141 can optionally include a display 148. In any embodiment, deliverer computing device 141 can optionally include a position sensor of any suitable type, for example a global positioning system (GPS) device or receiver. In any embodiment, deliverer computing device 141 can optionally include one or more suitable depth sensors of any suitable type, which can optionally include an RGB camera, an infrared illuminator, an infrared camera or any combination the foregoing. Each deliveree computing device 142 can be of any suitable type and can include, for example, at least one central processing unit 146 and storage or memory 147 of any suitable type, and optionally include a display 148. In any embodiment, the deliveree computing device 142 can optionally include at least one sensor, for example a camera (not shown). In any embodiment, the deliveree computing device 142 can optionally include additional sensors, such as a microphone and an inertial measurement unit. In any embodiment, deliveree computing device 142 can optionally include a position sensor of any suitable type, for example a global positioning system (GPS) device or receiver. In any embodiment, deliveree computing device 142 can optionally include one or more suitable depth sensors of any suitable type, which can include an RGB camera, an infrared illuminator, an infrared camera or any combination the foregoing. Examples of suitable deliverer computing devices 141 and deliveree computing devices 142 include desktop computers, laptop computers, notebook computers, entertainment systems, smart home or other devices, internet of thing devices, network appliances, intelligent personal assistance, tablets, smartphones, mobile computing devices, mobile phones, watches, wearable electronic devices, smart wearable devices with cameras, electronic headsets, virtual-reality devices or any combination of the foregoing. The deliverer computing devices 141 and the deliveree computing devices 142 can have less electronic components than shown in FIG. 4 or additional components not shown in FIG. 4. The computer network 136 can additionally include one or more backend or platform computing devices, for example one or more servers 151, which can each include a central processing unit 152 and storage or memory 153 of any suitable type. Additional electronic components can optionally be included in each of the one or more servers 151. In any embodiment, servers 151 can optionally be located in a data center, which can be referred to as a cloud computing center.

Computer network 136 can additionally include a computing device 156 of any suitable type located on the robot 114. In any embodiment, computing device 156, which can be referred to as a computer or controller, can include a central processing unit 157 and storage or memory 158 of any suitable type. In any embodiment, robot computer 156 can optionally include a global positioning system (GPS) device or receiver 161 of any suitable type. In any embodiment, robot computer 156 utilizes input signals from one or more sensors 162 of any suitable type, including for example one or more vision or other cameras, one or more lidar devices or sensors, one or more sonar devices or sensors, one or more radar devices or sensors, one or more near infrared (NIR) devices or sensors, an inertial measurement unit (IMU) device or sensor, or any combination of the foregoing. The sensors can be referred to as part of the robot computer, as part of a robot computing system, as part of a perception system or any combination of the foregoing. In any embodiment, robot computer 156 can optionally include at least one transceiver 163 of any suitable type, which can optionally include a Long-Term Evolution (LTE) or other cellular transmitting and receiving device, a wireless local area networking (Wi-Fi) transmitting and receiving device, a Bluetooth transmitting and receiving device, a radio frequency transmitting and receiving device, a low-power radio frequency transmitting and receiving device, or any combination of the foregoing. Computing device 156 can have less electronic components than shown in FIG. 4 or additional components not shown in FIG. 4.

Computer network 136 can additionally include a pickup container computing device 166, a recipient container computing device 167 or both. In any embodiment, the computer network 136 can optionally include a pickup container computing device 166, which can be referred to as a computer or controller, for each pickup container 116 of the system 113 and can optionally include a recipient container computing device or computer 167, which can be referred to as a computer or controller, for each drop off or recipient container 117 of the system. Each pickup container computing device 166 can be of any suitable type and can optionally include, for example, at least one central processing unit 168 and storage or memory 169 of any suitable type. Each pickup container computing device 166 can optionally include a transceiver 171 of any suitable type, for example including any of the capabilities of transceiver 163 of robot computer 156. Each recipient container computing device 167 can be of any suitable type and can optionally include, for example, at least one central processing unit 168 and storage or memory 169 of any suitable type, and can additionally include a transceiver 171 of any suitable type. The pickup container computing devices 166 and the recipient container computing devices 167 can have less electronic components than shown in FIG. 4 or additional components not shown in FIG. 4.

Each of the components of computer network 136 can communicate with at least some of the other components, or all of the other components, of computer network 136 by any wireless, hard-wired or Internet-based means, which can be referred to as or include the cloud 172. The computer network can optionally be programmed with firmware, software or both to control all or parts of system 113. In any embodiment, the computer network 136, including some or all of the components thereof, has computer-executable instructions stored in a non-transitory computer-readable storage medium to control all or parts of system 113.

A portion of the non-transitory computer-executable instructions of computer network 136 can optionally be stored in the storage 147 of deliverer computing device 141, deliveree computing device 142 or both. Such instructions can optionally include software, for example such as a software application that can optionally be downloaded by the deliveree or user from cloud 172 to deliveree computing device 142, for permitting the deliveree or user to perform some or all of the steps of the deliveree or user noted herein. The deliver computing device 141 or deliveree computing device 142 can be any of those disclosed herein, including a smartphone, a tablet, a notebook, a laptop, a watch, a mobile computer, a smart wearable item with a camera, any mobile computing device with a camera or any combination of the foregoing. Such steps can optionally include accessing system 113, requesting delivery of an article from a deliverer using system 113, viewing products for possible purchase, purchasing a product from a vendor, requesting delivery of the product to a delivery location using system 113 and identifying a delivery or drop off location for the article or product. In any embodiment, the computer-executable instructions include software that can optionally be used by a mobile computing device, for example a smartphone.

In any embodiment, the software can permit the user of the device to display an image on a display of the device, for example the display 148 of deliverer computing device 141 or deliveree computing device 142. The image can be a two-dimensional image or a three-dimensional image. The image can be of a desired location, for example a pickup location or a drop off location, and can optionally include a digital map of the location, a virtual map of the location, a three-dimensional virtual model of the location, a satellite photograph of the location, a photograph of the location taken by the user or another or any combination of the foregoing. The image can optionally include video of the location. A three-dimensional virtual model, for example, can optionally include three-dimensional location information with respect to each point, coordinate or precise location visible in the model. Such three-dimensional location information can optionally include three-dimensional coordinates. Such three-dimensional coordinates or other information can optionally include coordinates in three orthogonal axes, for example orthogonal X, Y and Z axes. The image can optionally be stored in the device, for example in storage 147 of the device 141,142. The image can optionally be downloadable to the device either prior to or during use of the software, for example at the request of the user, as a function of the location of the device, the orientation of the device, an image being provided by one or more cameras or other sensors of the device, information being provided by one or more sensors of the device or any combination of the foregoing.

In any embodiment, the software can permit a user of the mobile computing device to scan terrain viewable by the user with a sensor of the device, such as a camera of the device, to produce one or more images of terrain, for example in the vicinity of a pickup location or a drop off location. The scanned images can be two-dimensional images. The user can store such one or more images in the device, for example in storage 147 of the device 141,142. In any embodiment, the software can permit a user to scan terrain, for example in the vicinity of a pickup or drop off location, with one or more sensors of a device, for example one or more sensors of device 141,142, to permit computer network 136 to create a three-dimensional virtual model of all or a portion of the scanned terrain. Such sensors can optionally include, for example, one or more cameras, one or more depth sensors or any combination of the foregoing.

In any embodiment, such software can permit the user of the device to touch an image visible or viewed on display 148 of the device 141,142, whether a live image being taken by the user or a stored image, to identify a precise pickup location, a precise delivery location or another precise location visible on the displayed image. Such precise delivery location can optionally include a precise three-dimensional delivery location, for example when a three-dimensional image is displayed on the device. The precise location can optionally be identified by an indicator or other indicia produced on the display, including for example on the image being displayed, by the user touching the display 148, for example with the tip of a finger. The software can cause the device 141,142 to produce such indicator at the location on the image touched by the user in response to the use touching the display at such location. The image with the indicator of the precise location thereon can optionally be stored in the mobile computing device. In any embodiment, for example, a user can touch a three-dimensional virtual model or other image displayed on the device, for example displayed on device 141,142, to identify a three-dimensional pickup, delivery or other location on such three-dimensional model or image.

In any embodiment, such software can transmit the precise pickup, delivery or other location, for example the image with the indicator of the precise location thereon, to system 113 for use by computer network 136 in directing a robot 114, or any driverless or driven vehicle or other robot, to pick up or deliver a purchased product or other article. The user can initiate such transmission, or the transmission can be automatic. The transmission can occur prior to without storing the image in the computing device, or after storage of the image in the computing device 141,142. It is appreciated that such software can optionally be utilized for identifying any precise location, for example by being downloaded to any computing device, for any purpose.

In any embodiment, vehicle or other type of robot 114 has a size, shape and functionality to permit it to travel on sidewalks, bike paths and roads and can be of any suitable dimensions. In any embodiment, vehicle 114 has a width not greater than the width of one lane of a bike path. In any embodiment, vehicle or robot 114 has a width not greater than half the width of a sidewalk. In any embodiment, the vehicle or robot 114 has a height, width and length each ranging from two feet to three feet, and in any embodiment the vehicle 114 has a height of approximately 28 inches, a width of approximately 24 inches and a length of approximately 32 inches.

Figure 5:
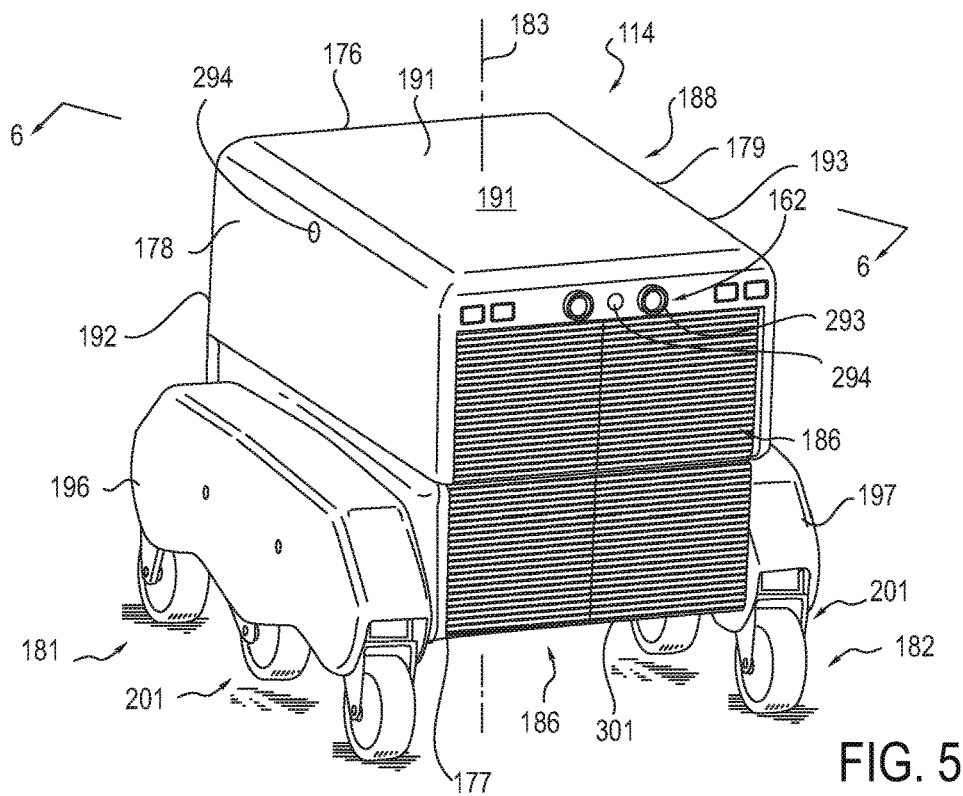
FIG. 5 is a perspective view of one embodiment of a robot for use in the robot delivery system of FIG. 1.
Figure 6:
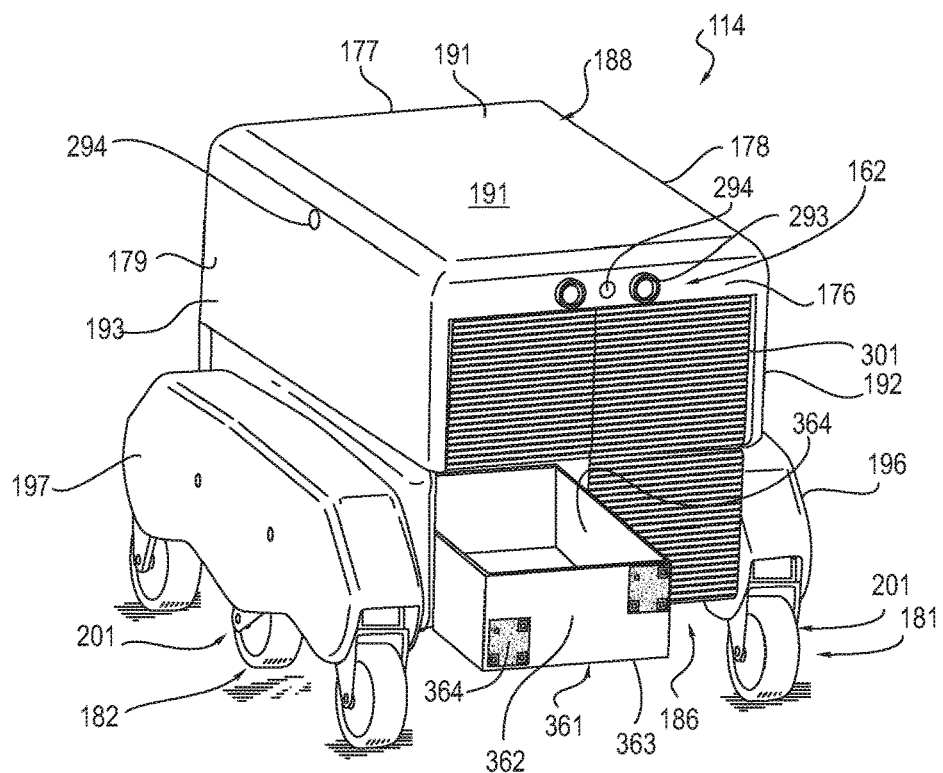
FIG. 6 is a perspective view of the robot of FIG. 5 taken along the line 6-6 of FIG. 5.

Robot 114 can be of any suitable shape and in any embodiment has a first end 176 and a second end 177, and a first side 178 and a second side 179 extending between ends 176, 177 (see FIGS. 5-6). In any embodiment, first and second ends 176, 177 can optionally be each planar, and in any embodiment the ends 176, 177 can optionally be parallel to each other. In any embodiment, first and second sides 178, 179 can optionally be each planar, and in any embodiment the sides 178, 179 can optionally be parallel to each other. In any embodiment, the robot 114 can optionally be a vehicle that has at least three wheels and in any embodiment the vehicle can have at least four wheels, in each case for providing stability to the vehicle when at rest or during travel. Robot 114 can have a plurality of wheels, for example two wheels, three wheels or four wheels, on each side 178, 179 of the robot. In any embodiment, the robot 114 has at least first and second wheels, which can optionally be a first wheel assembly 181, on first side 178 and at least first and second wheels, which can optionally be a second wheel assembly 182, on second side 179. At least one of the wheels on each side of the robot 114 can optionally be rotatable about a substantially vertical axis to permit turning of the robot, and in any embodiment the front and back wheels on each side of the robot can optionally be each rotatable about a substantially vertical axis to facilitate turning in a small radius and to permit the robot to rotate about a central vertical axis 183 of the robot. In any embodiment, at least some of the wheels on each side of the robot can optionally be rotated at least 90° to permit the robot to travel sideways. In any embodiment, at least one of the wheels on each side of the robot 114 can optionally be moved upwardly or downwardly, for example to accommodate the terrain encountered by the robot, to facilitate pickup of articles by the robot, to facilitate drop off of articles by the robot or any combination the foregoing. In any embodiment, a plurality of wheels on each side of the robot can optionally be so moved upwardly or downwardly. In any embodiment, all of the wheels on each side of the robot can optionally be so moved upwardly or downwardly. Such upward or downward movement of a wheel can be passive or active, for example controlled by a motor.

The robot 114 can optionally include at least one container 186, which can be referred to as a transport container and can optionally be at least one transport container 115, carried by the wheels of the robot, for example by first and second wheel assemblies 181, 182. In any embodiment, the at least one transport container 186 extends between the wheels on first side 178 and the wheels on second side 179, for example between first and second wheel assemblies 181, 182. The at least one transport container 186 can optionally be carried by a framework 187 of the robot 114, which can be referred to as a frame or chassis. In any embodiment, a cover 188 can optionally be carried by the framework 187 and extends over the top of the at least one transport container 186. In any embodiment, the cover 188 can optionally include a top portion 191, and a first side portion 192 and a second side portion 193 depending from the top portion 191 alongside the at least one transport container 186 on respective first and second sides 178, 179 of the robot 114. First and second fenders 196, 197 can optionally be provided and coupled to frame 187 for extending over respective first and second wheel assemblies 181, 182. In any embodiment, the first and second fenders 196, 197 can optionally be secured to the respective first and second wheel assemblies 181, 182.

Figure 7:
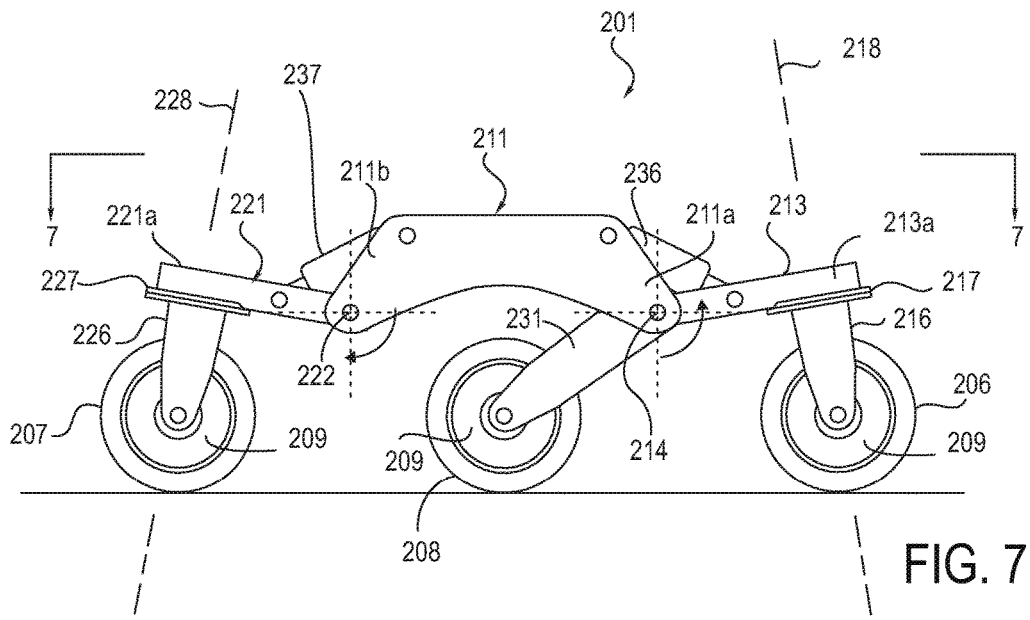
FIG. 7 is a side elevational view of one embodiment of a wheel assembly of the robot of FIG. 5
Figure 8:
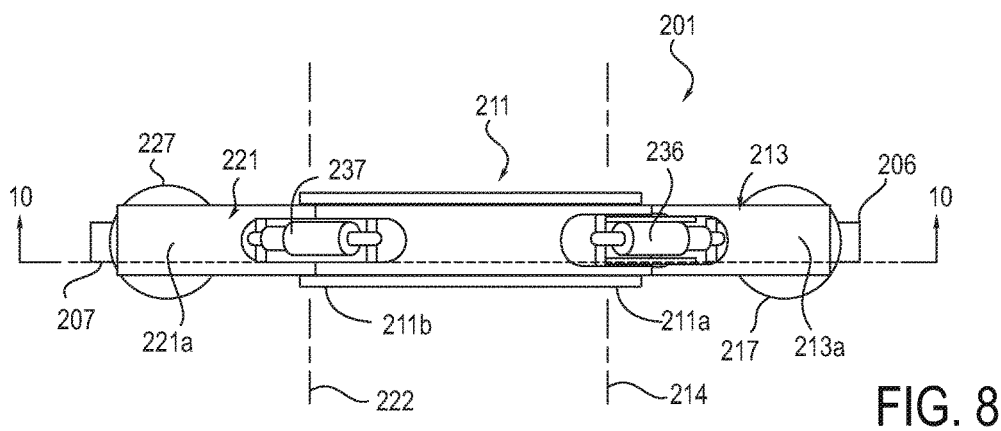
FIG. 8 is a top plan view of the wheel assembly of FIG. 7 taken along the line 7-7 of FIG. 7.

When first and second wheel assemblies 181, 182 are provided on robot 114, the wheel assemblies can be of any suitable type. In any embodiment, each of the wheel assemblies can optionally include three wheels that can optionally be each independently adjustable in height relative to frame 187 of the robot 114 (see FIGS. 7-8). Each such adjustment can optionally be active, for example by a motor, or passive. In any embodiment, the three wheels of each wheel assembly can optionally be each independently pivotable relative to frame 187, for example each independently pivotable about an axis extending perpendicular to first and second sides 178, 179 of the robot. In any embodiment, each of first and second wheel assemblies 181, 182 can optionally include a bogie 201 of any suitable type, which can optionally be coupled to frame 187. In any embodiment, each bogie 201 can optionally be pivotably coupled to frame 187 for pivoting about an axis 202. In any embodiment, each bogie 201 can optionally be a rocker-bogie system, or bogie assembly, for example similar to that disclosed in U.S. Pat. No. 4,840,394, the entire contents of which is incorporated herein by this reference.

In any embodiment, each bogie assembly 201 can optionally include a front wheel 206, a rear wheel 207 and a center wheel 208. Each bogie assembly 201 can optionally include a plurality of linkages or arms aligned orb disposed in a single plane. In any embodiment, the bogie assembly 201 of first wheel assembly 181 extends parallel to the bogie assembly 201 of the second wheel assembly 182. In any embodiment, each bogie assembly 201 can optionally include a center linkage 211, which can be referred to as a center element or member 211. The center linkage 211 can optionally include a first end 211a and a second end 211b. A front linkage, element or arm 213 can optionally be pivotably coupled, for example passively, to first end 211a of the center linkage 211 for pivoting about front pivot axis 214 so as to pivotably couple front wheel 206 to the front linkage. Such pivoting of the front wheel 206 can permit the wheel 206 to be independently moved upwardly or downwardly, for example with respect to center linkage 211. Front wheel 206 can optionally be rotatably coupled to free end 213a of front linkage 213 by a front fork 216 that can optionally be pivotably or rotatably coupled to free end 213a, for example by means of a pivot assembly 217. The pivot assembly permits fork 216 and thus front wheel 206 to pivot about a substantially vertical axis 218, which can be referred to as front steering axis 218, that extends perpendicular to pivot axis 214. Pivot assembly 217 can be of any suitable type, and can optionally include pins, bearings, gears or any combination of the foregoing. In any embodiment, the pivot assembly 217 can optionally include first and second elements or disks that can optionally be pivotably or rotatably coupled together in any suitable manner, for example with the first disk secured to the front linkage 213 and the second disc secured to the front fork 216. Pivot assembly 217 can optionally include a motor 219 (see FIG. 22), for example an electric motor controlled by robot computer 156 or another aspect of computer network 136, for selectively pivoting front fork 216 and thus front wheel 206 to permit steering and other desired movement of the robot 114. For example, the motor can serve to rotate the second disk relative to the first disk. The front wheel 206 can optionally be rotatable about the free end of the fork 216. In any embodiment, free end 213a of front linkage 213 can optionally be inclined slightly upwardly in its home position so that the free or lower end of front fork 216 can optionally be inclined forwardly at a slight angle relative to vertical, for example at an angle of less than 20° from vertical (see FIG. 7). In any embodiment, front linkage 213 can optionally be not inclined upwardly but instead extend horizontally in its home position so that front fork 216 extends downwardly in a vertical direction (see FIG. 12). The front linkage 213 can be inclined at any suitable angle relative to vertical.

A rear linkage, element or arm 221 can optionally be pivotably coupled, for example passively, to second end 211b of the center linkage 211 for pivoting about rear pivot axis 222 so as to pivotably couple rear wheel 207 to the center linkage. Rear wheel 207 can optionally be rotatably coupled to free end 221a of rear linkage 221 by a rear fork 226 that can optionally be pivotably or rotatably coupled to free end 221a by means of a pivot assembly 227. The pivot assembly permits fork 226 and thus rear wheel 207 to pivot about a substantially vertical axis 228, which can be referred to as rear steering axis 228, that extends perpendicular to pivot axis 222. Such pivoting of the rear wheel 207 can permit the wheel 207 to be independently moved upwardly or downwardly, for example with respect to center linkage 211. Pivot assembly 227 can be of any suitable type, and can optionally include pins, bearings, gears or any combination of the foregoing. In any embodiment, the pivot assembly 227 can optionally be substantially identical to pivot assembly 217. In this regard, for example, a first disk can optionally be secured to the rear linkage 221 and the second disc can optionally be secured to the rear fork 226. Pivot assembly 227 can optionally include a motor 229 (see FIG. 22), for example an electric motor controlled by robot computer 156 or another aspect of computer network 136, for selectively pivoting rear fork 221 and thus rear wheel 207 to permit steering and other desired movement of the robot 114. The rear wheel 207 can optionally be rotatable about the free end of the fork 226. In any embodiment, free end 221a of rear linkage 221 can optionally be inclined slightly upwardly in its home position so that the free or lower end of the rear fork 226 can optionally be inclined rearwardly at a slight angle relative to vertical, for example at an angle of less than 20° from vertical (see FIG. 7). In any embodiment, rear linkage 221 can optionally be not inclined upwardly but instead extends horizontally in its home position so that rear fork 226 extends downwardly in a vertical direction (see FIG. 12). The rear linkage 221 can be inclined at any suitable angle relative to vertical.

A center arm 231, which can be referred to as an elbow 231, can optionally be pivotably coupled to first end 211a of the center linkage 211 for pivoting about front pivot axis 214 so as to pivotably couple center wheel 208 to the center linkage of the bogie 201. The center arm or elbow 231 can optionally be pivotable relative to the front linkage 213 about front pivot axis 214. Such pivoting of the center wheel 208 can permit the wheel 208 to be independently moved upwardly or downwardly, for example with respect to center linkage 211. The center wheel 208 can optionally be rotatably coupled to the free end of the center arm or elbow 231. In any embodiment, bogie pivot axis 202, front pivot axis 214 and rear pivot axis 222 extend parallel to each other and perpendicular to central vertical axis 183. The linkages, arms or members of bogie 201 can be made from any suitable material such as metal, steel, aluminum, plastic or any combination of the foregoing.

In any embodiment, a first or front spring 236, which can optionally be a combination spring and damper, has one end pivotably coupled to center arm or elbow 231 and a second end pivotably coupled to front linkage 213 for inhibiting the pivot of the center arm 231 relative to the front linkage 213. In any embodiment, a second or rear spring 237, which can optionally be a combination spring and damper, has one end pivotably coupled to center linkage 211 and a second end pivotably coupled to rear linkage 221 for inhibiting the pivot of the rear linkage 221 relative to the center linkage 211. The dimensions of springs 236, 237 and the locations at which the ends thereof are coupled to the respective components of bogie 201 determine the angle at which the respective fork 216, 226 extends relative to vertical.

In any embodiment, the pivoting of any or all of front linkage 213, rear linkage 221 and center arm 231 relative to center linkage 211 can optionally be controlled by one or more motors (not shown), for example a separate motor with respect to each of front linkage 213, rear linkage 221 a center arm 231, for controlling the height of the respective wheels 206, 207 and 208 relative to the bogie 201. Such controlled elevational adjustment of one or more of wheels 206, 207, 208 can facilitate the travel of robot 114 over uneven terrain, can facilitate the pickup or delivery of articles by robot 114 or both. For example, such active controlling of any or all of wheels 206, 207 and 208 permits a wheel to be picked up or elevated on demand, including autonomously, which can permit or facilitate such wheel stepping over objects such as potholes or objects in the path of robot 114. In any embodiment, one or more wheels of the robot, for example one or more of wheels 206, 207 and 208 of a bogie 201, can optionally be moved upwardly or downwardly for translating the at least one container 186 carried by robot 114 in one or more orthogonal directions, for pivoting the at least one container in one or more orthogonal directions or a combination the foregoing. In any embodiment, the motorized pivoting of any or all of front linkage 213, rear linkage 221 and center arm 231 relative to center linkage 211 can optionally be provided for this purpose.

At least one of the wheels of the robot 114 can optionally be driven by a motor controlled by robot computer 156 or another aspect of computer network 136, or motorized, for moving the robot. In any embodiment, at least one of the wheels on each side 178, 179 of the robot can optionally be driven by such a motor, or motorized. In any embodiment, a plurality of wheels on each side of the robot can optionally be driven by such a motor, or motorized. In any embodiment, all of the wheels on each side of the robot can optionally be driven by such a motor, or motorized. For example, at least front and rear wheels 206, 207 of each bogie 201 can optionally be driven by such a motor, or motorized. In any embodiment, each of wheels 206, 207 and 208 of each bogie can optionally be driven by such a motor, or motorized. The foregoing motors can each be of any suitable type, for example an electric motor. In any embodiment, each of wheels 206, 207 and 208 can optionally be internally powered by an electric motor 209, for example a hub motor, a scooter hub motor, a wheel motor, a wheel hub drive or an in-wheel motor of any suitable type, controlled by robot computer 156 or another aspect of computer network 136.

Figure 9:
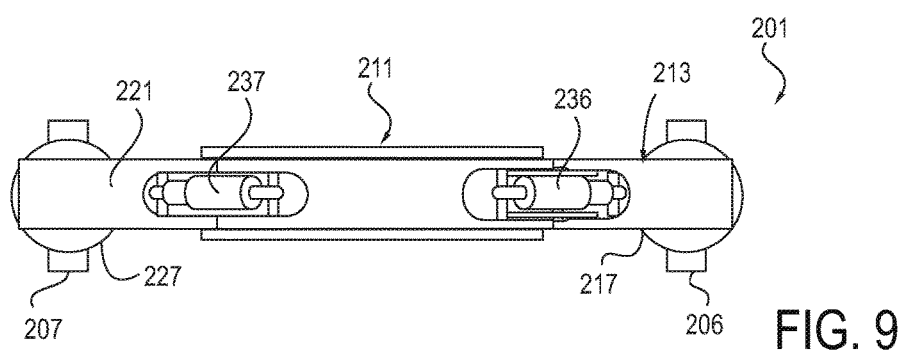
FIG. 9 is a top plan view, similar to FIG. 8, with the front and rear wheels of the wheel assembly in a second position.
Figure 10:
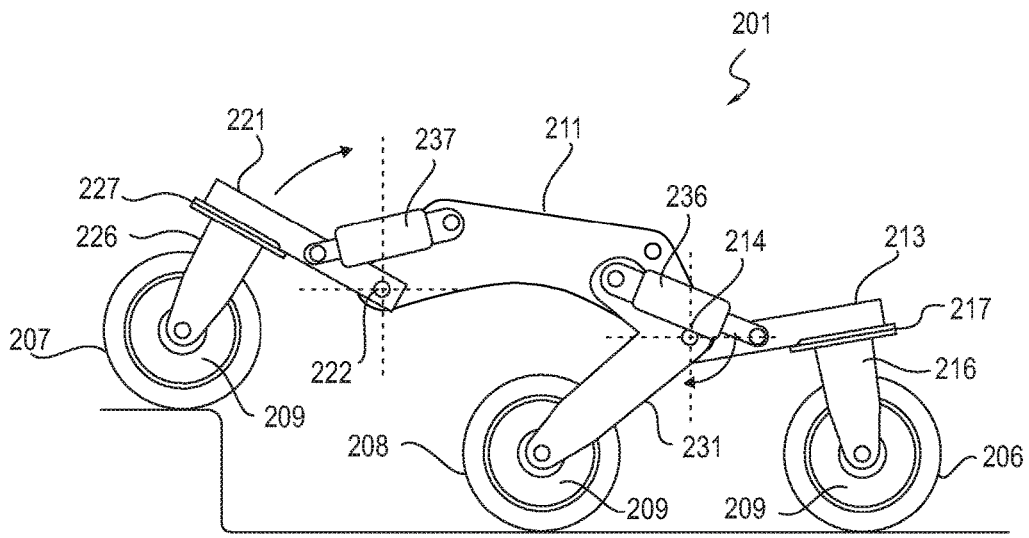
FIG. 10 is a cross sectional view of the wheel assembly of FIG. 7, taken along the line 10-10 of FIG. 8, in a third position.
Figure 11:
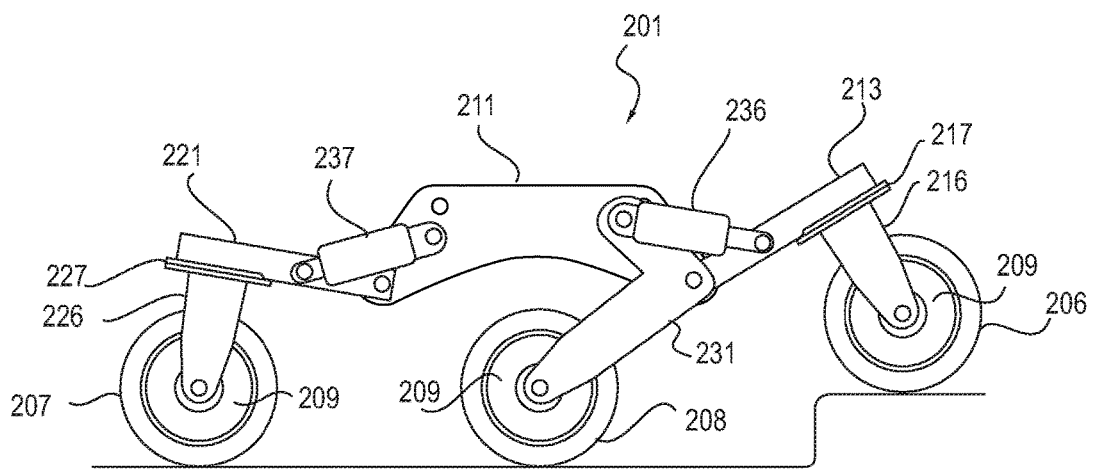
FIG. 11 is a cross sectional view of the wheel assembly of FIG. 7, similar to FIG. 10 but illustrating the wheel assembly in a fourth position.

First and second wheel assemblies 181, 182 facilitate robot 114 navigating uneven terrain, including bumps, steps, curbs, potholes, inclines and declines. In this regard, each wheel of a bogie 201 can optionally be independently pivotable, either passively or actively, relative to the other wheels of the bogie. As illustrated in FIG. 9, rear wheel 207 of a bogie 201 can easily negotiate a step or curb by rear linkage 221 pivoting upwardly relative to center linkage 221 about rear axis 222, the center linkage pivoting upwardly relative to elbow 231 and front linkage 213 about front pivot axis 214 or a combination the foregoing. As illustrated in FIG. 10, front wheel 206 of a bogie 201 can easily negotiate a step or curb by front linkage 213 pivoting upwardly relative to center linkage 221, elbow 231 or both about front axis 214, the center linkage pivoting upwardly relative to rear linkage 221 about rear pivot axis 222 or any combination the foregoing. Such pivoting can be passive, as permitted by the embodiment illustrated in FIGS. 10-11, or can be active, when motors as discussed above are included in wheel assemblies 181, 182.

Bogies 201 of first and second wheel assemblies 181, 182 facilitate all of the wheels of each of the wheel assemblies remaining in contact with the ground so as to directional control of robot 114 and thus the navigation of the robot easier. At least some of the wheels in each of the wheel assemblies 181,182 can optionally be rotated to permit the robot 114 to rotate about central vertical axis 183. At least some of the wheels in each of the assemblies 181, 182 can optionally be rotated at least 90° to permit the robot to travel sideways. In any embodiment, front wheel 206 and rear wheel 207 of each assembly 181, 182 can optionally be rotated 90° to permit the robot 114 to travel sideways, for example in a direction perpendicular to forward or rearward travel of the robot (see FIG. 9).

The least one container 186 can optionally be coupled to the wheel of robot 114 in any suitable manner. In any embodiment, the at least one container 186 can optionally be coupled to the wheels of robot 114 in any suitable manner which permits the at least one container 186 to be moved upwardly and downwardly relative to such wheels. In any embodiment, the at least one container 186 can optionally be coupled to the wheels of robot 114 in any suitable manner which permits the at least one container 186 to be pivoted about a first horizontal axis relative to such wheels. In any embodiment, the at least one container 186 can optionally be coupled to the wheels of robot 114 in any suitable manner which permits the at least one container 186 to be pivoted about a second horizontal axis, orthogonal to the first horizontal axis, relative to such wheels. Any combination of the foregoing can be provided. In any embodiment, the at least one container 186 can optionally be pivoted about three orthogonal axes and translated along such three orthogonal axes. The wheels of the robot 114 can in any embodiment include first and second wheel assemblies 181, 182.

In any embodiment, an attachment assembly 249 of any suitable type can optionally be provided for coupling the at least one container 186 to the wheels of robot 114, for example first and second wheel assemblies 181, 182. In any embodiment, the attachment assembly 249 can optionally include at least one translational adjustment mechanism, which can be referred to as an elevational adjustment mechanism, for coupling the at least one container 186 to the wheels of robot 114 for permitting the at least one container 186 to be moved upwardly and downwardly relative to such wheels. In any embodiment, the attachment assembly can optionally include a first translational adjustment mechanism for coupling one side of the at least one container 186 to the wheels on one side of robot 114 and a second translational adjustment mechanism for coupling the other side of the least one container 186 to the wheels on the other side of the robot 114, each of which mechanisms can be referred to as an elevational adjustment mechanism.

Figure 14:
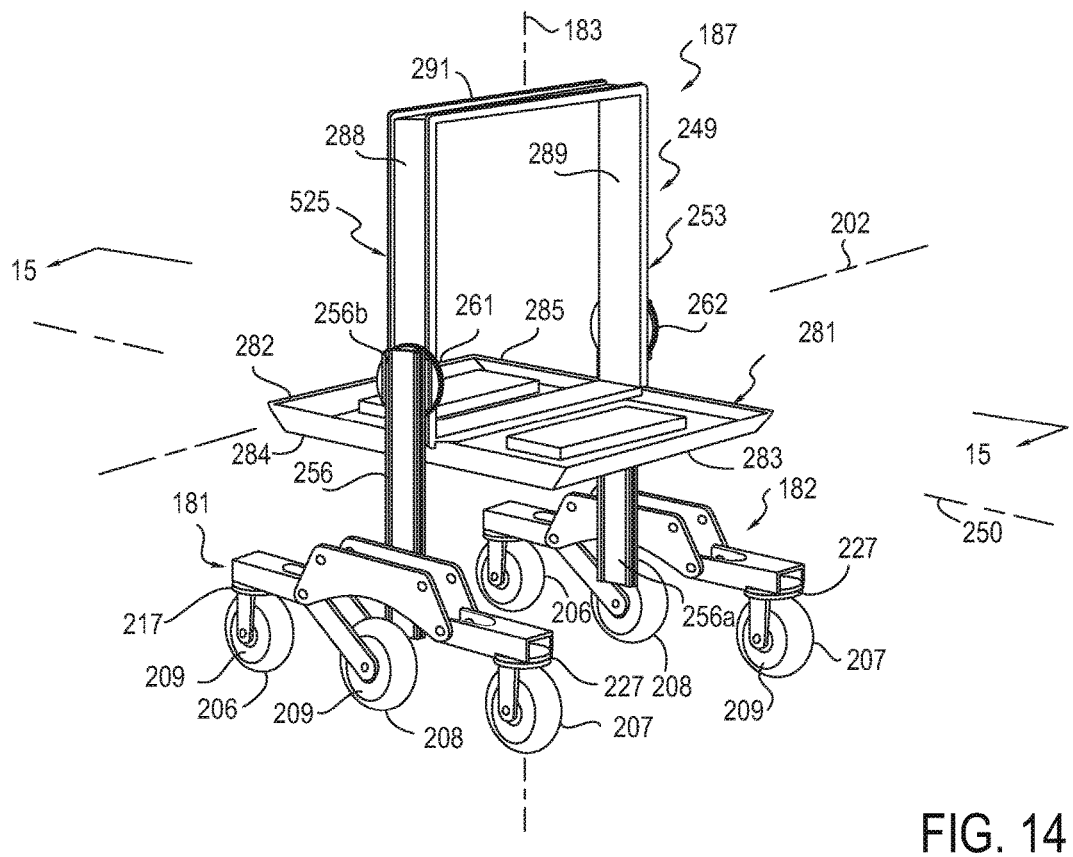
FIG. 14 is a perspective view of the chassis of FIG. 12 in a second position relative to the wheel assemblies.
Figure 15:
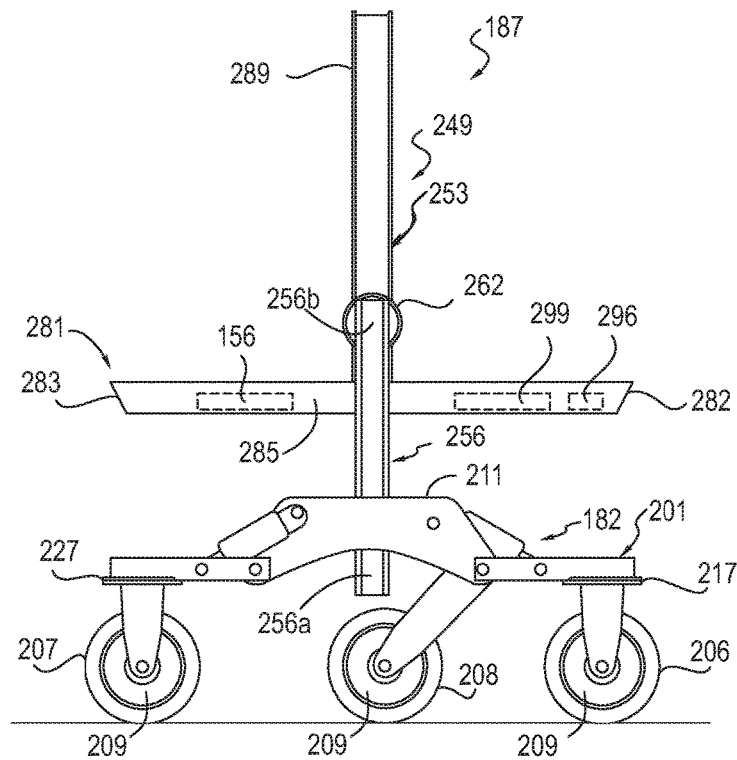
FIG. 15 is a side elevational view of the chassis and wheel assemblies of FIG. 12 taken along the line 15-15 of FIG. 14.
Figure 16:
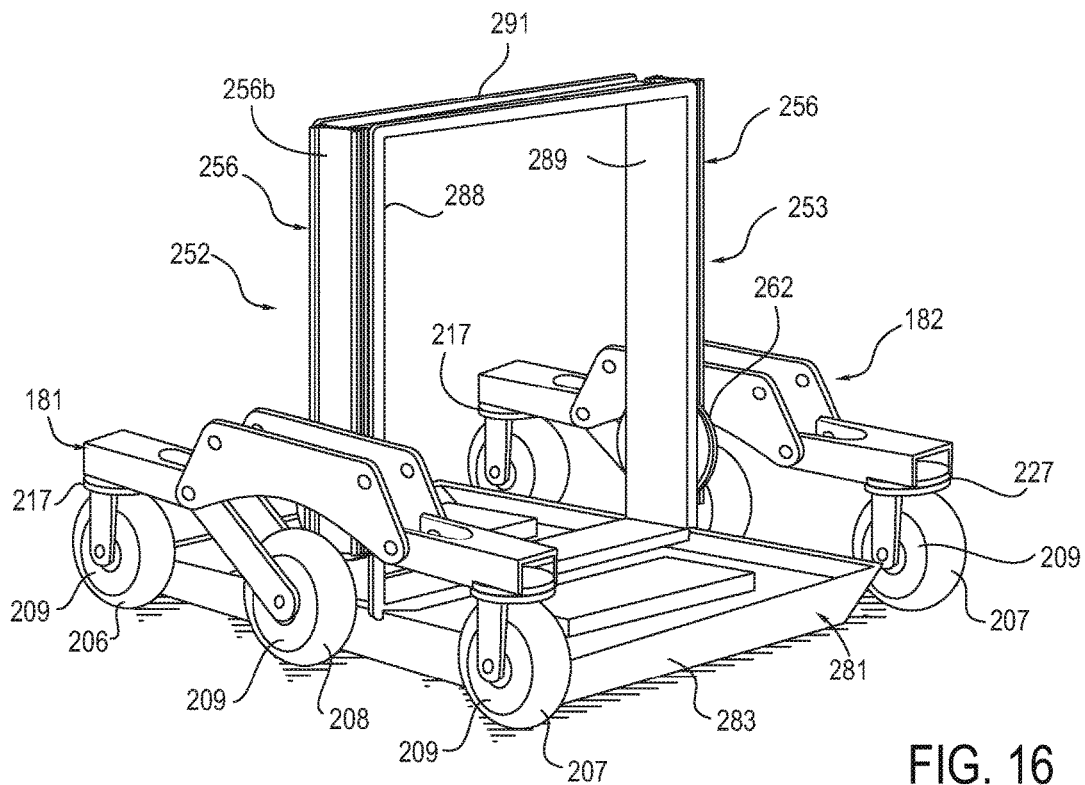
FIG. 16 is a perspective view of the chassis of FIG. 12 in a third position relative to the wheel assemblies.
Figure 19:
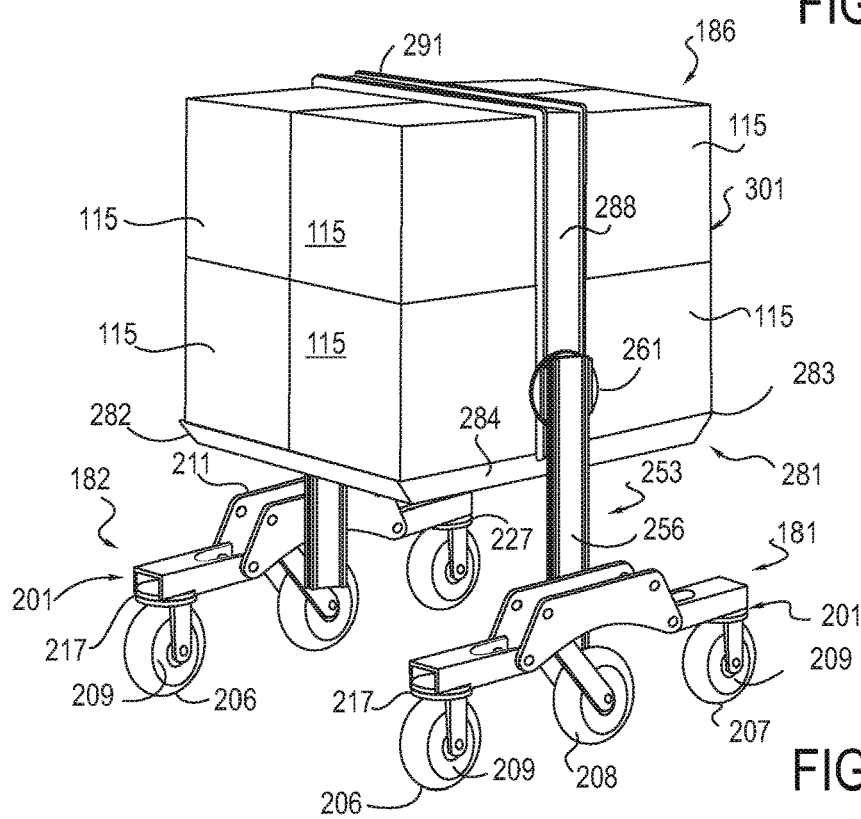
FIG. 19 is a perspective view of the chassis and wheel assemblies of FIG. 12, in the second position of FIG. 14, with at least one container carried thereby.
Figure 20:
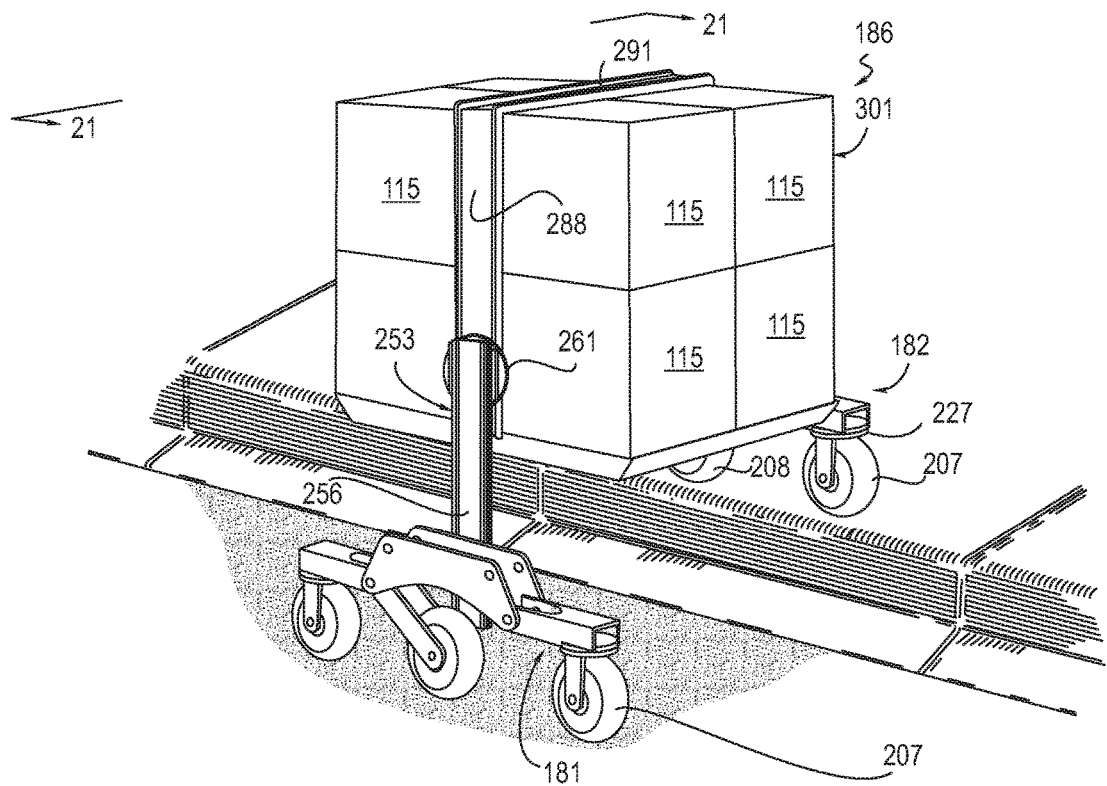
FIG. 20 is a perspective view of the chassis, wheel assemblies and at least one container of FIG. 19 in a sixth position.
Figure 21:
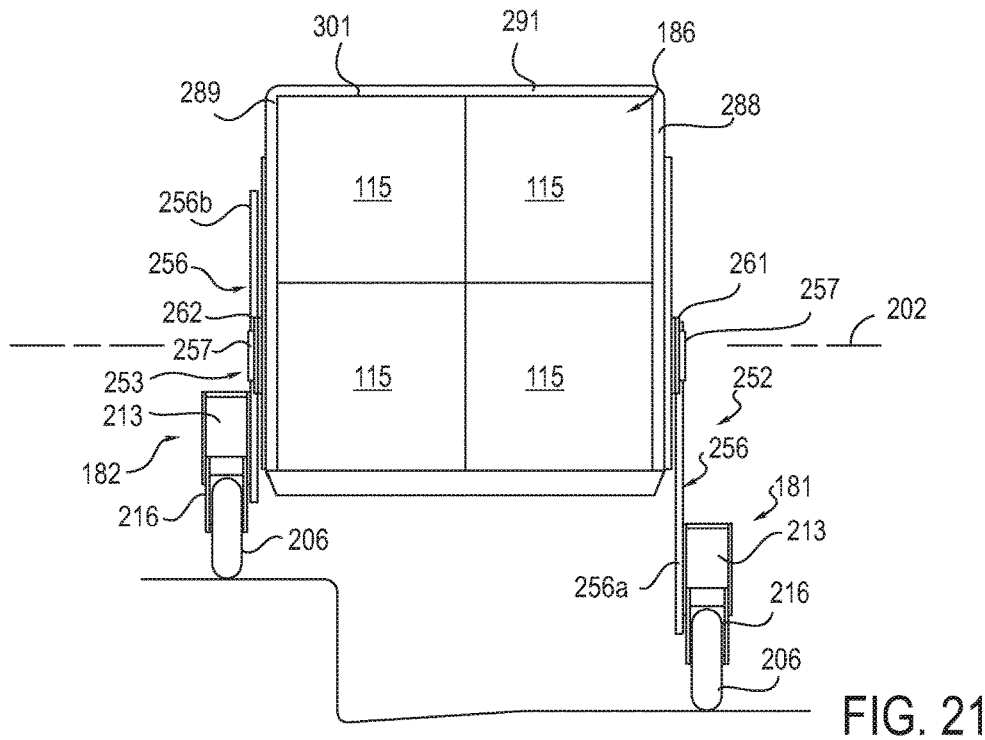
FIG. 21 is an end elevational view of the chassis, wheel assemblies and at least one container of FIG. 19 taken along the line 21-21 of FIG. 20.

Each translation mechanism can serve to adjust the vertical height of the respective side of the at least one container 186 with respect to the related wheel assembly 181, 182 (see FIGS. 19-21). Raising and lowering the at least one container 186 can occur by translating each side of the at least one container in unison. Relative translational movement of the opposite sides of the least one container 186 by such first and second translational adjustment mechanisms can pivot the at least one container 186 about an axis extending orthogonal to the ends of the at least one container 186, for example an axis 250 extending orthogonal to the plane of the first and second translational adjustment mechanisms (see FIG. 14). In any embodiment, the location of axis 250 with respect to the at least one container 186 is dependent upon the amount of relative translational movement between such translation mechanisms and the amount of translational movement of each mechanism.

In any embodiment, the attachment assembly 249 can optionally include a first translational adjustment mechanism 252 secured to first wheel assembly 181 and a second translational adjustment mechanism 253 secured to second wheel assembly 182. The first mechanism 252 can optionally be coupled to first side of the at least one container 186 and the second mechanism 253 can optionally be coupled to the second side of the at least one container 186. In any embodiment, chassis 187 can optionally be included in attachment assembly 249 and first mechanism 252 can optionally be coupled to a first side of the chassis 187 and second mechanism 253 can optionally be coupled to a second side of the chassis 187. Each of mechanisms 252, 253 can be of any suitable type and can optionally include one or more slidable rails or slides, one or more telescoping rails or slides, bearings, gears, pulleys, chains or any combination of the foregoing. The components of mechanisms 252, 253 can be made from any suitable material such as metal, steel, aluminum, plastic or any combination of the foregoing.

In any embodiment, each of the mechanisms can optionally include a rail 256 having a first or lower end 256a joined to the respective wheel assembly 181, 182 and a second or upper end 256b extending upwardly and free of the wheel assembly. One or more rails can optionally be slidably carried by the rails 256, for example one or more telescoping slides, for adjusting the amount of vertical extension permissible by mechanisms 252, 253. In any embodiment, a slide 257 can optionally be slidably carried by rail 256 in any suitable manner for upward and downward movement on the rail 256. A motor 258, for example an electric motor, can optionally be provided for causing controlled extension and contraction of the mechanism 252, 253, for example translating or moving slide 257, or multiple telescoping slides, on rail 256 and thus moving the respective side of the chassis upwardly or downwardly relative to the respective wheel assembly. Such motor 258 can optionally be controlled by robot computer 156 or another aspect of computer network 136 (see FIG. 22).

In any embodiment, the attachment assembly 249 can optionally include a first pivot assembly for coupling one side of the at least one container 186 to the wheels on one side of vehicle 114 and a second pivot assembly for coupling the other side of the least one container 186 to the wheels on the other side of the robot 114. Such pivot assemblies can permit, and in any embodiment can cause, the least one container 186 to pivot about an axis extending perpendicular to the opposite sides of the at least one container. In any embodiment, the pivot assemblies pivot each side the at least one container 186 in unison during such pivoting about the axis. Such pivot assemblies can optionally be controlled by robot computer 156 or another aspect of computer network 136. Such axis extending perpendicular to the upsides of the least one container 186 can be axis 202 (see FIG. 14).

In any embodiment, chassis 187 can optionally be included in attachment assembly 249 and a first pivot assembly 261 can optionally be provided to pivotably couple slide 257 of the first mechanism 252 to the first side of the chassis 187 and a second pivot assembly 262 can optionally be provided to pivotably couple slide 257 of the second mechanism 253 to the second side of the chassis 187. Each of the pivot assemblies 261, 262 can be of any suitable type, and can optionally include pins, bearings, gears or any combination of the foregoing. The components of pivot assemblies 261, 262 can be made from any suitable material such as metal, steel, aluminum, plastic or any combination of the foregoing. Each of the pivot assemblies can optionally include a motor 263 controlled by robot computer 156 or another aspect of computer network 136 (see FIG. 22), for example an electric motor, for pivoting the respective side of the chassis about such axis extending perpendicular to the opposite sides of the at least one container 186.

Frame or chassis 187 can be of any suitable type and serves to support the at least one container 186 on the wheels of the robot 114, which can optionally be first and second wheel assemblies 181, 182, and throughout the various movements of the at least one container 186 relative to the wheels of the robot 114. In any embodiment, the chassis 187 serves to position at least one end of the at least one container 186 at one end 176 or 177 of the robot 114. Such end of the least one container can optionally be parallel to such end of the robot, and in any embodiment such end of the least one container 186 can optionally be flush with such end of the robot 114. In any embodiment, the chassis 187 services to position opposite ends of the at least one container with opposite ends 176, 177 of the robot 114. Such opposite ends of the at least one container 186 can optionally be parallel to such opposite ends of the robot, and in any embodiment such opposite ends of the at least one container can optionally be flush with such opposite ends of the robot 114.

In any embodiment, the chassis 187 can optionally include a base or support 281 on which the at least one container 186 rests. The base 281 can optionally include a first end 282 and an opposite second end 283 and a first side 284 and an opposite second side 285 extending between ends 282, 283. The base can be of any shape and in any embodiment can optionally be rectangular in shape when viewed in plan, and can have a rectangular size and shape that approximately corresponds with the bottom of the at least one container 186. The chassis 187 can optionally include additional structural elements of any suitable type for inhibiting movement of the least one container 186 on the base 281, and in any embodiment for securing the at least one container 186 to the base. In any embodiment, such structural elements include first and second side wall elements 288, 289, which can be referred to as sidewalls 288, 289, secured to and extending upwardly from respective sides 284, 25 of the base 281. The distance between the sidewalls 288, 289 can approximate the width of the at least one container 186, and in any embodiment the length or height of each of the sidewalls 288, 289 approximates the height of the least one container 186. An optional top wall element 291, which can be referred to as top wall 291, extends between and can optionally be secured to the tops of the first and second sidewalls 288, 289. The at least one container 186 can optionally be removably secured to chassis 187 by any suitable means such as bolts, screws, clamps or other fasteners, for example fasteners extending through base 281, sidewalls 288, 289 or both into the least one container 186. In any embodiment, first and second pivot assemblies 261, 262 can optionally be secured to respective first and second sidewalls 288, 289 of the chassis 187 for permitting pivoting of the chassis 187 and the at least one container 186 relative to the first and second translational adjustment mechanism 252, 253. In this manner, controlled pivoting of the assemblies 261, 262 in unison pivots or tilts the chassis 187 and the at least one container 186 carried thereby about axis 202. The pivot assemblies 261, 262, and pivot axes 202 thereof, travel upwardly and downwardly on rails 256 with the travel of the slides 257 on the rails 256. The components of chassis 187 can be made from any suitable material such as metal, steel, aluminum, plastic or any combination of the foregoing.

Robot 114 can optionally include a first mechanism for causing the at least one container 186 to translate along a first axis, a second mechanism for causing the at least one container 186 to translate along a second axis orthogonal to the first axis, a third mechanism for causing the least one container 186 to translate along a third axis orthogonal to the first and second axes, or any combination of the foregoing, for example during pickup or delivery of an article by the robot 114, during travel of the robot 114 or otherwise. Such mechanisms can optionally be controlled by robot computer 156 or another aspect of computer network 136. Examples of such orthogonal axes includes axes 183, 202 and 250, illustrated in FIG. 14. Each of such mechanisms can be referred to as a positioning mechanism, a translation mechanism, an apparatus, a positioning apparatus, a translation apparatus, a device, a positioning device, a translation device, an assembly, a positioning assembly or a translation assembly, and can each include motorized or non-motorized wheels, rails, slides, pins, bearings, gears, pulleys, chains, cables or any combination the foregoing. One or more of the foregoing for causing the at least one container 186 to translate in three orthogonal directions can be referred to as a three orthogonal axes adjustment, positioning or translation mechanism or first mechanism, a three orthogonal axes adjustment, positioning or translation apparatus or first apparatus or a three orthogonal axes adjustment, positioning or translation assembly or first assembly. For example, one or more wheels of the robot 114 can optionally be motorized, for example wheels 206, 207 and 208 of each bogie 201, and included in the foregoing. In any embodiment, one or more such wheels can optionally be coupled to a motorized pivoting assembly of any suitable type, for example pivot assemblies 217, 227, and included in the foregoing for translating the at least one container 186 along orthogonal first and second axes. In any embodiment, one or more wheels of the robot, for example one or more of wheels 206, 207 and 208 of one or both of bogies 201, can optionally be moved upwardly or downwardly by the motorized pivoting of any or all of front linkage 213, rear linkage 221 and center arm 231 relative to center linkage 211, and included in the foregoing for translating the at least one container 186 along at least one axis. Any pivot assembly included in the foregoing can be of any suitable type, and can be referred to as a pivoting or rotating mechanism, a pivoting or rotating apparatus, a pivoting or rotating device or a rotating assembly, and can optionally include pins, bearings, gears or any combination of the foregoing. In any embodiment, one or both of translational mechanisms 252, 253 can optionally be included in the foregoing.

Examples of translation of chassis 187, and thus the at least one container 186 carried by the base 281 of the chassis, along vertical axis 183 are shown in FIGS. 12 and 14-16. Chassis 187 is shown in a first position in FIG. 12, which for example can be a position suitable during travel of robot 114 and referred to as a home position of the chassis. Chassis 187 is shown in a second position in FIGS. 14-15, where the chassis has been elevated by first and second translation adjustment mechanisms 252, 253 with respect to the first or home position of FIG. 12. Chassis 187 is shown in a third position in FIG. 16, where the chassis has been lowered by first and second translation adjustment mechanisms 252, 253 with respect to the first or home position of FIG. 12. In the illustrated third position of FIG. 16, chassis 187 is shown resting on or in close proximity to the ground. Each of such first, second and third positions can be referred to as horizontal positions. First and second translation adjustment mechanisms 252, 253 move each side 284, 285 of the base 281 in unison for moving the chassis 187 between such positions.

Robot can optionally include a first mechanism for causing the at least one container 186 to pivot about a first axis, a second mechanism for causing the at least one container 186 to pivot about a second axis orthogonal to the first axis, a third mechanism for causing the at least one container 186 to pivot about a third axis orthogonal to the first and second axes, or any combination of the foregoing, for example during pickup or delivery of an article by the robot 114, during travel of the robot 114 or otherwise. Such mechanisms can optionally be controlled by robot computer 156 or another aspect of computer network 136. Examples of such orthogonal axes includes axes 183, 202 and 250, illustrated in FIG. 14. Each of such mechanisms can be referred to as a pivoting or rotating mechanism, a pivoting or rotating apparatus, a pivoting or rotating device or a rotating assembly, and can optionally include motorized or non-motorized wheels, rails, slides, pins, bearings, gears, pulleys, chains, cables or any combination the foregoing. One or more the foregoing for causing the at least one container 186 to pivot about three orthogonal axes can be referred to as a three orthogonal axes pivot or rotation mechanism or second mechanism, a three orthogonal axes pivot or rotation apparatus or second apparatus or a three orthogonal axes pivot or rotation assembly or second assembly. For example, one or more wheels of the robot 114 can optionally be motorized, for example wheels 206 and 208 of each bogie 201, and can optionally include a pivot assembly, for example pivot assemblies 217, 227, for pivoting the at least one container 186 about an axis, such as axis 183, and included in the foregoing. In any embodiment, one or more wheels of the robot, for example one or more of wheels 206, 207 and 208 of one or both of bogies 201, can optionally be moved upwardly or downwardly by the motorized pivoting of any or all of front linkage 213, rear linkage 221 and center arm 231 relative to center linkage 211, and included in the foregoing for pivoting the at least one container 186 about at least one axis, for example one or both of axes 202 and 250. Such mechanism can optionally include for example translation mechanisms 252, 253, which for example can rotate the at least one container 186 about axis 250. Any pivot assembly included in the foregoing can be of any suitable type, and can be referred to as a pivoting or rotating mechanism, a pivoting or rotating apparatus, a pivoting or rotating device or a rotating assembly, and can optionally include pins, bearings, gears or any combination of the foregoing. In any embodiment, a plurality of mechanisms, each of which can be referred to as a positioning mechanism, a translation mechanism, an apparatus, a positioning apparatus, a translation apparatus, a device, a positioning device, a translation device, an assembly, a positioning assembly or a translation assembly and can optionally include motorized or non-motorized wheels, rails, slides, pins, bearings, gears, pulleys, chains, cables or any combination the foregoing, can optionally be provided for rotating the at least one container 186 about an axis.

Figure 12:
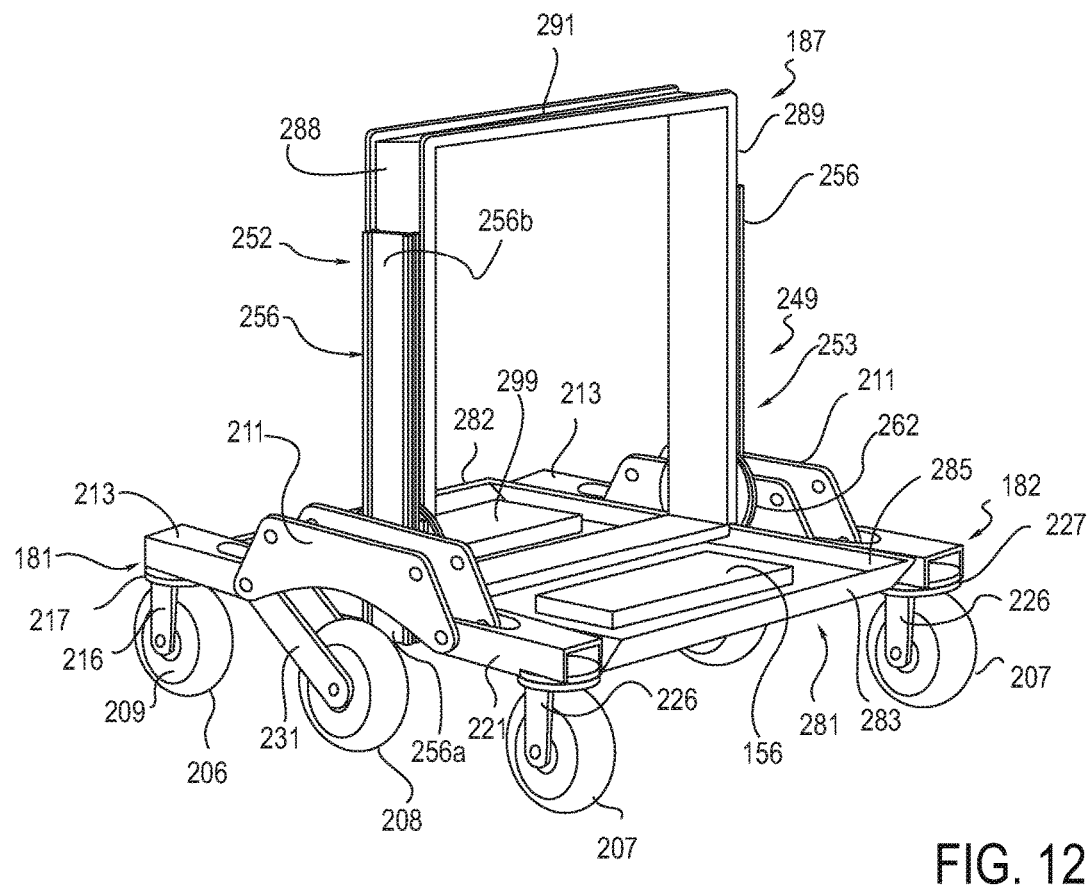
FIG. 12 is a perspective view of one embodiment of a chassis of the robot of FIG. 5 in a first position relative to the wheel assemblies of the robot.
Figure 13:
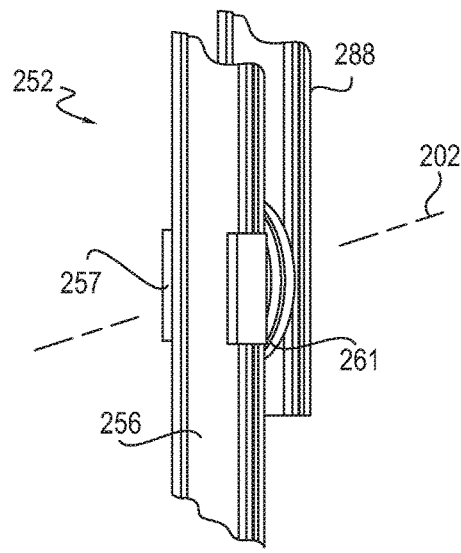
FIG. 13 is an enlarged view of a portion of the chassis of FIG. 12.
Figure 17:
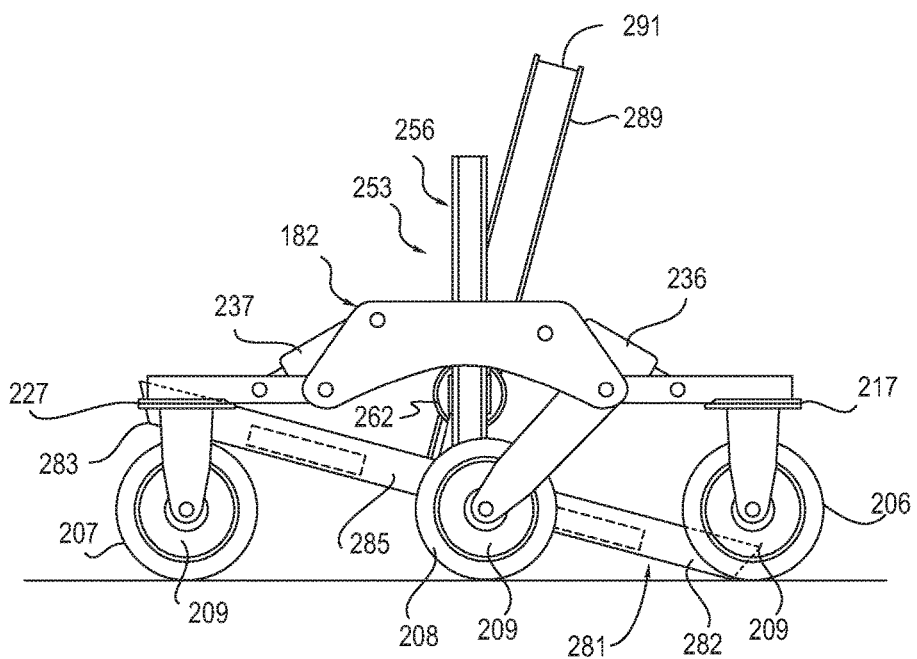
FIG. 17 is a side elevational view of the chassis of FIG. 12 in a fourth position relative to the wheel assemblies.
Figure 18:
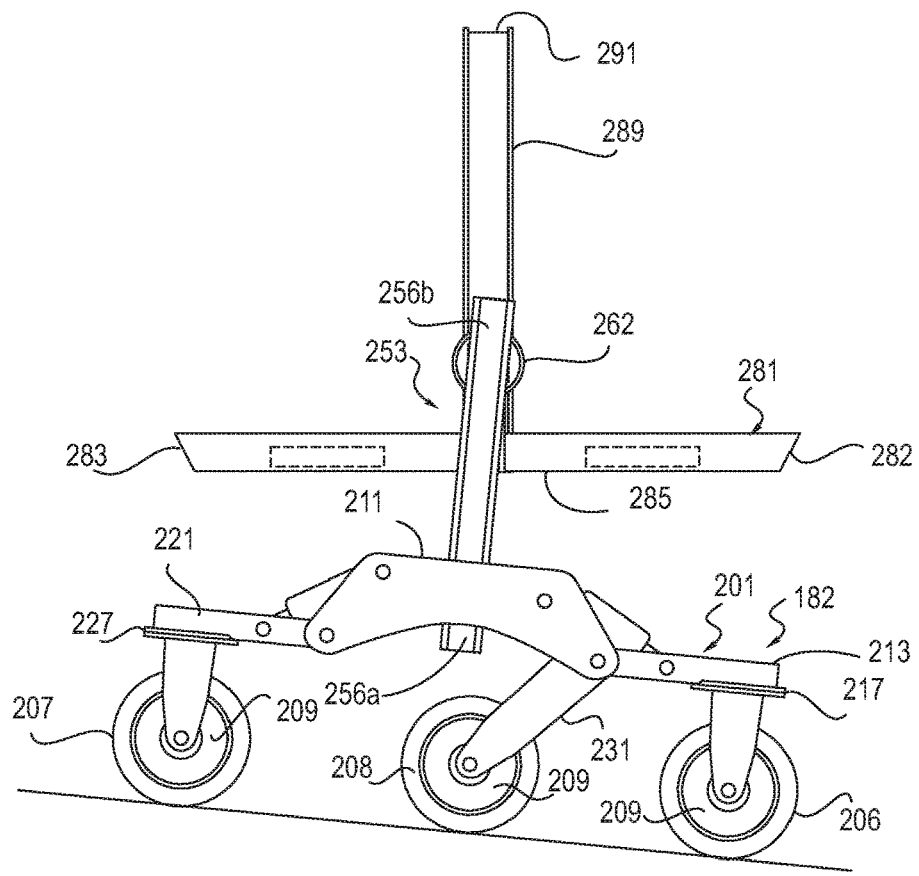
FIG. 18 is a side elevational view of the chassis of FIG. 12 in a fifth position relative to the wheel assemblies.

Examples of the pivoting of chassis 187, and thus the at least one container 186 carried by base 281 of the chassis, along horizontal axis 202 are shown in FIGS. 12 and 17-18. Chassis 187 is shown in a first position in FIG. 12, and in a second position in FIG. 17 where the base 281 has been pivoted by first and second pivot assemblies 261, 262 so that the second end 282 of base 281 has been tilted downwardly so as to approach if not contact the ground. Chassis 187 is shown in a third position in FIG. 18, where the chassis has been pivoted to a level position while robot 114 is traveling on an incline. Each of such second and third positions can be referred to as pivoted or tilted positions. First and second pivot assemblies 261, 262 pivot each side 284, 285 of the base 281 in unison for pivoting the chassis 187 between such positions.

Robot 114 can optionally include one or more sensors 162 of any suitable type, including for example one or more vision or other cameras, one or more lidar devices or sensors, one or more sonar devices or sensors, one or more radar devices or sensors, one or more near infrared (NIR) devices or sensors, an inertial measurement unit (IMU) device or sensor or any combination of the foregoing. In any embodiment, the robot 114 can optionally include a camera on each end 176, 177 and each side 178, 179 of the robot (see FIGS. 5-6). For example, a stereo camera 293, that can optionally be a camera with two or more lenses, can optionally be provided on each end 176, 177 of the robot 114, for example on each end of cover 188. A wide field-of-view camera 294 can optionally be provided on each end 176, 177 and on each side 178, 179 of the robot, for example on each end and on each side of cover 188. In any embodiment, the camera 294 can optionally be between the two lenses of stereo camera 293 on ends 176, 177 of the robot 114. In any embodiment, sensors 162 can optionally include a radar device or sensor (not shown) provided on each end 176, 137 and each side 178, 179 of the robot 114. At least one IMU sensor or device 296 can optionally be included on robot 114, including in sensors 162 of the robot. In any embodiment, device 296 can optionally be carried on chassis 187, for example on base 281 of the chassis (see FIG. 15). Sensors 162 can optionally include a suitable odometry sensor provided on or with respect to each wheel of robot 114, including for example on or with respect to each of wheels 206, 207 and 208 of each bogie 201, for sensing motion of each of the wheels (see FIG. 22). Sensors 162 can optionally include a suitable angular or other position sensor (not shown), which can be referred to as a rotary sensor, provided on each joint or linkage or movable member of robot 114, including for example center linkage 211, front linkage 213, rear linkage 221, center arm or elbow 231, pivot assemblies 217, pivot assemblies 227, slides 257 of each transverse adjustment mechanism 251, 253, pivot assemblies 261, 262, chassis 187, container doors 321, container belts 336, or any combination of the foregoing.

The sensors 162 can optionally be electrically coupled to robot computer 156, either directly or indirectly, so that the signals therefrom can optionally be utilized by robot computer 156 and computer network 136 in the operation of system 113, including the operation of robot 114, pickup container 116 and recipient container 117. For example, the sensor input signals can optionally be used for navigating robot 114 and for positioning the at least one container 186 of the robot, for example during pickup or delivery of articles, objects or goods.

Figure 22:
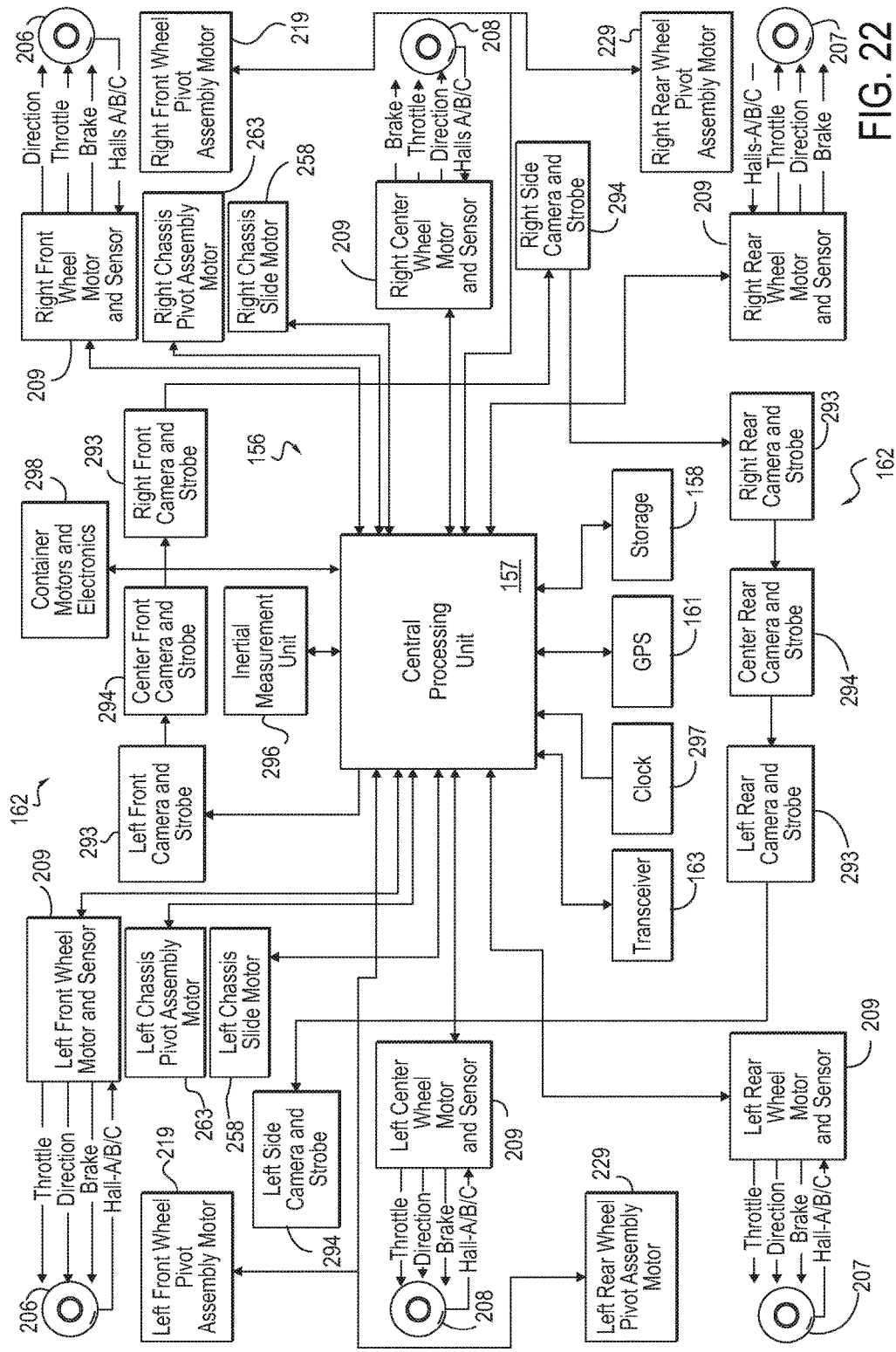
FIG. 22 is a schematic diagram of one embodiment of some of the electronics and electromechanical components of the robot of FIG. 5.

One embodiment of the electrical and electromechanical components of robot 114 is shown in FIG. 22. Among the components illustrated therein, are robot computer 156, storage 158, global positioning device 161, transceiver 163, clock 297, wheels 206, 207 and 208 of each bogie 201, wheel motors 209 and the sensors relating thereto, front and rear wheel pivot assembly motors 219, 229, left and right chassis slide motors 258, left and right chassis pivot assembly motors 263, container motors and electronics 298 and certain of sensors 162. Robot 114 can optionally include less than the components illustrated in FIG. 22, or additional components not shown in FIG. 22. For example, and for simplicity, any motors for pivoting linkages 211, 213, 221, certain of the nonvisual perception sensors 162 and the angular and position sensors 162 discussed above are not shown in FIG. 22.

The robot computer 156 can optionally be included in the control of any or all movement of robot 114 by computer network 136, including any controlled movement of the at least one container 186 included in the robot, and can optionally be carried by the robot 114 in any suitable manner. In addition, the robot 114 can optionally be provided with a battery 299 of any suitable type, for example a lithium-ion battery, that can be carried by the robot in any suitable manner. In any embodiment, the robot computer 156 can optionally be carried by the chassis 187, for example mounted on base 201, or can optionally be carried by cover 188. In any embodiment, the battery 299 can optionally be carried by the chassis 187, for example mounted on base 201, or can optionally be carried by cover 188. The robot computer 156 and the battery 299 are shown in one mounting configuration on base 201 in FIG. 12.

The least one container 186 can be of any suitable type, including for example a single container or a plurality of containers, and can be of any suitable size and shape. In any embodiment, at least one of the container has a length approximating the length of robot 114 or the length of base 281. In any embodiment, the at least one of the container has a width approximating the width of base 281 or the distance between sidewalls 288, 289.

In any embodiment, each container of the least one container 186 has an interior and an opening with an optional door for accessing the interior of the container. Robot 114 can optionally include at least one retrieval mechanism, which can be referred to as a retrieval mechanism, a robot mechanism, a vehicle mechanism, a pickup mechanism, a recipient mechanism, a transport mechanism, a removal mechanism, a translation mechanism, a delivery mechanism, a drop off mechanism, a loading mechanism, a receiving mechanism, an unloading mechanism or any combination of such terms. The at least one mechanism can remove or assist in the removal of the contents of the container, move or assist in the movement of articles between containers, place or move or assist in the placement or movement of articles into the container or any combination the foregoing. The least one retrieval or transport mechanism can be of any suitable type, for example mechanisms that include a pick up or other arm, a scoop, a shovel, a pulley, a claw, a crane, a magnet, a conveyor, a belt, rollers, balls, a movable surface, a movable wall, a slide, a grasping device or any combination the foregoing. In any embodiment, the mechanism can optionally be a conveyor system of any suitable type that moves articles from one location to another, for example along or across a substantially planar surface, which can optionally include belts, rollers, balls, a movable surface or any combination the foregoing. Articles can be moved into the container, out of the container or both from the top of the container, from the side of the container, from the bottom of the container or any combination the foregoing by the mechanism or otherwise. The mechanism can optionally be at least partially disposed in the container. In any embodiment, the mechanism can optionally be carried inside the container, for example so as to be part of the container. The at least one retrieval mechanism can optionally include a plurality of such retrieval mechanisms, for example one for each container where the least one container 186 includes a plurality of containers, and can be referred to as a product transport mechanism, an article transport mechanism, a good transport mechanism, an object transport mechanism, a receiving transport mechanism, a delivery transport mechanism, a robot transport mechanism, a vehicle transport mechanism, a pickup transport mechanism, a recipient transport mechanism or any combination of such terms.

Where the least one container 186 is a single container, in any embodiment the single container can optionally be in the shape of a parallelepiped and has an interior or cavity accessible by an opening and optional door in a wall of the container. The opening and optional door can be in the top wall, the bottom wall, a side wall or any combination of the foregoing. In any embodiment, the opening and optional door can be in an end wall or sidewall of the container, for example situated at one end 176, 177 of robot 114. The container can be referred to as a closeable container, a lockable container, a tamperproof container or any combination of such terms. In any embodiment, such single container has an opening and optional related door at each end 176, 177 of the robot.

In any embodiment, the least one container 186 can optionally include a plurality of containers each having an interior or cavity accessible by at least one opening and optional related door in a wall of the container. In any embodiment, each of the plurality of containers can optionally be in the shape of a parallelepiped and the at least one opening and optional door can be in an end wall or sidewall of the container. In any embodiment, the opening and optional door can be in one end of the each of the plurality of containers having the shape of a parallelepiped. Each of the plurality of containers can be referred to as a closeable container, a lockable container, a tamperproof container or any combination of such terms. In any embodiment, the combined length of two of the plurality of containers approximates the length of robot 114 or the length the base 281. In any embodiment, the combined width of two of the plurality of containers approximates the width of base 281 or the distance between sidewalls 288, 289.

In any embodiment, the least one container 186 has a modular construction formed from a plurality of containers, for example a plurality of containers 115, which can be mixed and matched in size and shape, to form a container assembly 301 that is in the shape of a parallelepiped with a length approximating the length of robot 114 or base 281, a width approximating the width of base 281 or the distance between sidewalls 288, 289 and a height approximating the distance between base 281 and top wall 291. In any embodiment, each of the plurality of containers, which can be referred to as a transport container, of the container assembly 301 is in the shape of a parallelepiped. In any embodiment, each of the containers of container assembly 301 has an end wall at one end 176 or 177 of the robot 114 with an opening therein and optional door for accessing the interior or inside of the container. The end wall of each container can optionally be parallel with the end 176 or 177 of the robot 114, and in any embodiment can optionally be flush with such end 176 or 177 of the robot.

Figure 23:
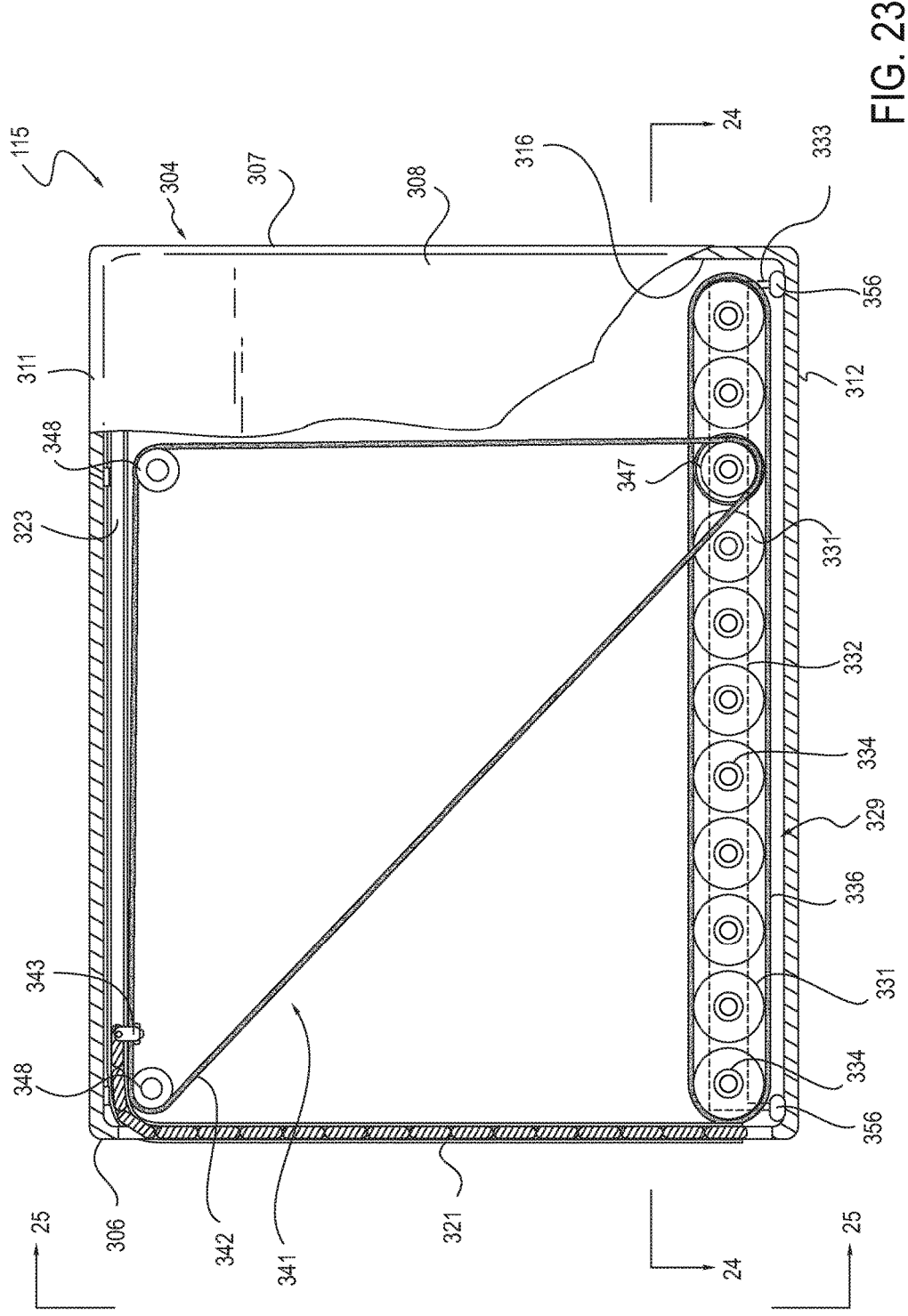
FIG. 23 is a side elevational view, partially cut away, of a container for use in the robot delivery system of FIG. 1 with its door closed.

Container 115 can be suitable for use in robot 114, for example for inclusion with the at least one container 186, in pickup container 116, in recipient container 117 or any combination of the foregoing. The container 115 can be of any suitable type and in any embodiment can optionally be in the shape of a parallelepiped formed by a body 304 made from any suitable material such as metal or plastic. Body 304 has a first end 306 and an opposite second end 307 and a first side 308 and an opposite second side 309 extending perpendicular to ends 306, 307 (see FIGS. 23-25). The body 304 can further include a top wall 311 and a bottom wall 312, each extending perpendicular to ends 306, 307 and sides 308, 309. First end 306 can be referred to as the front end and second end 307 can be referred to as the back end or rear of the body 304, while first side 308 can be referred to as the left side and second side 309 can be referred to as the right side of the body. The body has an interior or cavity 316 and an opening 317, for example in one or more of ends 306, 307, sides 308, 309 or top wall 311, for accessing the interior 316 of the body 304. In any embodiment, an opening 317 can optionally be provided in one or both of ends 306, 307, for example in first or front end 306. The opening 317 can be of any suitable size and in any embodiment can optionally be substantially rectangular or rectangular in shape and optionally have a height approximating the height between walls 311, 312 and a width optionally approximating the width between sides 308, 309 of the container.

The container 115 can optionally be a closeable container and include an optional door 321 of any suitable type for covering the opening 317 and thus precluding or inhibiting access to the interior 316 of the container. The door 321, which can be referred to as a side door or end door, can open and close in a manner such that no portion of the door penetrates or extends outwardly through the opening 317 during opening and closing of the door. In any embodiment, the door 321 can optionally be a segmented door which travels on first and second rails 323 extending along opposite sides of the opening 317 and then perpendicularly thereto into the interior 316 of the container. In any embodiment, the segmented door 321 can optionally be a roll top door that travels on slots, guides or rails 323 between a first position in which the door 321 closes the opening 317 and a second position in which the door is open and extends below the top wall 311 of the container body 304, thus providing substantially full access to the opening 317. The slots, guides or rails, which can be referred to as rails 323 herein, can be secured to the body 304 by any suitable fasteners. Suitable guides or rollers 324 can extend from each end of each segment of the door into the respective rail 323 for facilitating movement of the door on the rails between the door's first or closed position and second or opened position. Container 115 can be referred to as a closeable container, a lockable container, a tamperproof container or any combination of such terms Container 115 can optionally include at least one transport mechanism, which can be referred to as a transport mechanism, a robot mechanism, a vehicle mechanism, a retrieval mechanism, a removal mechanism, a translation mechanism, a delivery mechanism, a drop off mechanism, a loading mechanism, a receiving mechanism, an unloading mechanism or any combination of such terms The at least one mechanism can remove or assist in the removal of the contents of the container 115, move or assist in the movement of articles between containers, place or move or assist in the placement or movement of articles into the container or any combination the foregoing. The least one transport mechanism can be of any suitable type, for example a mechanism, assembly, apparatus or device that can optionally include a pick up or other arm, a scoop, a shovel, a pulley, a claw, a crane, a magnet, a conveyor, a belt, rollers, balls, a movable surface, a movable wall, a slide, a grasping device or any combination the foregoing. The at least one transport mechanism can optionally be inside container 115. In any embodiment, the mechanism can optionally be a conveyor mechanism system of any suitable type that moves articles from one location to another, for example along or across a substantially planar surface, which can optionally include belts, rollers, balls, a movable surface or any combination the foregoing. The at least one transport mechanism can optionally include a plurality of such mechanisms, and can be referred to as a product transport mechanism, an article transport mechanism, a good transport mechanism, an object transport mechanism, a receiving transport mechanism, a delivery transport mechanism, a pickup transport mechanism or any combination of such terms.

Figure 24:
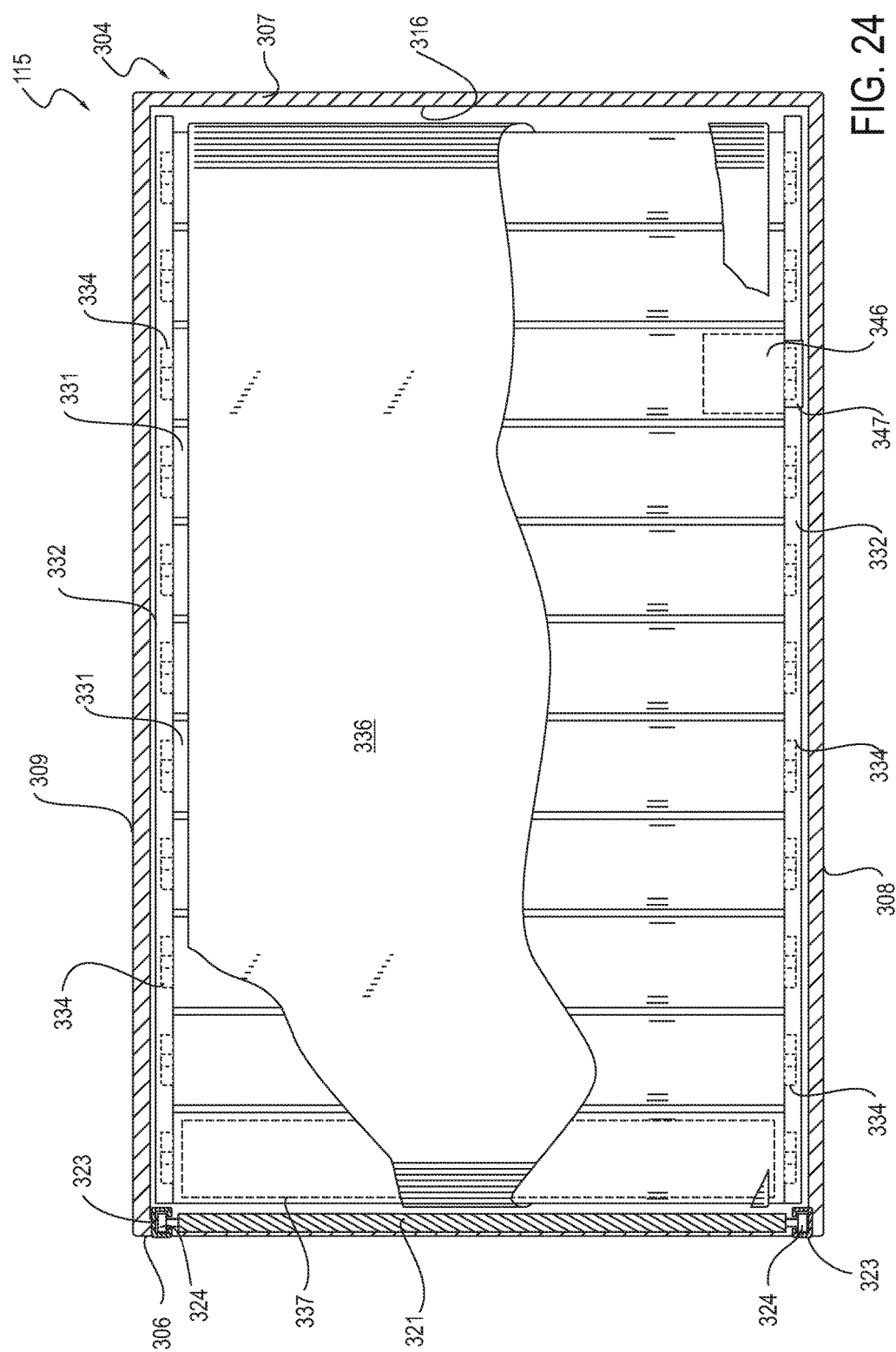
FIG. 24 is a cross sectional plan view, partially cut away, of the container of FIG. 23 taken along the line 24-24 of FIG. 23.
Figure 25:
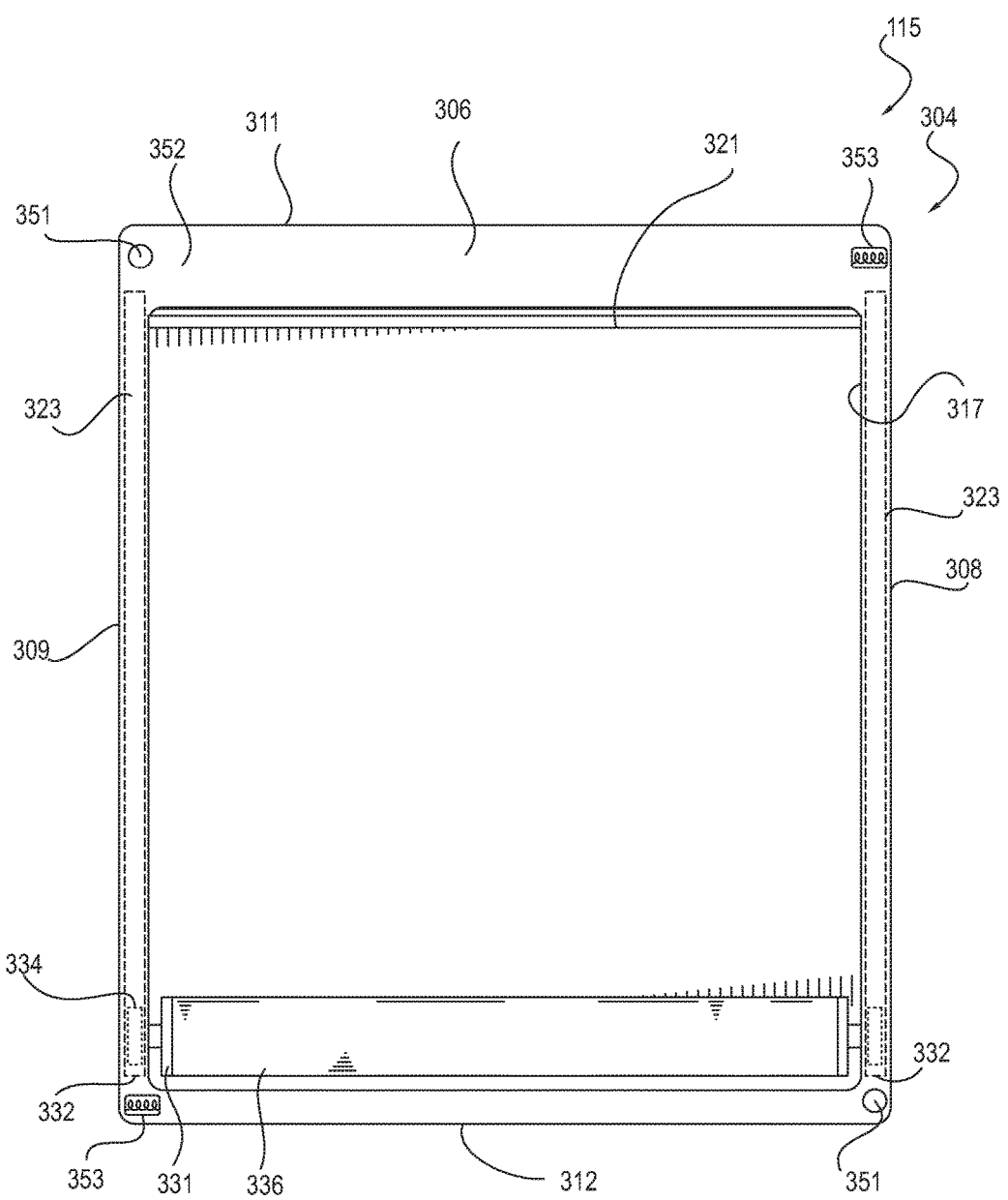
FIG. 25 is an end elevational view of the container of FIG. 23 taken along the line 25-25 of FIG. 23 but with the door fully opened.

In any embodiment, the at least one transport mechanism 329 can optionally be a conveyor mechanism or system that, for example, can optionally include a plurality of rollers 331 carried by body 304 and disposed along the bottom of the interior 316 of the body. The transport mechanism 329 can extend along substantially the entire length of the interior of body 304. The rollers 331 can optionally be coupled to the body 304 by any suitable means, for example by first and second elongate members or rails 332 extending along each side of the bottom of the interior of the body 304 and secured thereto by any suitable means such as a support 333 at each end of each rail 332. Each of the rollers 331 can optionally be pivotably secured at each end to a rail 332 by a bearing 334 or any other suitable means. The rollers 331 can be evenly or otherwise spaced apart along the length of body 304, for example along the length of the rails 332. A belt 336, for example a conveyor belt, can optionally be rotatably carried by the plurality of rollers 331. The belt 336 can be flexible and can be made from any suitable material such as rubber. In any embodiment, the transport mechanism 329 can optionally be motorized, for example so as to move belt 336 in opposite first and second directions along rollers 331 and the length of body 304. At least one motor 337 of any suitable type, for example an electric motor, can optionally be provided with respect to the least one of rollers 331 for driving the belt or conveyor belt 336 of transport mechanism 329. The at least one motor 337 can optionally be controlled by computer network 136. In any embodiment, a motor 337 can optionally be provided with respect to one of the end rollers 331, as illustrated in FIG. 24 where the motor 337 is provided within the first or front roller 331. It is appreciated that a motor 337 can optionally be provided with respect to each of the front and rear rollers 331 of the transport mechanism 329, or with respect any other rollers 331 of the mechanism.

Container 115 can optionally include a door opening assembly or mechanism 341 for controlling the operation or movement of container door 321, for example opening and closing door 321. The mechanism 341 can be of any suitable type and located partially or totally within the interior 316 of the container 115, or partially or totally on the exterior of the container or entirely outside of the container. In any embodiment, the door opening mechanism 341 can optionally be located inside the container 115 and can optionally include a belt, chain or cable 342, which can be referred to as a cable 342 herein, coupled to the door 321 in any suitable manner, for example by a clip or bracket 343 that can optionally be secured to both the cable 342 and the door 321. In any embodiment, clip 343 can optionally be secured to one end of door 321, for example to the top end of the door. The opening mechanism 341 can optionally include a motor, for example an electric motor controlled by computer network 136. In any embodiment, an electric motor 346 can optionally be included in the mechanism 341, for example within at least one end of a roller 331. In any embodiment, not shown, the electric motor 346 can optionally be disposed elsewhere within container 115, for example in a space between two adjacent rollers 331 and carried by rails 323. The motor 346 can optionally include a timer, pulley or shaft 347, which can be referred to as a shaft 347 herein, extending from the roller 331, upon which the cable 342 can optionally be carried, for example by extending at least partially around the shaft 347. The mechanism 341 can optionally include additional pulleys or wheels 348 upon which the cable 342 can rotatably travel. Motorized movement of cable 342 by motor shaft 347 in a first direction about pulleys 348 causes door 321 to open and motorized movement of the cable by shaft 347 in an opposite second direction about pulleys 348 causes the door to close opening 317.

Container 115 can optionally be lockable, for example so as to inhibit unwanted access to the interior 316 of the container and inhibit unwanted tampering of the container. In any embodiment, container door 321 can optionally be lockable. In any embodiment, container 115 can optionally include a door latch 349 for locking and unlocking door 321 (see FIG. 28). Latch 349 can optionally be electronically controlled by computer network 136, including for example robot computer 156.

In any embodiment, a container of the invention can optionally be provided with a door that can be manually opened and closed. Such feature can be in addition to or in lieu of any automatic door opening mechanism or assembly, such as door opening mechanism 341. Such embodiment of the container can optionally be provided with any suitable opening and related door, for example any of the openings and respective doors disclosed herein.

Figure 26:
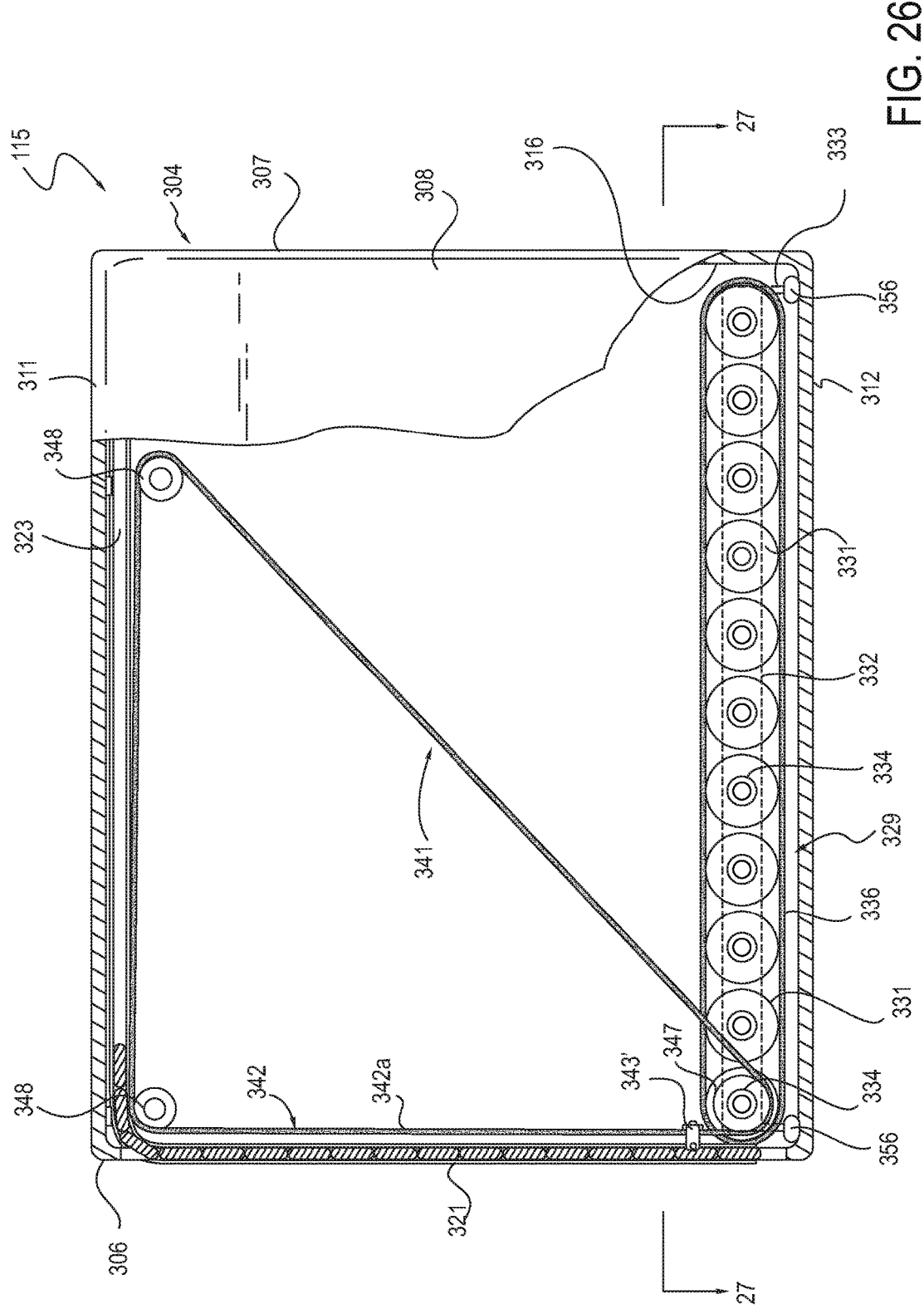
FIG. 26 is a side elevational view, partially cut away and similar to FIG. 23, of another embodiment of a container for use in the robot delivery system of FIG. 1 with its door closed.
Figure 27:
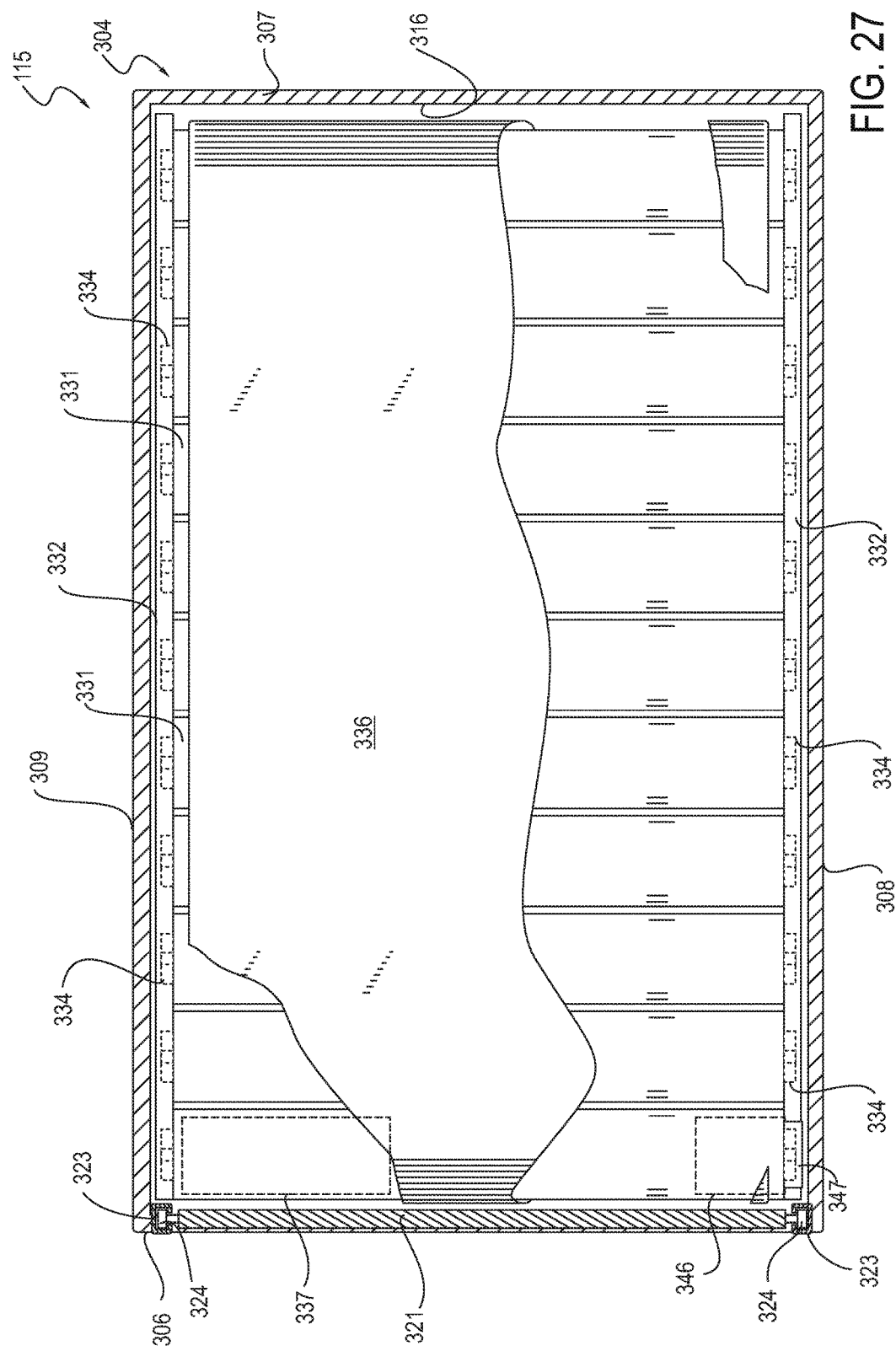
FIG. 27 is a cross sectional plan view, partially cut away and similar to FIG. 24, of the container of FIG. 26 taken along the line 27-27 of FIG. 26.

One embodiment of a container 115' with a door 321 that can optionally be manually opened and closed is illustrated in FIGS. 26 and 27. Container 115' can optionally be substantially similar to container 115, and like reference numerals have been used to describe like components of the containers 115 and 115'. A door opening assembly or mechanism of any suitable type that can optionally be manually operated by a human for opening and closing door 321 can optionally be included in container 115'. In any embodiment, a door opening mechanism 341 can optionally be provided for container 115' that can be substantially similar to the door opening mechanism 341 of container 115. Such mechanism 341 can optionally include pulleys 348 and a cable 342, which has a portion 342a that can extend alongside the rear of door 321. In any embodiment, cable portion 342a extends parallel to opening 317, and the rear of the door 321 when the door is in a closed position. In any embodiment, the cable portion 342a extends parallel to one side of opening 317 and thus one side of the closed door 321. A bracket 343', which can be referred to as a clip, latch or opener, for securing the door 321 to cable 342 can have a portion secured to the door 321, for example the bottom or bottom portion of the door, and another portion that is removably or selectively attachable to cable portion 342*a*. Latch 343' can optionally be accessible from the exterior of door 321 so as to permit a user of container 115' to selectively attach and detach the latch 343' to cable portion 342*a*. To accommodate the positioning of cable 342 in container 115', door opening motor 346 can optionally be located in the front roller 331 of the container, as illustrated in FIG. 27. Motor shaft 347 extends from motor 346 and the end of the respective roller 331 for engaging and driving cable 342, for example as discussed above. Conveyor motor 337 can optionally be reconfigured to occupy only a portion of such roller 331, as shown in FIG. 27, so as to accommodate door motor 346 being located in the same roller 331 as the conveyor motor 337.

In any method of the invention for manually opening door 321 utilizing latch 343', the user can engage the latch 343' to detach it from cable portion 342*a*. The user can then manually move door 321 on rails 323 to an opened position, sliding latch 343' along cable portion 342*a* during the process, for example to the position shown in FIG. 25. The door to 321 can optionally be locked in its opened position by any suitable means, for example by reattaching latch 343' to the cable 342. When the user decides to close door 321, the user can manually move the door to its closed position and thereafter reattach latch 343' to the cable portion 342*a*. The manual door opening mechanism of the invention permits opening and closing of a door of a container without requiring an electric motor or component, such as motor 346. The manual opening and closing of the door can thus be accomplished without requiring electricity or other power to the container. Such manual door opening and closing mechanism may be particularly suited for a container not associated with a continuous power supply, for example a pickup container 116 or a recipient container 117 for which a continuous supply of power may not be necessary or desired.

Container 115 can optionally include a joining device or apparatus for temporarily securing or joining two containers 115 together so as to permit the transfer of articles, goods, objects or products between the containers. Such transfer can be accomplished without human assistance, with human assistance, semi-autonomously or autonomously. For example, the front end 306 of two containers 115 can be brought together so that the respective openings 317 of the containers face each other and one or both of the transport mechanisms 329 of the containers can optionally be utilized to transfer articles between the containers. In this regard, for example, the openings 317 of the two containers 115 can optionally be aligned or registered with each other so for example the top surface of the respective conveyor belts 336 of the containers can be substantially parallel to each other for permitting articles moved off of or delivered by the belt 336 of the delivering container to be picked up by or received by the belt 336 of the receiving container 115. In any embodiment, the front of the conveyor belts 336 of the two containers can optionally be relatively close to each other so as to facilitate or permit an article moving off one conveyor belt to be picked up by the opposing conveyor belt. In any embodiment, the conveyor belts of the two containers 115 can optionally be substantially horizontally aligned with each other so as to facilitate a transfer of an article between the two conveyor belts. The temporary joining device or apparatus 351 can be of any suitable type, including electrical, mechanical, electromechanical, magnetic or electromagnetic devices or apparatus such as clips, brackets or magnets. In any embodiment, joining device or apparatus 351 can optionally include at least one magnet disposed on or accessible at the front end 306 of the container (see FIG. 25). In any embodiment, first and second magnets 351 can optionally be provided on diagonally opposite corners of the outside face 352 of the front end 306 of the container. In any embodiment, the magnets of other joining apparatus 351 of one container 115 oppose the joining apparatus 351 of the other or mating container 115, so for example to register with each other during docking of the two containers. When the opposing front faces or ends of two containers 115 are brought together, joining devices or magnets 351 cooperate with each other to temporarily secure the two containers together during the process of transferring articles between the containers.

The containers of the invention can optionally be powered by any suitable means, continuously or intermittently. For example, the containers can optionally be independently powered, for example by a battery carried by the container or by wired connection to any suitable power source such as the grid, or be powered by robot 114. Solar panels can optionally be provided on the containers of the invention for providing power thereto. The at least one container 186 of robot 114 can optionally be powered by the robot. A container remote of a robot of the invention, for example a stationary container such as pickup container 116 and recipient container 117, can optionally be powered by a robot, for example a transport container 115 of the robot, docking or mating with the remote container. In any embodiment, a stationary container can optionally be mechanically powered, for example by solar power, wind power or a conventional power grid.

In any embodiment, containers 115 can optionally be provided with at least one suitable electrical connector 353 for permitting the transfer of power between joined containers 115. In any embodiment, the at least one electrical connector 353 can optionally be provided on face 352 of the container and in any embodiment the at least one connector 353 can optionally include first and second connectors 353 provided on the face 352 of the container 115. For example, the first and second connectors 353 can optionally be provided on diagonally opposite corners of the outside face 352 of the front end 306 of the container. In any embodiment, the connectors 353 of one container 115 oppose the connectors 353 of the other or mating container 115, so for example to register with each other during docking of the two containers. In any embodiment, containers 115 can optionally be provided with the least one suitable communications connectors 358 for permitting hardwired communications between containers. In any embodiment, the at least one communications connector 358 can optionally be provided on face 352 of the container. In any embodiment, the communications connector 358 of one container 115 opposes the communications connector 358 of the other or mating container 115, so for example to register with each other during docking of the two containers. When the opposing front faces or ends of two containers 115 are brought together, and for example temporarily secured together, the first and second electrical connectors 153 of one container cooperatively engage or electrically connect with the first and second electrical connectors 153 of the other container. Where one of the containers 115 has power, for example a transport container 115 included in the at least one container 186 of robot 114, the joined electrical connectors 153 of the two containers can serve to temporarily transfer power to the other container, for example to a pickup container 116 or a recipient container 117 without an independent or continuous supply of power thereto. Electrical connectors 353 can be of any suitable type, for example conductors that permit conductive or inductive coupling therebetween.

The containers of the invention can optionally include a scale of any suitable type, for example for measuring the contents of the container. In any embodiment, each of containers 115 can optionally include a scale for measuring the weight of the objects resting on transport mechanisms 329 thereof, for example on belt 336. In any embodiment, such weight scale can optionally be formed from one or more sensors 356 disposed on supports 333 of the transport mechanism 329 (see FIG. 23). Each of such sensors 356 can be of any suitable type, for example a strain gauge. Such scales can optionally be coupled to computer network 136, either directly or indirectly.

Figure 28:
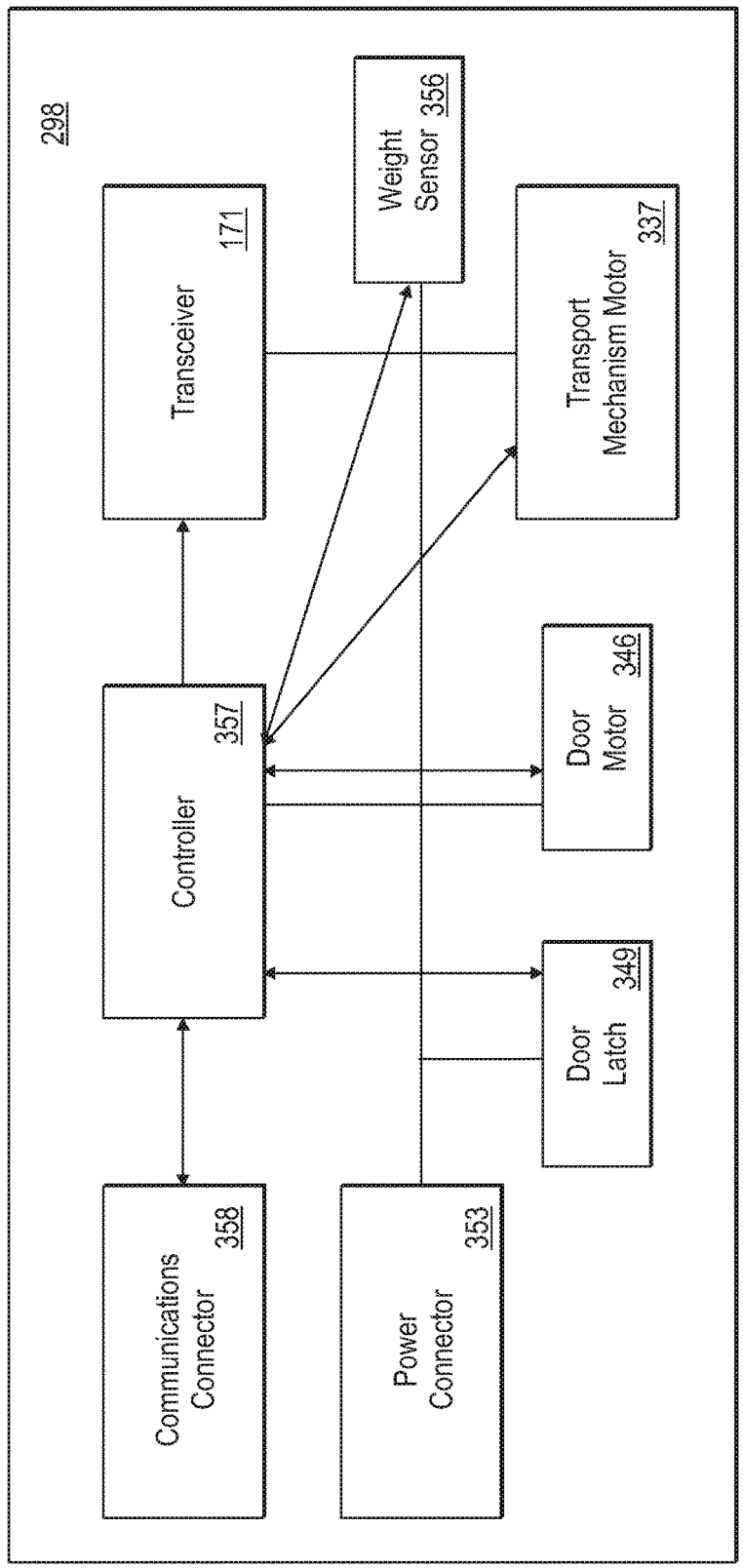
FIG. 28 is a schematic diagram of one embodiment of the electronics of the container of FIG. 23.

One embodiment of the electrical and electromechanical components 298 of the containers of the invention, for example container 115 and at least one container 186, is shown in FIG. 28. Among the components illustrated therein, are a computing device, controller or computer 357 of any suitable type, which can optionally be part of computer network 136 and include central processing unit 168 and storage 169. Components 298 can additionally include a transceiver 171, transport mechanism motor 337, door motor 346, door latch 349 and one or more power connectors 353. The components 298 can further include one or more communications connectors 358, for permitting communications from outside of the container with computer 354 of the container, and one or more weight sensors 356 for sensing the weight of articles carried by the container. The container can optionally include less than the components illustrated in FIG. 28 or additional components not shown in FIG. 28. In any embodiment, for example when a container 115 is included in the at least one container 186 of robot 114, communications connector 355 can optionally be coupled to robot computer 156 (see FIG. 22) so as to permit container computer 354, or other components of container components 298, to communicate with computer network 136 by means of a hardwired connection. In any embodiment, for example when container 115 is included in a pickup container 116 or a recipient container 117 or in other instances when a hard-wired connection is not permissible or desired between container components 298 and computer network 136, transceiver 171 can permit wireless communications between container components 298 and the computer network 136.

Containers 115 can optionally be assembled together in a variety of configurations to form a container assembly 301 for use on robot 114. In any embodiment, for example illustrated in FIGS. 19-21 and 29, the container assembly 301 can optionally include a plurality of eight containers 115 arranged in a configuration of two columns, two rows and two containers deep. When viewed from either first end 176 or second end 177 the robot 114, the front end 306 of four of the containers 115 of the container assembly 301 form a grid consisting of two columns and two rows of the containers 115. In each row, first side 308 of one container can optionally be flush with second side 309 of the adjacent container. In each column, top wall 311 of one container can optionally be flush with bottom wall 312 of the adjacent container. The back end 307 of one container can optionally be flush with the back end 307 of the container behind it. The front end 306 of such four containers can optionally be parallel with each other and flush with the respective end 176, 177 of the robot. The openings 317 and interiors 316 of such four containers 115, when the respective doors 321 are opened, are accessible at the respective end of the robot. The containers 115 accessible at one end 176 of the robot 114 can optionally be disposed end to end with the containers 115 accessible at the other end 177 of the robot, as illustrated in FIG. 29. Containers 115 can optionally be provided with additional openings, doors or both, of any suitable type including any discussed herein, for permitting transfer of articles between containers 115 within container assembly 301. For example, two containers disposed end-to-end within container assembly 301 can optionally include an opening, door or both at the back of the containers, for example in back end 307 of each container 115. Any suitable mechanism, for example any of those discussed herein and including transport mechanism 329, can optionally be provided for transferring articles through such openings between such containers.

A delivery of the invention can consist of a single article 121 or a plurality of articles 121. A single article can be transported without a transportation container or enclosure or within a transportation container or enclosure of any suitable type. Similarly, a plurality of articles can be transported without a transportation container or enclosure or within a transportation container or enclosure of any suitable type. Suitable transportation containers can optionally include a bag, an envelope, a package or a box. Suitable materials for use in forming transportation containers include paper, plastic and cardboard. A transportation container can be for single use, or be reusable for use in a plurality of deliverees. In any embodiment, a transportation container of a standardized size and shape can optionally be used for transporting one or more articles 121 within system 113, for example for facilitating the transport of objects into and out of containers 115 (see FIGS. 3, 6, 32-39 and 41).

Transportation container 361 can optionally be of a standardized size and shape for use in system 113. Container 361 can be of any suitable type and be made from any suitable material such as plastic, metal, cardboard, paper, paperboard or fiberboard. In any embodiment, the transportation container 361 has a shape of a parallelepiped, and in any embodiment has four interconnected sidewalls 362 joined to a bottom wall 363. In any embodiment, the transportation container has a top wall (not shown) so as to have a closed top. In any embodiment, the transportation container 361 can optionally be an open container, that is free of a top. In any embodiment, the open container can optionally be rectangular in shape when viewed in plan and formed from bottom wall 363 and four sidewalls 362 joined together at the bottom wall. The transportation container 361 has an interior cavity or space 364 for receiving one or more articles therein. One or more objects can be placed within the transportation container 361, and in any embodiment all of the objects in a transportation container can optionally be associated with one order or request from a user. The transportation container can be of any suitable size, for example not greater than the size of the plurality of containers 115 in which the transportation container 361 is to be utilized. In any embodiment, the transportation container 361 has a size approximating the size of the plurality of containers 115 in which the transportation container is to be utilized. The transportation container 361 can be referred to as a liner, a box, a cardboard box, a receptacle, a holder, a canister, a bag, a case, a repository or any combination of such terms.

In any embodiment, robot 114 can optionally include an arm, element, member, mechanism, apparatus or assembly (not shown), for convenience referred to herein as a member, having an end that can optionally be movable relative to at least a portion of the robot, for example wheel assemblies 181, 182, attachment assembly 249, at least one container 186 or any combination of the foregoing. Such end can optionally be movable in any suitable manner, for example upwardly or downwardly, forwardly or rearwardly, sideways, can optionally be pivotable in any suitable manner, for example about a first axis, about a second axis orthogonal to the first axis, about a third axis orthogonal to the first and second axes, or any combination the foregoing. Such end can optionally include an end effector of any suitable type, for example an anthropomorphic end effector. Such member can be of any suitable type, for example articulated, telescoping, extendable, retractable or any combination the foregoing, and can optionally be coupled or attached to any portion of the robot, for example one or both of ends 136, 177 of the robot, one or both of sides 178, 179 of the robot or any combination the foregoing. The member can optionally be configured to push buttons, for example to operate an elevator, crosswalk light or traffic signal, to ring doorbells, to open doors, to activate handicapped access plates, to manipulate items, to perform tasks necessary or advisable during operation of the robot 114, or any combination the foregoing.

In any embodiment, the shape and size of the transportation container 361 can optionally be standardized throughout system 113. In any embodiment, the shape and size of the transportation container 361 can optionally be standardized for the sized and shaped container 115 in which the transportation container 361 is to be utilized. One or more classes of such standardized transportation containers 361 can optionally be utilized by system 113. Such classifications can optionally include classifications by size, shape or any other physical characteristic of the transportation container. In any embodiment, the computer network 136 categorizes certain classes of standardized transportation containers 361 with certain classes of standardized containers 115 and utilizes such information to efficiently transfer containers 361 throughout system 113. For example, the computer network 136 can match transportation container 361 with the smallest permissible containers 115 throughout the course of travel of the transportation container 361 from the pickup location to the drop off location. Each transportation container can optionally include any suitable identifier thereon, such as identifier 364, which can optionally include the address, the class, any characteristic of the class of the transportation container or any combination of the foregoing. Such identifier can optionally include any machine-readable identifier, such as a barcode.

Methods for utilizing a vehicle or other type of robot to deliver articles between first and second locations are provided. Such methods, including any step or portion thereof, can be accomplished without human assistance, with human assistance, semi-autonomously or autonomously. Such methods can use system 113 and vehicle or robot 114, for example one robot 114 in a fleet of identical robots, but are not limited to the same. Such methods can optionally be computer-implemented and can use one or more processors or computers, located together or apart from each other, for such implementation. In any embodiment, such methods utilize computer network 136. System 113 and robot 114 can optionally be utilized with other methods and systems, including other methods or systems for purchasing or selling goods or delivering goods or objects between first and second locations.

In any method of the invention, a request from a user can be received by computer network 136 for picking up one or more articles 121 at a first location. The request can optionally include a request to transport or deliver the article from the first location to a second location. The request can optionally include a request to deliver the article at the second location. In any embodiment, the user can optionally be a purchaser of the article 121, which can optionally be a product. The request can optionally include a request to purchase the product and can optionally include a payment for the purchase of the product. In any embodiment, the user can optionally be an agent of the purchaser. In any embodiment, such purchase can optionally be accomplished utilizing computer network 136, separately or together with other computers or computer networks. In any embodiment, the deliverer of the product can optionally be a seller of the article, or vendor. Any method can optionally include the deliverer receiving payment for the purchase of the product. In any method, the deliverer of the article 121 can optionally be an agent of a seller or vendor. In any embodiment, the purchaser or other user enters its request utilizing a deliveree computing device 142, which can be referred to as a user computing device, a vendee computing device or a purchaser computing device. In any embodiment, the seller or other deliverer acts on the request utilizing a deliverer computing device 141, which can be referred to as a seller computing device or a vendor computing device.

The request of the user can optionally include the location of the user, the location at which the article 121 is to be delivered or both. The location at which the article is to be delivered, which can be referred to as the second location, can optionally be an address, the physical location of the user, nearby the address or the physical location of the user, a horizontal or any other surface, on the ground, a recipient container 117 of the user or available to the user, a specific location designated by the user, a location designated by computer network 136 with respect to the user or any combination of the foregoing. The specific location can optionally be a specified or precise location, for example at the second location, where the article should be delivered. In one possible step, the specified or precise delivery location can optionally include a three-dimensional delivery location, for example including three-dimensional coordinates or other three-dimensional information of the precise delivery location. Such three-dimensional coordinates or other information can optionally include coordinates in three orthogonal axes, for example orthogonal X, Y and Z axes.

In one possible step, computer network 136 provides a three-dimensional virtual model of the second location to the user. Such three-dimensional virtual model can optionally include three-dimensional coordinates for all locations or areas thereon. The three-dimensional virtual model can have been previously created, and stored in network 136, or created from information provided by the user, for example with a deliver computing device 141, deliveree computing device 142 or other computing device. The three-dimensional virtual model can optionally be displayed on display 148 of the device 141,142 and the user can indicate thereon a precise three-dimensional location, for example for delivery or pick up. In one possible step, the user can indicate the precise three-dimensional location by creating an indicator on the displayed three-dimensional virtual model at the precise location. The indicator identifying the precise three-dimensional delivery location on the three-dimensional virtual model can be created in any suitable manner, for example by the user touching the display 148 of the device 141,142. For example, in one possible step, the three-dimensional virtual model can optionally be displayed on electronic screen or display 148 and the user can touch the screen 148 so as to indicate the precise location on the three-dimensional virtual model, which can optionally be saved by computer network 136. The user's indication on the three-dimensional virtual model can optionally be translated by computer network 136 into three-dimensional coordinates or other information indicative of the precise three-dimensional location, for example the precise three-dimensional second location for delivery.

Figure 31:
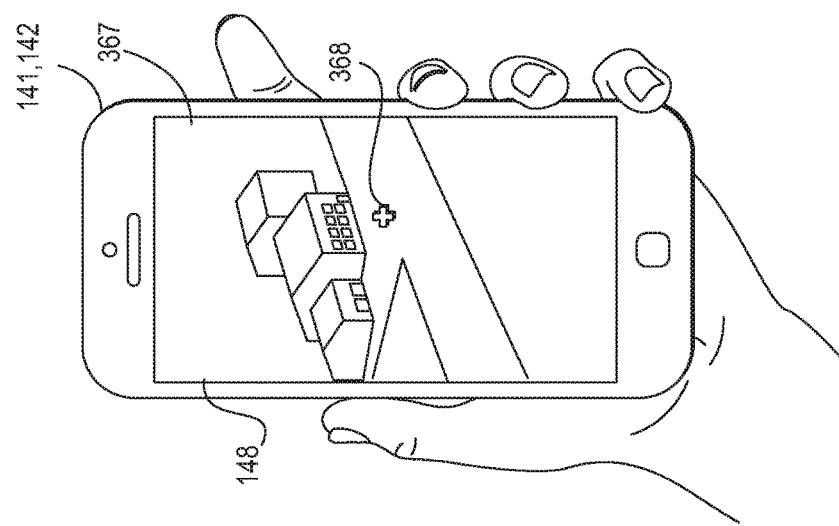
FIG. 31 is an illustration of a pickup or delivery location indicated on the display of a mobile computing device, in furtherance of the step of FIG. 30.
Figure 30:
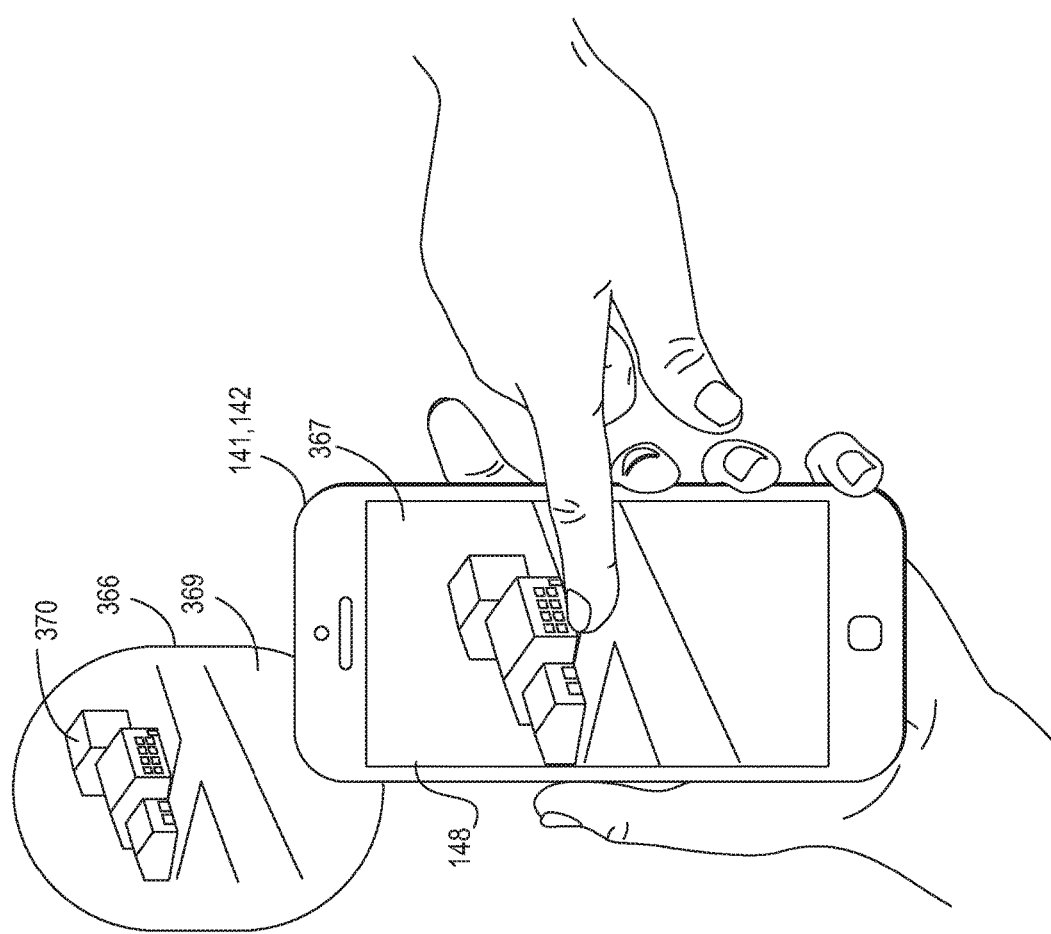
FIG. 30 is an illustration of one step of using a mobile computing device to identify a pickup or delivery location of a robot of the robot delivery system of FIG. 1.

In one possible step, the request can optionally include a photograph or other image, for example image 367, of the first or second location with an indicator, for example indicator 368, on the image identifying a precise two-dimensional delivery location for the article (see FIG. 31). The two-dimensional pickup or delivery location from such image can optionally be utilized by computer network 136 to derive three-dimensional coordinates or information indicative of the three-dimensional delivery location. The image can optionally include terrain 366 of the second location, for example land 369, structures 370 on the land or both. The image can be of any suitable type, including one or more photographs or video stored by the user, for example in device 141,142, or contemporaneously taken by the user, for example using device 141,142. The indicator identifying the precise two-dimensional delivery location on the image can be created in any suitable manner, for example by the user touching the image while visible on display 148 of the device 141,142 (see FIG. 30). For example, in one possible step, photograph 367 can optionally be displayed on electronic screen or display 148 and the user can touch the screen 148, as shown in FIG. 30, so as to indicate the precise location on the two-dimensional photograph, shown by indicator 368 in FIG. 31, which can optionally be saved by computer network 136. It is appreciated that the indicator 368 can optionally be created on the image in any other suitable manner, for example by a computer mouse.

In one possible step, the two-dimensional delivery information from the image can optionally be mapped by computer network 136 to a three-dimensional virtual model of a first, second or other location, for example stored in computer network 136 or created by the computer network. The network 136 can optionally be programmed to register the two-dimensional indicator on the image to a precise location on the three-dimensional virtual model to obtain a three-dimensional pickup or delivery location. For example, computer network 136 can register the two-dimensional image of the location with the three-dimensional virtual model of the location so that at least some of the areas of the two-dimensional image, including for example the area or precise two-dimensional location identified by indicator 368, can optionally be represented on the three-dimensional virtual model with three-dimensional coordinates or other information. Such three-dimensional coordinates or other commission can optionally include coordinates in three orthogonal axes, for example orthogonal X, Y. and Z axes. In any embodiment, the entire two-dimensional image can optionally be registered to the three-dimensional virtual model so that three-dimensional coordinates or other information can optionally be obtained from the three-dimensional virtual model for all locations on the two-dimensional image.

In one possible step, the user provides a plurality of images, for example a plurality of photographs, of a first, second or other location, either with the request or otherwise, for use by computer network 136 in the creation of the three-dimensional virtual model. The plurality of images, which can optionally include video, can optionally be taken with the deliverer computing device 141, the deliveree computing device 142 or any other electronic device, either contemporaneously with or prior to submitting the images. In one possible step, the user scans terrain 366 viewable by the user with a sensor of the device 141,142, such as a camera of the device, to produce the plurality of images, which can optionally include video. The terrain can include land, structures on the land or both. Such plurality of images can optionally be contemporaneously displayed on display 148 of the device or stored in the device 141,142 for later viewing on display 148. The plurality of images can optionally be used by computer network 136 in the creation of the three-dimensional virtual model of a first, second or other location.

In one possible step, the user provides a plurality of depth sensor signals of the first, second or other location, either with a request or otherwise, for use by computer network 136 in the creation of the three-dimensional virtual model. The plurality of depth sensor signals can optionally be provided from one or more depth sensors included with the deliverer computing device 141, the deliveree computing device 142 or another device. For example, the device can optionally be pointed at the second location and scanned by the depth sensor of the device for providing the plurality of depth sensor signals. The plurality of depth sensor signals can optionally be used by computer network 136 in the creation of the three-dimensional virtual model of the first, second or other location.

In one possible step, the request of the user can optionally include three-dimensional orientation information associated with the two-dimensional image 367. Such orientation information can optionally be utilized by computer network 136 in registering the image with the two-dimensional pickup, delivery or other information with the three-dimensional virtual model of the first, second or other location when deriving the three-dimensional pickup, delivery or other location.

The user's request to purchase a product can optionally be directed by computer network 136 to a single vendor of the product or to a plurality of vendors of the product. In any embodiment, the user's location can optionally be included in the request. The user's location can be provided in any suitable manner, for example by being inputted by the user. In any embodiment, the user's location can optionally be calculated or determined by computer network 136, for example by using a location sensor of any suitable type provided in deliveree computing device 142. The request can optionally be directed to any plurality of vendors of the product, including a plurality of vendors located within a predetermined or calculated distance of the user's location. Such predetermined distance can optionally be preprogrammed into computer network 136, or determined as a function of a plurality of variables, for example measured at the time of the request, and analyzed by the computer network 136 in accordance with a predetermined algorithm or otherwise.

The plurality of vendors can bid on the product, for example by providing a reply or response to the user, who can be referred to as a buyer, through computer network 136. In any embodiment, the response of each vendor can optionally include a price quote from the vendor. In any embodiment, computer network 136 can optionally be programmed to deliver the lowest price quote from the plurality of vendors to the user.

In any embodiment, the response of each vendor can optionally include an indicator of the distance of the vendor from the location of the user. The indicator of distance can optionally include the location of the vendor, the distance of the vendor from the user's location or both. The location of the vendor can optionally include a location associated with the product of the vendor. The location of the vendor can be provided in any suitable manner, for example by being inputted by the vendor. In any embodiment, the vendor's location can optionally be calculated or determined by computer network 136, for example by using a location sensor of any suitable type provided in deliverer computing device 141 or elsewhere.

In any embodiment, the response from each vendor can optionally include one or more additional items of information with respect to the vendor or the product of the vendor, which items of information can be referred to as product purchase factors or features associated with the vendor. The product purchase factors or features can be of any suitable type and can optionally include the price quote for the product from the vendor, the indicator of the distance of the vendor from the location of the user, the location of the vendor, the distance of the vendor from the user's location, the speed or quickness of the vendor in responding, a confirmation from the vendor that the product is in stock, an estimate of travel time between the product of the vendor and the user, an estimate of the delivery time of the product to the user, a consumer rating of the vendor, a rating of the vendor from previous users or buyers, the name of the vendor, the brand of the product, the time to pick up the product of the vendor by at least one of the robots 114 of system 113 or any combination of the foregoing. A condition of such confirmation from the vendor that the product is in stock can optionally include the vendor checking its computer records to confirm that the product is in stock, visually observing the product in its store or warehouse to confirm that the product is in stock or both and providing its results or confirmation to the computer network 136.

In any embodiment, the computer network 136 can optionally be programmed to deliver the lowest price quote for a product in stock, as determined above or otherwise, to the user. In any embodiment, the computer network 136 delivers all price quotes and related information, including whether or not the product is in stock, to the user.

In any embodiment, the user can then select which vendor to purchase the product from in response to receiving one or more responses including the price quotes. For example, computer network 136 can permit the user to select one of the plurality of vendors as a function of at least one of the product purchase factors. The computer network 136 can optionally be programmed to permit the user to select one of the plurality of vendors as a function of any number of the product purchase factors. The computer network 136 can permit the user to select one of the plurality of vendors as a function of at least any two of the product purchase factors, at least any three of the product purchase factors, at least any four of the product purchase factors or at least any five of the product purchase factors. The computer network 136 can optionally be programmed to permit the user to select one of the plurality of vendors as a function of the price of the product and at least one of the other product purchase factors with respect to each of the plurality of vendors. The computer network 136 can permit the user to select one of the plurality of vendors as a function of the price of the product and at least any two of the other product purchase factors, the price of the product and at least any three of the other product purchase factors, the price of the product and at least any four of the other product purchase factors or the price of the product and at least any five of the other product purchase factors.

In any embodiment, the computer network 136 analyzes all the responses from the plurality of vendors, in accordance with a predetermined algorithm or otherwise, and provides the user with a recommended product to purchase.

In any embodiment, the computer network 136 evaluates each response of a vendor against a plurality of features of each of the plurality of vendors. The features can be of any suitable type, for example any combination or number of the features disclosed herein. The computer network can select a response as a function of such of evaluating step, recommend a response as a function of such evaluating step, permit the user or buyer to select a response from one of the plurality of vendors as a function of such evaluating step or any combination the foregoing. The evaluation step or method can be of any suitable type and can optionally be programmed into computer network 136. In any embodiment, the evaluation step or method can optionally include a ranking regression method of any suitable type. For example, the evaluation method can optionally include using a ranking regression method to provide an aggregate value for each of the respective vendors. The computer network 136 can select or recommend a response from one of the plurality of vendors as a function of the aggregate value for each of the plurality of vendors. For example, the vendor with the highest aggregate value can optionally be selected or recommended, or the vendor with the lowest aggregate value can optionally be selected or recommended by computer network 136.

In one optional ranking regression method, the computer network 136 assigns a numerical value to each of the plurality of features of a vendor and determines an aggregate value for each vendor as a function of the numerical value of each of the features of the respective vendor. The numerical can be of any suitable type, including a cost-based value. In any embodiment, the aggregate value for each vendor can optionally be the sum of the numerical values of each of the plurality of features of the vendor.

In one optional ranking regression method, the computer network 136 utilizes a neural network in evaluating the responses of the vendors. In one such method, the computer network trains a neural network with a set of example vendors to provide a trained neural network and assigns a numerical value to each of the plurality of features for each of the plurality of vendors. The aggregate value for each vendor can optionally be computed by network 136 applying the trained neural network to the plurality of features for each of the vendors.

In one optional ranking regression method, the computer network 136 utilizes a kernel method in evaluating the responses of the vendors. In one such method, the computer network trains a kernel method with a set of example vendors to provide a plurality of support vectors and a weight for each of the plurality of support vectors and assigns a numerical value to each of the plurality features for each of the plurality of vendors. The aggregate value for each vendor can optionally be computed by network 136 applying the plurality of support vectors and the weights to the plurality of features for each of the vendors.

In one optional ranking regression method, the computer network 136 utilizes a decision tree in evaluating the responses of the vendors. In one such method, the computer network trains a decision tree with a set of example vendors to provide a trained decision tree and assigns a numerical value to each of the plurality of features for each of the plurality of vendors. The aggregate value for each vendor can optionally be computed by network 136 applying the trained decision tree to the plurality of features for each of the vendors.

The computer network 136 can permit the user or buyer to select one of the responses of the plurality of vendors, for example based upon a recommendation of the network, or the computer network can select one of the responses of the plurality of vendors autonomously, for example without input from the user or buyer. The computer network 136 can permit the user or buyer to accept the selected response, or the computer network can accept the selected response autonomously. The acceptance can optionally include purchasing the article or product from the selected vendor. The acceptance of the request can optionally include charging the user or buyer for the article, charging the user or buyer for the delivery of the article or both. The foregoing method of selecting a response from one of a plurality of vendors can optionally be utilized independently of system 113 and the other methods and components of system 113.

In any embodiment, a price quote of a vendor can optionally be increased, decreased or otherwise altered or changed by the computer network 136 in accordance with real-time demand for the product. For example, if real-time to demand for a product is high, determined by the computer network in accordance with a predetermined algorithm or otherwise, each of the price quotes can optionally be increased before delivery to the user. The amount of the increase can optionally be divided between the vendor and operator of system 113 in any predetermined manner, for example all of such increase being directed to the vendor, a portion of such interest being directed to the vendor and a portion to the operator of system 113 or all of such increase being directed to the operator of system 113.

Once one or more articles 121 are ready for delivery to a user or buyer in accordance with a request from the user, with or part of a purchase of the article or otherwise, a robot 114 can be directed by computer network 136 to travel to the first location and pick up the one or more articles 121 at the first location. The first location can optionally be at the physical location of the deliverer, nearby the physical location of the deliverer, at a location associated with the deliverer, at a location in the computer network 136 associated with the deliverer, at a designation designated by computer network 136 with respect to the deliverer or at another location provided by the deliverer. In any embodiment, the first location can optionally be associated with a vendor from which the user purchased a product. In such embodiments, the first location can optionally include a selected one of a plurality of vendors, the location of a selected or other vendor, the location of the article or product of a selected or other vendor, any other suitable location or any combination of the foregoing. The robot, for example robot 114, can optionally be one of a plurality of robots, for example one of a plurality of robots that is in the vicinity of the first location. The robot can optionally be one of the robots in a fleet or sub fleet of robots in system 113.

Any suitable method can be provided for computer network 136 to select, or recommend to the user, which of a plurality of robots, for example robots 114, should be directed to pickup, deliver or both the article or product. The selecting or recommending method can optionally be programmed into computer network 136. In one such suitable method, the selecting or recommending step can optionally include the computer network 136 evaluating a plurality of the robots against a plurality features of the plurality of robots. The features can be of any suitable type and include any combination or number of features. For example, the features can optionally include the distance of each robot from the product of the vendor, the load capacity of each robot, the remaining battery life of each robot, the estimated travel time of each robot to the product of the vendor, the estimated travel time of each robot to the first location, any combination the foregoing or all of the foregoing. The computer network can select a robot as a function of such evaluating step, recommend a robot as a function of such evaluating step, permit the user or buyer to select a robot as a function of such evaluating step or any combination the foregoing.

In any embodiment, the evaluation step or method can optionally include a ranking regression method of any suitable type. For example, the evaluation method can optionally include using a ranking regression method to provide an aggregate value for each of the respective robots. The computer network 136 can select or recommend a robot from one of the plurality of robots as a function of the aggregate value for each of the plurality of robots. For example, the robot with the highest aggregate value can optionally be selected or recommended, or the robot with the lowest aggregate value can optionally be selected or recommended by computer network 136.

In one optional ranking regression method, the computer network 136 assigns a numerical value to each of the plurality of features of a robot and determines an aggregate value for each robot as a function of the numerical value of each of the features of the respective robot. The numerical can be of any suitable type, including a cost-based value. In any embodiment, the aggregate value for each robot can optionally be the sum of the numerical values of each of the plurality of features of the robot.

In one optional ranking regression method, the computer network 136 utilizes a neural network in evaluating each of the plurality of robots. In one such method, the computer network trains a neural network with a set of example robots to provide a trained neural network and assigns a numerical value to each of the plurality of features for each of the plurality of robots. The aggregate value for each robot can optionally be computed by network 136 applying the trained neural network to the plurality of features for each of the robots.

In one optional ranking regression method, the computer network 136 utilizes a kernel method in evaluating each of the plurality of robots. In one such method, the computer network trains a kernel method with a set of example robots to provide a plurality of support vectors and a weight for each of the plurality of support vectors and assigns a numerical value to each of the plurality features for each of the plurality of robots. The aggregate value for each robot can optionally be computed by network 136 applying the plurality of support vectors and the weights to the plurality of features for each of the robots.

In one optional ranking regression method, the computer network 136 utilizes a decision tree in evaluating each of the plurality of robots. In one such method, the computer network trains a decision tree with a set of example robots to provide a trained decision tree and assigns a numerical value to each of the plurality of features for each of the plurality of robots. The aggregate value for each robot can optionally be computed by network 136 applying the trained decision tree to the plurality of features for each of the robots.

The computer network 136 can permit the user or buyer to select one of the plurality of robots, for example based upon a recommendation of the network, or the computer network can select one of the plurality of robots autonomously, for example without input form the user or buyer. The foregoing method of selecting one of a plurality of robots can optionally be utilized independently of system 113 and the other methods and components of the system 113.

The robot 114 can travel to the first location from a facility associated with the system, after a previous delivery, en route to another delivery or otherwise. The route traveled by robot 114 to the first location can optionally include any portion of transportation network 101. Such travel by robot 114, including any portion thereof, can be accomplished without human assistance, with human assistance, semi-autonomously or autonomously.

Once at the first location, the robot 114 can pick up the one or more articles 121. Such pick up can include human delivery or placement of the article into the at least one container 186 of the robot or pickup of the article by the robot 114 without human assistance. The one or more articles 121 can be transported directly by system 113 or placed in a transportation container, such as a transportation container 361, which can be transported by system 113. In one possible step, a transportation container 361, for example an open container of a standardized size and shape, is received by deliverer for use in delivering the one or more articles 121. Such one or more articles can optionally be placed in the transportation container 361 by the deliverer for pickup by a robot 114 of system 113. For simplicity, the methods herein shall discuss transport of one or more articles 121 within a transportation container 361, it being understood that such methods apply equally to transport of one or more articles 121 directly, that is not in a transportation container 361.

Computer network 136 can cause or direct robot 114 to pick up the transportation container 361 at the first location. The computer network 136 can cause or direct robot 114 to move or place the transportation container 361 inside the robot at the first location. In any method of the invention, the pickup of the article by robot 114 can optionally include picking up the transportation container 361 containing the article 121, from a support surface such as the ground upon which the transportation container 361 has been left for pickup (see FIGS. 32 and 33). Such actions by robot 114, including any part thereof, can be accomplished without human assistance, with human assistance, semi-autonomously or autonomously. Such actions can optionally include the use of computer vision by robot 114. In any embodiment, the transport mechanism of the at least one container 186, for example transport mechanism 329 of one of containers 115 of the at least one container 186, can optionally be used in this regard. In any embodiment, one of the lower containers 115 of the robot 114, for example one of containers 115 sitting directly on base 281 of the chassis 187, can optionally be utilized for receiving the transportation container 361.

Figure 32:
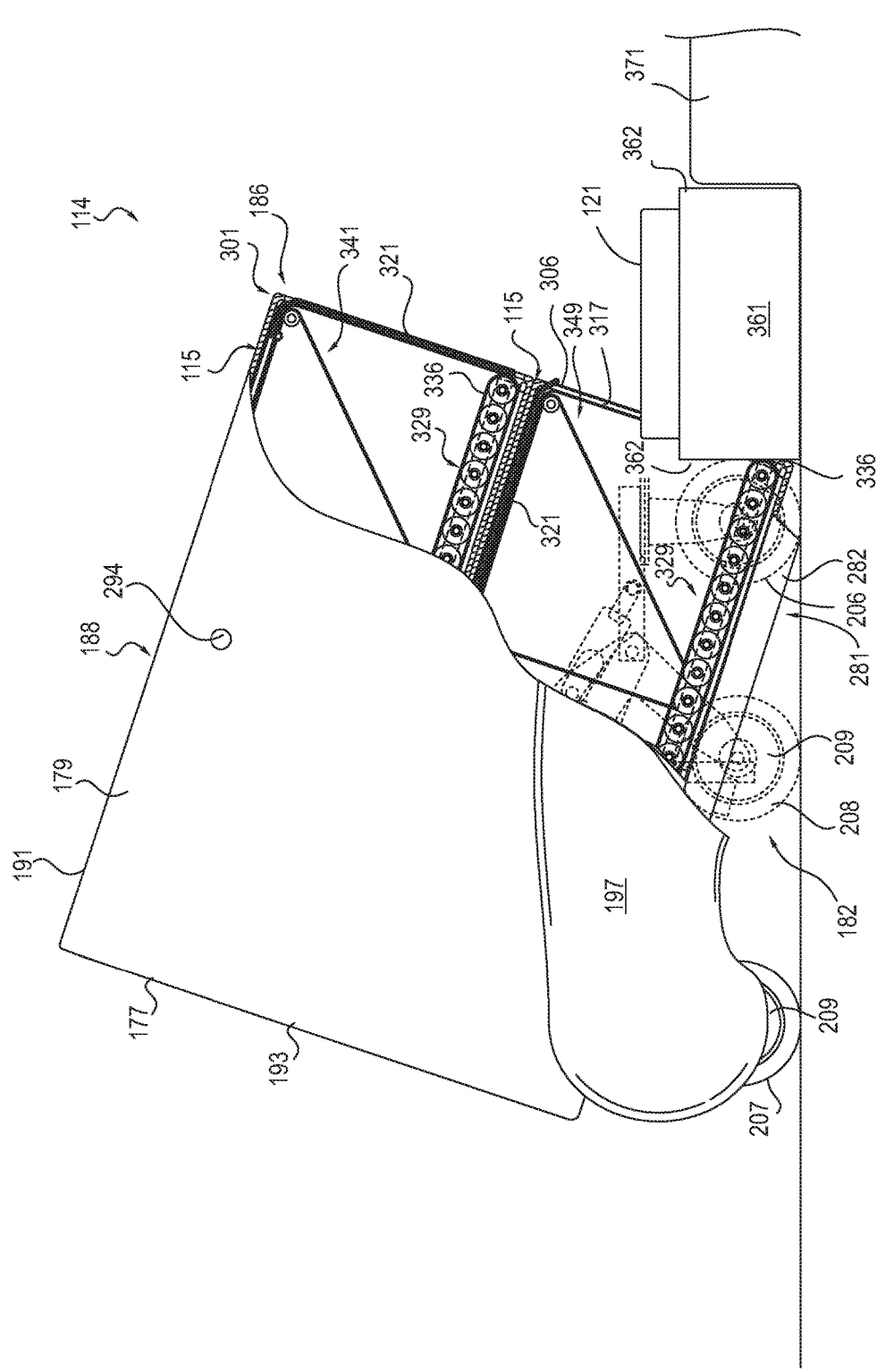
FIG. 32 is a side elevational view of one step of one method of the robot of FIG. 5, partially cut away, picking up an article from the ground.

In one possible step of such method, the container 115 can optionally be positioned by robot 114 so that front end 306 of one of the containers 115 of robot 114 is nearby or on the ground in the vicinity of the transportation container 361 containing the article 121. For example, first and second wheel assemblies 181, 182, including pivot assemblies 217, 227 thereof, can optionally be used to maneuver robot 114 so that the front end 306 of the container 115 is adjacent one side of the transportation container 361, such as one side wall 362 of the transportation container 361. In one possible step, the opening 317 of the container 115 can optionally be aligned or registered with the transportation container 361. Robot 114, for example one end 176, 177 of the robot, can push transportation container 361 over the ground to a position up against a stationary object 371, for example an immovable object such as a curb, wall, post or door. In one possible step, the deliverer places the transportation container 361 against a stationary object 371. Attachment assembly 249 of the robot, including first and second translational adjustment mechanisms 252, 253 and first and second pivot assemblies 261, 262, can optionally be used to lower chassis 187 towards or onto the ground, for example as illustrated in FIG. 32, and if desired tilt the chassis 187 so that one end 282, 283 of the base 281 of the chassis is closer to the ground than the other end, for example first end 282 of base 281 as shown in FIG. 32.

In one possible step of such method, such lowered or tilted chassis 187, or both, can facilitate robot 114 pushing or urging transportation container 361 up against such the stationary object 371. Once door 321 of the appropriate transport container 115 of robot 114 is opened, for example by door opening mechanism 341, the front of the transport mechanism 329 of the container 115 can optionally be pushed against transportation container 361 so as to engage the transportation container and urge or push it against object 371. In any embodiment, a portion of the transportation container 361 extends inside the transport container 115, for example into interior 316 of the transport container, so as to contact transport mechanism 329, for example the front end of belt 336. The robot 114 can urge the forward or front end of belt 336 of the transport mechanism 329 of the container 115 against the transportation container 361 and activate motor 337 of the transport mechanism to rotate the forward end of the belt 336 upwardly so as to lift the engaged end 362 or other surface of the transportation container 361 upwardly onto the belt 336. Transport mechanism 329 can then be utilized to move the transportation container 361 into the interior of the robot, for example into the interior 316 of the transport container 115. The robot 114 can optionally be moved forwardly during this process to facilitate the transportation container 361 being lifted onto the top surface of the belt 336, moved into container 115 or both. The pickup or loading process can optionally be controlled by computer network 136, including robot computer 156, which can utilize input from one or more of sensors 162 and weight sensor 356. The structure or components of the robot for picking up an article 121 or transportation container 361 can be of any suitable type and referred to as a pickup assembly, mechanism or apparatus. For example, such pickup assembly, mechanism or apparatus can optionally include attachment assembly 249, translational adjustment mechanisms 252, 253, pivot assemblies 261, 262, transport mechanism 329 or any combination of the foregoing.

Upon receipt of the transportation container 361, and the one or more articles 121 therein, door 321 of the container 115 can optionally be closed and robot 114 directed by computer network 136 to the second location. In one possible step of the method, signals received by computer network 136 from weight sensors 356 in the transport container 115 can optionally be utilized to determine whether the weight of the article 121 received by the container 115 conforms with the article designated for delivery by robot 114. In one possible step of the method, computer network 136 can record the receipt by transport container 115 of article 121 or transportation container 361 containing the article 121.

In any method of the invention, the pickup of the transportation container 361 by robot 114 can optionally include causing or directing the robot to pick up or retrieve the transportation container 361 from a pickup container 116, which can optionally be a stationary container into which the transportation container 361 has been left for pickup. In such methods, the pickup location can be referred to as being inside the pickup container 116. The transportation container 361, with the one or more articles 121 therein, is placed in the pickup container 116. In any embodiment or possible step where a human, which for example can optionally be the deliverer or an agent of the deliverer, is authorized or directed to place the transportation container in the pickup container 116, the computer network 136 can provide the human with an identifier of the pickup container 116, the location of the pickup container 116 and a code or key to access or unlock the pickup container so as to permit the article to be placed in the container 116. The code or key can be static or dynamic. In any embodiment, the human communicates with the computer network 136 after arriving at the pickup container 116 to unlock the container, for example to unlock door latch 349 of the container 115. In any embodiment, a physical key can optionally be utilized by the human to gain entry to the pickup container 116. The human can then manually open door 321 of the container 116 in any suitable manner or utilizing any suitable door opening apparatus, for example by utilizing latch 343' to disengage the door from cable portion 362a and thus permit the door to be manually opened by the human. In any embodiment, the human can activate transport mechanism 329 of the container 116 to facilitate placement of the transportation container 361 within the pickup container 116. After the container 116 receives the transportation container 361, the human can manually close door 321 of the container and reengage latch 343' with cable portion 362a. In any embodiment, the closing of the door 321 can serve to automatically engage latch 343' with cable 362, activate door latch 349 or both so that the container 116 is then locked and tamperproof.

Such pickup by robot 114 of the transportation container 361 from pickup container 116, including any step or part thereof, can be accomplished without human assistance, with human assistance, semi-autonomously or autonomously. In one possible step of such method, the desired container of robot 114, for example one of transport containers 115, can optionally be positioned by robot 114 so that front end 306 of the transport container 115 is nearby the front end 306 of the pickup container 116 (see FIG. 34). For example, first and second wheel assemblies 181, 182, including pivot assemblies 217, 227 thereof, can optionally be used to maneuver robot 114 so that the front end 306 of the transport container 115 is nearby the front end 306 of the pickup container 116.

In one possible step, the robot 114 aligns or registers the opening 317 of the transport container 115 with the opening 317 of the pickup container 116, for example using computer vision. In one possible step, the robot aligns or registers the transport mechanism 329 of the transport container 115, which can optionally be a conveyor system, with the transport mechanism 329 of the pickup container 116, which can optionally be a conveyor system. The transport mechanism of the pickup container 116 can be referred to as a pickup transport mechanism, a delivery transport mechanism, any of the other terms herein identified with respect thereto or any combination of the foregoing. In one possible step, the alignment of the two transport mechanisms 329, which can each be a conveyor system, can result in the top surface of the respective conveyor belts 336 of the containers being substantially parallel to each other for permitting transportation containers moved off of or delivered by the belt 336 of the pickup container 116 to be picked up by or received by the belt 336 of the transport container 115. In any embodiment, the front of the conveyor belts 336 of the two containers can optionally be relatively close to each other so as to facilitate or permit a transportation container 361 moving off one conveyor belt to be picked up by the opposing conveyor belt. In any embodiment, the conveyor belts of the two containers 115 can optionally be substantially horizontally aligned with each other so as to facilitate a transfer of a transportation container 361 between the two conveyor belts.

The robot 114 can optionally include an orientation assembly or mechanism which permits such alignment or registration. The transport container 115 can optionally be translated, pivoted, tilted, rotated or any combination of the foregoing by the robot 114, for example by the orientation assembly or mechanism of the robot, as part of such alignment or registration process. For example, the computer network 136 can cause robot 114 to translate transport container 115 in at least one of a vertical direction and a sideways direction and to pivot the transport container 115 about at least one axis so as to align the transport container 115 with the pickup container 116 or any other container or receiver of contents of the transport container 115. Such orientation assembly or mechanism can optionally include the three orthogonal axes adjustment mechanism hereof, the three orthogonal axes pivot or rotation mechanism hereof, or both. For example, one or more wheels of the robot 114, for example wheels 206, 207 and 208 of each bogie 201, can optionally be utilized to move the transport container 115 forwardly or rearwardly with respect to the pickup container 116, front wheels 206 and rear wheels 207, as pivoted 90° by respective pivot assemblies 217, 227, can optionally be utilized to move the transport container 115 sideways with respect to the pickup container, translational mechanisms 252, 253 can optionally be utilized to move the transport container 115 upwardly or downwardly with respect to the pickup container 116 or any combination of the foregoing can occur. As a further example, one or more of the wheels of the robot 114, for example front wheels 206 and rear rules 207, can optionally be pivoted 45° by respective pivot assemblies 217, 227 to thereafter pivot or rotate transport container 115 about axis 183 with respect to pick up container 116, first and second pivot assemblies 261, 262 can optionally be utilized to pivot or rotate transport container 115 about axis 202 with respect to pickup container 116, first and second translational adjustment mechanisms 252, 253 can optionally be utilized to pivot or rotate the transport container 115 about axis 250 with respect to the pickup container or any combination of the foregoing can occur.

In one possible step of such method, the positioning of the transport container 115 with respect to the pickup container 116 can optionally be controlled by computer network 136, including robot computer 156, which can utilize input from one or more of sensors 162. In any embodiment, one or both of cameras 293, 294 on the approaching end 176 or 177 of robot 114 can optionally be utilized by computer network 136 to visualize front end 306 of the pickup container 116 and to compare the input sensor signals received from the cameras 293, 294 with stored images or other data with respect to the pickup container and utilize algorithms stored in the computer network 136 to move the front end 306 of transport container 115 into registration with the front end 306 of the pickup container 116 so that the openings 317 of the two containers can optionally be aligned or registered with each other. In any embodiment, sensor input signals from radar or other distance sensors of robot 114 and from IMU sensor 296 can optionally be utilized by the computer network 136 in such registration and alignment step.

Upon registration of the opening 317 of the transport container 115 with the opening 317 of the pickup container 116, in any embodiment or possible step the face 352 of the transport container 115 engages the face 352 of the pickup container 116, permitting joining devices 351 to engage and secure the transport container 115 and the pickup container 116 together. Power can optionally be transferred from robot 114 to the pickup container 116, for example by engagement of the electrical connectors 353 on the transport container 115 with the respective electrical connectors 53 on the pickup container 116, so as to energize some or all of components 298 of the pickup container 116. For example, transceiver 171, computer 357, door opening mechanism 341, door latch 349, and transport mechanism 329 of the pickup container 116, or any combination thereof, can optionally be so energized by the robot. Computer network 136 and robot computer 156 can wirelessly communicate with container computer 327, for example by means of the robot transceiver 163 and container receiver 171. In any embodiment, communications connector 358 of the containers 115, 116 can optionally be utilized to provide hardwired communications between the containers. The computer network 136 can communicate with the pickup container 116 confirm the identity or address of the pickup container 116, to provide a suitable key or code to the pickup container for authorizing access to the pickup container, to provide direction to the pickup container or any combination of the foregoing. The key or code can be static or dynamic. In one possible step of the method, signals received by computer network 136, for example through robot computer 156 and container computer 357, from weight sensors 356 in the pickup container 116 can optionally be utilized to determine whether the weight of the article 121 therein conforms with the article designated for delivery.

In one possible step, the transportation container 361 and the one or more articles therein can then be transferred or moved in any suitable manner, for example by the transport mechanisms 329 of the containers 116, 115, from the pickup container 116 to the robot 114, for example to the transport container 115 of the robot. In one possible step, when one or both of the containers 116, 115 are closeable containers, the computer network 136 can open one or both of the containers. For example, computer network 136 can cause or direct the door opening mechanisms 341 of both containers 115, 116 to open the respective doors 321 of the containers so as to permit communication between the interiors 316 of the containers. Computer network 136 can further cause or direct the transport mechanisms 329 of both containers to be activated so as to move or transfer transportation container 361 from the interior of pickup container 116 to the interior of transport container 115 on robot 114 (see FIG. 34). For example, the computer network 136 can cause one or more articles of transportation containers to be retrieved from the pickup container 116 and placed in the transport container 115. More broadly, the computer network 136 can cause a first container to move an article or transportation container out of the first container, a second container to move an article or transportation container into the second container or both. The pickup container 116 can deliver one or more articles or transportation containers to the transport container 115. For example, transport mechanism 329 of the pickup container 116 can serve to move the transportation container 361 out of the container 116 for delivery to the transport container 115, such as until the transportation container 361 touches and engages the transport mechanism 329 of the transport container 115. The transport mechanism 329 of container 115 can thereafter move the transportation container 361 into the interior 316 of the transport container 115. Such transfer, from the conveyor system of pickup container 116 to the conveyor system of transport container 115, or more broadly from one container to another container or from one conveyor system to another conveyor system, can be referred to as a conveyor system transfer. Once the transportation container 361 has been fully received by transport container 115, the computer network 136 can cause or direct the doors 321 of both containers 115, 116 to close and move robot 114 away from pickup container 116. In one possible step of the method, signals received by computer network 136 from weight sensors 356 in the transport container 115 can optionally be utilized to determine whether the weight of the article therein conforms with the article designated for delivery by robot 114. In one possible step of the method, computer network 136 can record the receipt by transport container 115 of transportation container 361 containing the article 121. Any or all actions, directions, commands or instructions of the computer network 136 to the pickup container 116 can optionally be through robot 114, for example robot computer 156.

In a further step of the method of the invention, robot 114 can be navigated by computer network 136, including robot computer 156, over transportation network 101 from the first location to the second location, for example to deliver one or more articles 121 or transportation containers 361 to the second location. Such travel by robot 114, including any portion thereof, can be accomplished without human assistance, with human assistance, semi-autonomously or autonomously. The navigating step can optionally include the computer network 136 accessing a virtual map to chart a course over the transportation network 101 from the first location to the second location. The route of robot 114 over transportation network 101 can optionally be determined initially by computer network 136, for example by considering factors such as traffic and weather, and can optionally include travel over roads, bike paths and sidewalks for example. The route of robot 114 can optionally be changed, for example as a result of input received by the computer network 136 from any of sensors 162. One example of a route travel by robot 114 between a first location and a second location is illustrated in FIG. 1. The first location can optionally be in the vicinity of a deliverer 118, for example a pickup container 116 associated with the deliverer 118. Robot 114 is shown traveling on a route that includes an alley 106, a sidewalk 104, a crosswalk 107, a bike path 103 and a further crosswalk 107, sidewalk 104 and bike path 103 before reaching deliveree 119, for example a recipient container 117 associated with the deliveree 119. Such navigation can optionally include the use of computer vision.

In any embodiment or possible step, the input signals from any or all of sensors 162 can optionally be used for relaying real-time information with respect to such navigation and the possible or contemplated routes of robot 114 to computer network 136 for analysis. In any embodiment, the input signals from any or all of sensors 162 can optionally be used for observing the terrain encountered by robot 114, which can optionally be used by the computer network 136 to prepare or update maps of the terrain, including changes in transient, dynamic or other objects, newly traveled routes, newly encountered buildings or structures and other information that may be useful in navigating other robots between locations. At least some such maps can be two-dimensional or three-dimensional, and in each case can optionally be updated on a real-time basis by the robots 114 of system 113.

The delivery by robot 114 of the transportation container 361 at the second location can be performed in any suitable manner. In any method of the invention, the article 121 can optionally be retrieved from the robot 114 by a human at the second location. The human can remove the one or more articles from the transportation container 361, and leave the transportation container 361 in robot or retain the transportation container 361 for future use with system 113. Computer network 136 can cause or direct the robot to deliver the transportation container 361 at the second location, for example free of human assistance. In any method of the invention, the delivery of the transportation container 361 by the robot 114 can optionally include delivery of the transportation container 361 to a recipient container 117 at the second location. In such methods, the recipient or delivery location can be referred to as being inside the recipient container 117. Such delivery by robot 114 of the transportation container 361 to the recipient container 117, including any step or part thereof, can be accomplished without human assistance, with human assistance, semi-autonomously or autonomously. The opening 317 of the transport container 115 of the robot 114 can optionally be registered or aligned with the opening 317 of the recipient container 117, for example in a manner similar to that discussed above with respect to the pickup of an article by robot 114 from a pickup container 116 (see FIGS. 34-35, 39 and 41). Such aligning or registering can optionally be accomplished with the assistance of computer vision. In any method of the invention, the desired container of robot 114, for example one of transport containers 115, can optionally be positioned by robot 114 so that front end 306 of the transport container 115 is nearby the front end 306 of the recipient container 117. For example, first and second wheel assemblies 181, 182, including pivot assemblies 217, 227 thereof, can optionally be used to maneuver robot 114 so that the front end 306 of the transport container 115 is nearby the front end 306 of the recipient container 117.

In one possible step, the robot 114 aligns or registers the opening 317 of the transport container 115 with the opening 317 of the recipient container 117. In one possible step, the robot aligns or registers the transport mechanism 329 of the transport container 115, which can optionally be a conveyor system, with the transport mechanism 329 of the recipient container 117, which can optionally be a conveyor system. The transport mechanism of the recipient container 117 can be referred to as a recipient transport mechanism, a receiving transport mechanism, any of the other terms herein identified with respect thereto or any combination of the foregoing. In one possible step, the alignment of the two transport mechanisms 329, which can each be a conveyor system, can result in the top surface of the respective conveyor belts 336 of the containers being substantially parallel to each other for permitting transportation containers moved off of or delivered by the belt 336 of the transport container 115 to be picked up by or received by the belt 336 of the recipient container 116. In any embodiment, the front of the conveyor belts 336 of the two containers can optionally be relatively close to each other so as to facilitate or permit transportation container 361 moving off one conveyor belt to be picked up by the opposing conveyor belt. In any embodiment, the conveyor belts of the two containers 115 can optionally be substantially horizontally aligned with each other so as to facilitate a transfer of a transportation container 361 between the two conveyor belts.

The robot 114 can optionally include an orientation assembly or mechanism which permits such alignment or registration. The transport container 115 can optionally be translated, pivoted, tilted, rotated or any combination of the foregoing by the robot 114, for example by the orientation assembly or mechanism of the robot, as part of such alignment or registration process. For example, the computer network 136 can cause robot 114 to translate transport container 115 in at least one of a vertical direction and a sideways direction and to pivot the transport container 115 about at least one axis so as to align the transport container 115 with the recipient container 117. Such orientation mechanism can optionally include the three orthogonal axes adjustment mechanism hereof, the three orthogonal axes pivot or rotation mechanism hereof, or both. For example, one or more wheels of the robot 114, for example wheels 206, 207 and 208 of each bogie 201, can optionally be utilized to move the transport container 115 forwardly or rearwardly with respect to the recipient container 117, front wheels 206 and rear wheels 207, as pivoted 90° by respective pivot assemblies 217, 227, can optionally be utilized to move the transport container 115 sideways with respect to the recipient container, translational mechanisms 252, 253 can optionally be utilized to move the transport container 115 upwardly or downwardly with respect to the recipient container 117 or any combination of the foregoing. As a further example, one or more of the wheels of the robot 114, for example front wheels 206 and rear rules 207, can optionally be pivoted 45° by respective pivot assemblies 217, 227 to thereafter pivot or rotate transport container 115 about axis 183 with respect to recipient container 117, first and second pivot assemblies 261, 262 can optionally be utilized to pivot or rotate transport container 115 about axis 202 with respect to recipient container 117, first and second translational adjustment mechanisms 252, 253 can optionally be utilized to pivot or rotate the transport container 115 about axis 250 with respect to the recipient container or any combination of the foregoing.

In one possible step, the positioning of the transport container 115 with respect to the recipient container 117 can optionally be controlled by computer network 136, including robot computer 156, which can utilize input from one or more of sensors 162. In any embodiment, one or both of cameras 293, 294 on the approaching end 176 or 177 of robot 114 can optionally be utilized by computer network 136 to visualize front end 306 of the recipient container 117 and to compare the input sensor signals received from the cameras 293, 294 with stored images or other data with respect to the recipient container and utilize algorithms stored in the computer network 136 to move the front end 306 of transport container 115 into registration with the front end 306 of the recipient container 116 so that the openings 317 of the two containers can optionally be aligned or registered with each other. In any embodiment, sensor input signals from radar or other distance sensors of robot 114 and from IMU sensor 296 can optionally be utilized by the computer network 136 in such registration and alignment step.

Once the containers 115, 117 are aligned so that the openings 317 thereof face each other, in one possible step the containers can optionally be secured together for example by joining devices 351. In one possible step, power can optionally be transferred from the robot 114 to the recipient container 117, for example by means of electrical connectors 353 of the two containers, so as to power some or all of components 298 of the recipient container 117. For example, transceiver 171, computer 357, the transport mechanism 329, door opening mechanism 341 and door latch 349 of the recipient container 117, or any combination thereof, can optionally be so energized by the robot. Computer network 136 and robot computer 156 can wirelessly communicate with computer 357 of the recipient container 117, for example by means of the robot transceiver 163 and recipient container receiver 171. In any embodiment, communications connector 358 of the containers 115, 117 can optionally be utilized to provide hardwired communications between the containers. The computer network 136 can communicate with the recipient container 117 to confirm the identity or address of the recipient container 117, to provide a suitable key or code to the recipient container for authorizing access to the pickup container, to provide direction to the pickup container, or any combination of the foregoing. The key or code can be static or dynamic.

Computer network 136 can cause robot 114 to remove the transportation container 361 from within the robot for delivery to the second location. In one possible step, the transportation container 361 and the one or more articles therein can then be transferred or moved in any suitable manner, for example by the transport mechanisms 329 of the containers 115, 117, from the robot 114, for example the transport container 115 of the robot, to the recipient container 117. In one possible step, when one or both of the containers 115, 117 are closeable containers, the computer network 136 can open one or both of the containers. For example, computer network 136 can direct the door opening mechanisms 341 of both containers 115, 117 to open the respective doors 321 of the containers so as to permit communication between the interiors 316 of the containers. Computer network 136 can further direct the transport mechanisms 329 of both containers to be activated so as to move transportation container 361 from the interior of transport container 115 on robot 114 to the interior of recipient container 117 (see FIG. 34). For example, transport mechanism 329 of the transport container 115 can serve to move the transportation container 361 out of the container 115 for delivery to the recipient container 117 or other second location, for example until the transportation container 361 touches and engages the transportation mechanism 329 of the recipient container 117. Computer network 136 can cause recipient container 117 to move transportation container 361 inside the recipient container at the second location. For example, the transport mechanism 329 of the recipient container 117 can move or place the transportation container 361 into the interior 316 of the recipient container 117. Once the transportation container 361 has been fully received by recipient container 117, the computer network 136 can direct the doors 321 of both containers 115, 117 to close and move robot 114 away from recipient container 117. Such transfer, from the conveyor system of transport container 115 to the conveyor system of recipient container 117, can be referred to as a conveyor system to conveyor system transfer. In one possible step of the method, signals received by computer network 136, for example through robot computer 156 and container computer 357, from weight sensors 356 in the recipient container 117 can optionally be utilized to determine whether the weight of the article 121 therein conforms with the articles designated for delivery to the recipient container 117. In one possible step of the method, computer network 136 can record the receipt by recipient container 117 of transportation container 361 containing the article 121. Any or all actions, directions, commands or instructions of the computer network 136 to the recipient container 117 can optionally be through robot 114, for example robot computer 156.

Figure 34:
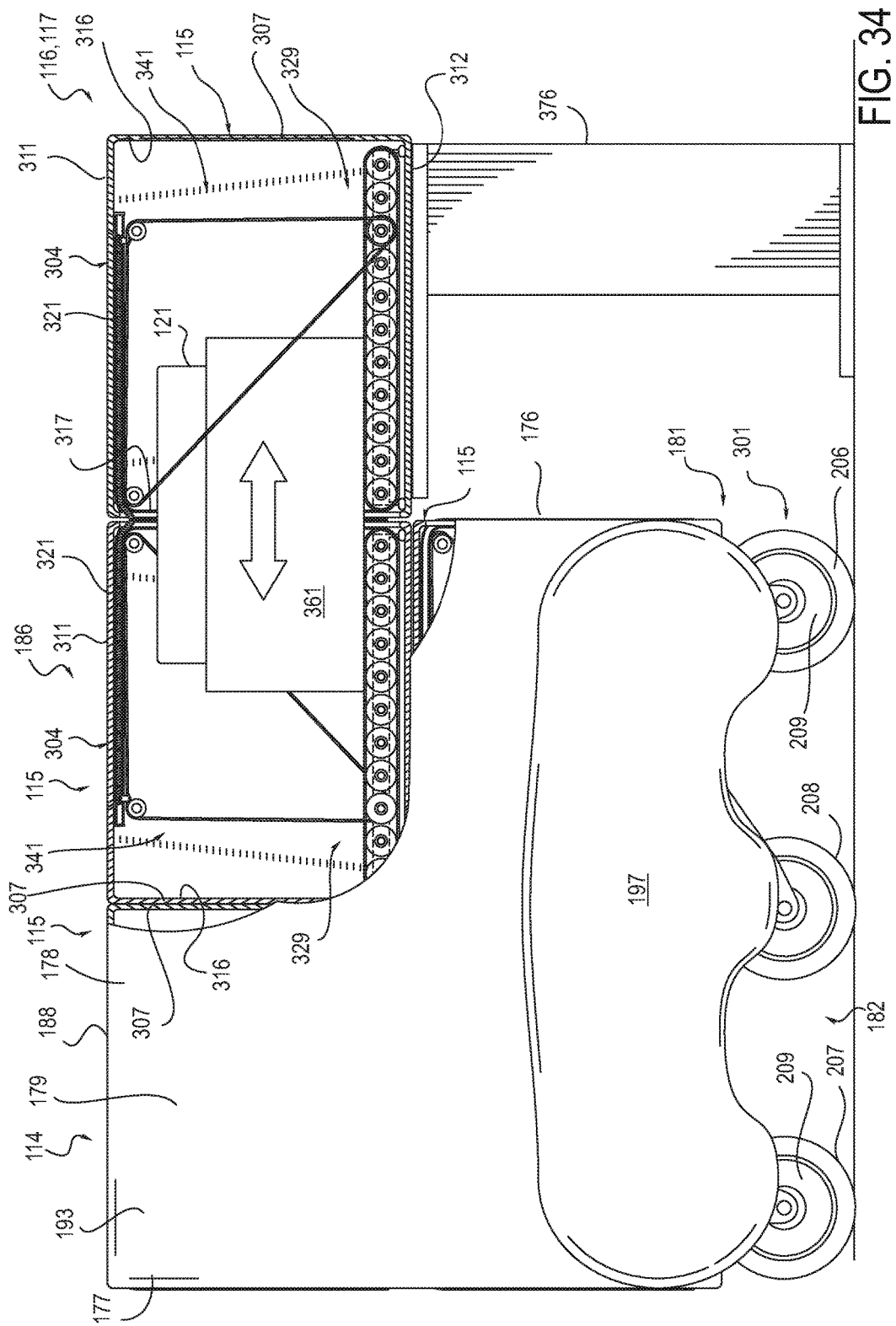
FIG. 34 is one embodiment of a method for transferring an article between the robot of FIG. 5 and a stationary container.
Figure 35:
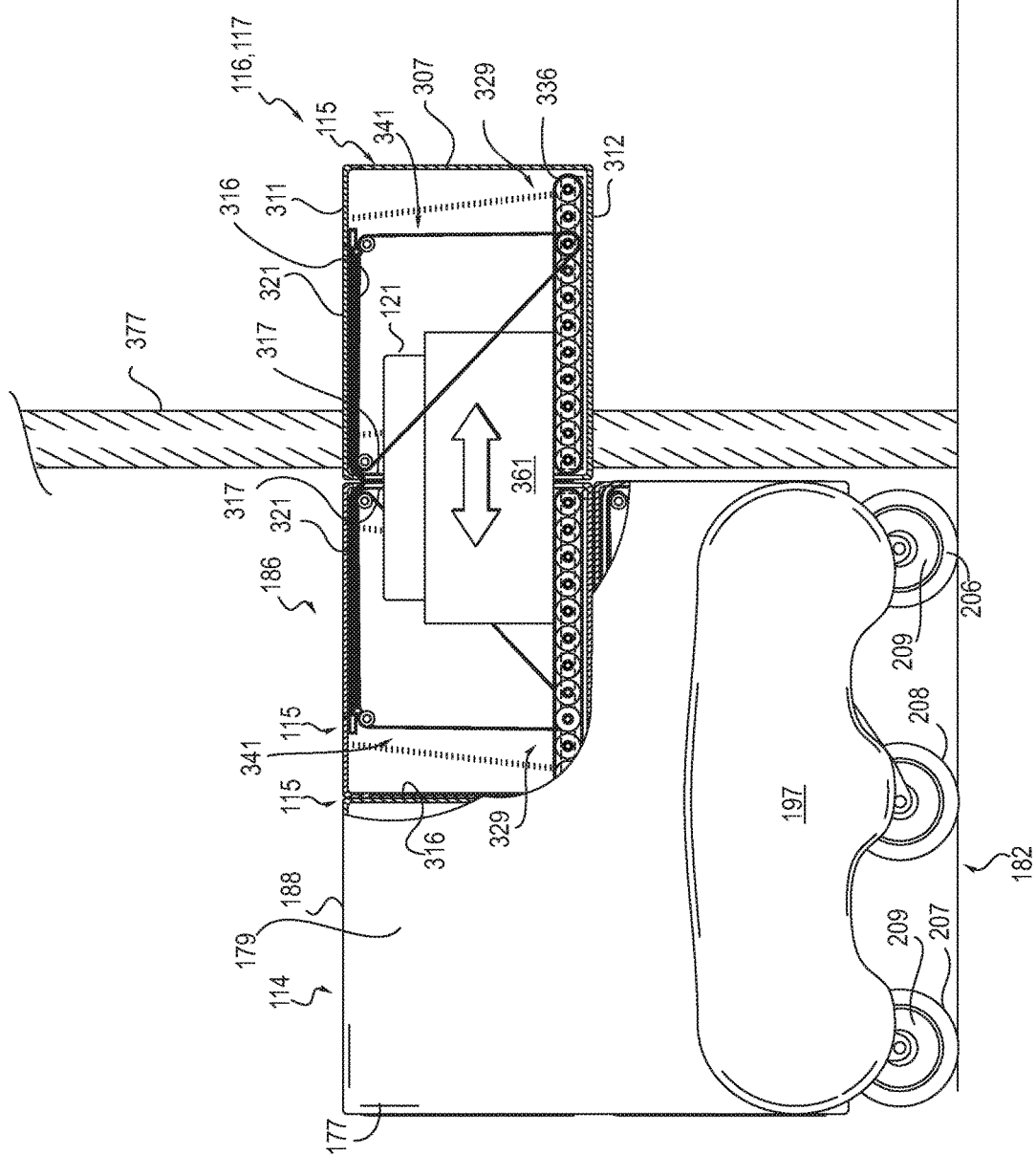
FIG. 35 is one embodiment of a method for transferring an article between the robot of FIG. 5 and another embodiment of a stationary container for use in the robot delivery system of FIG. 1.
Figure 36:
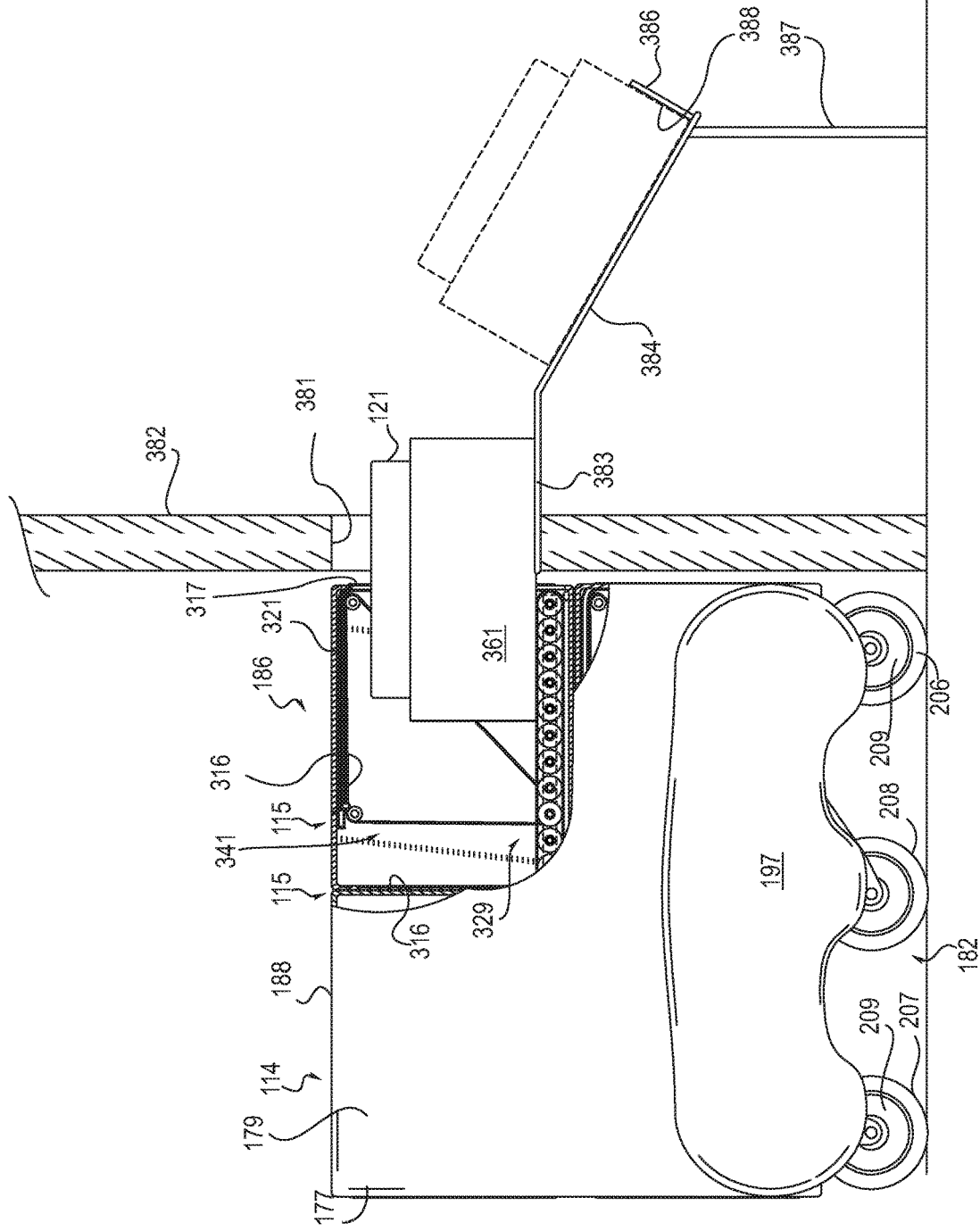
FIG. 36 is one embodiment of a method for transferring an article from a robot of FIG. 5 to a delivery location.
Figure 37:
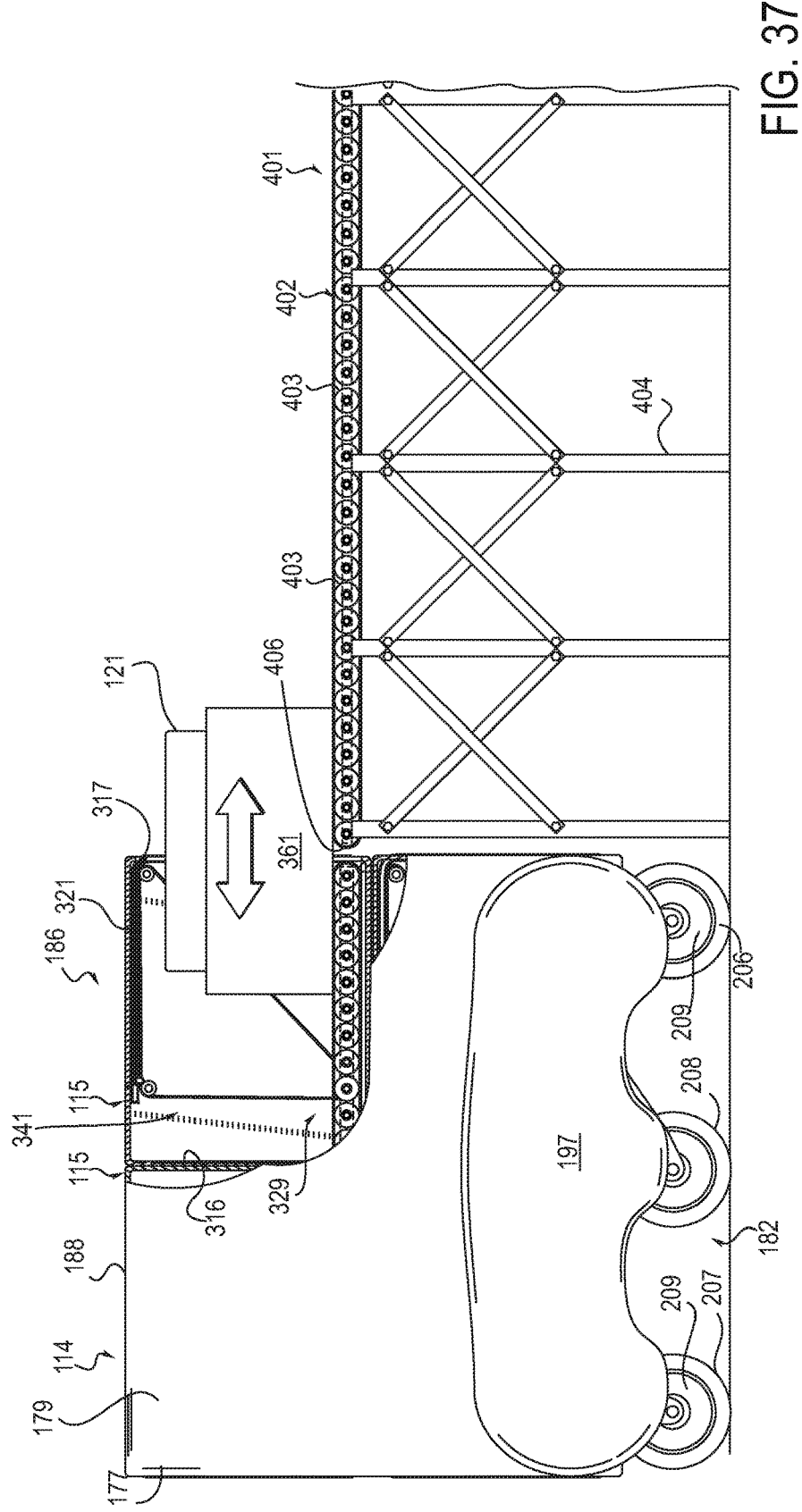
FIG. 37 is one embodiment of a method for transferring an article between a robot of FIG. 5 to an article transport mechanism.
Figure 38:
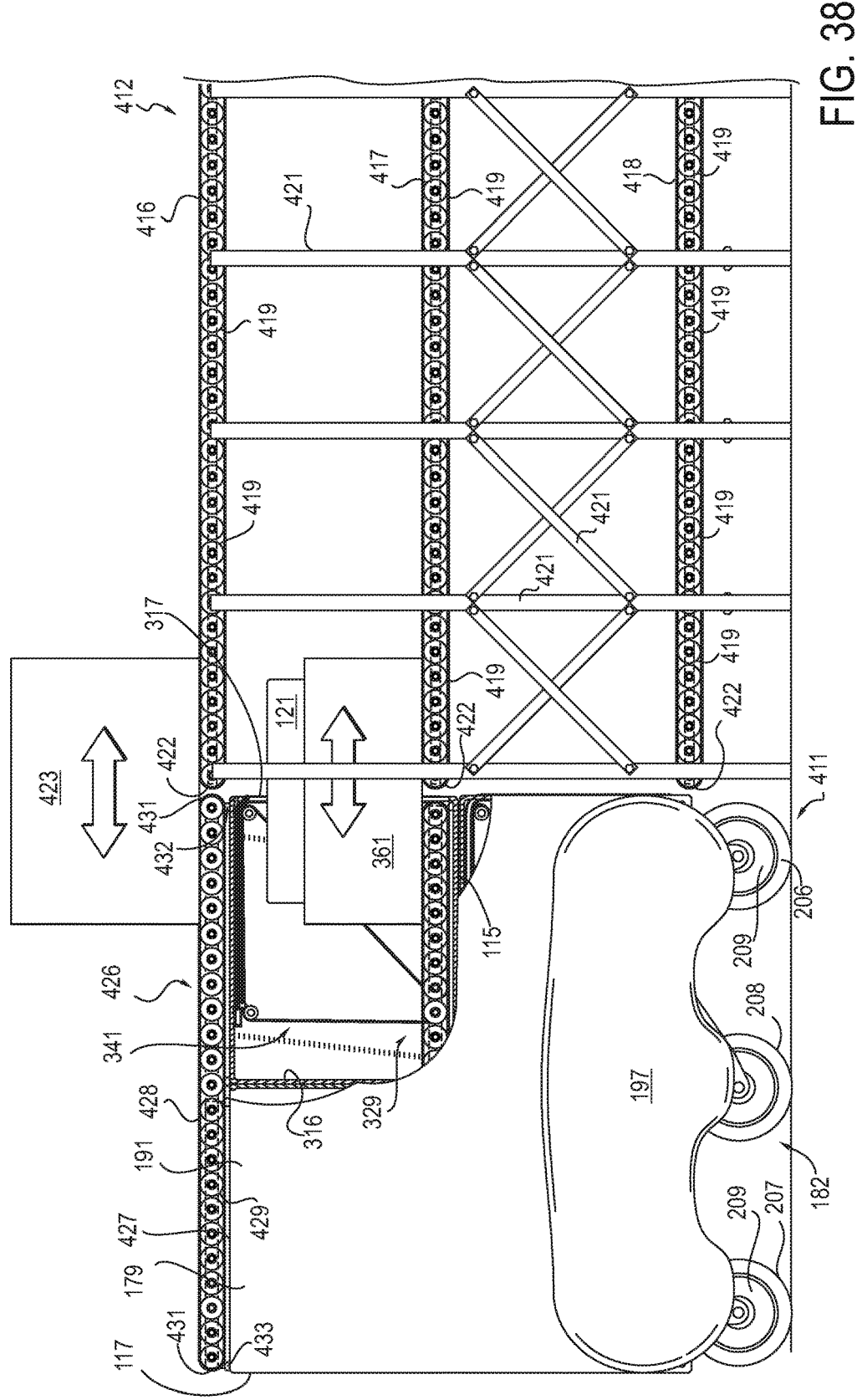
FIG. 38 is one embodiment of a method for transferring an article between a robot of the robot delivery system of FIG. 1 and an article transport mechanism.
Figure 39:
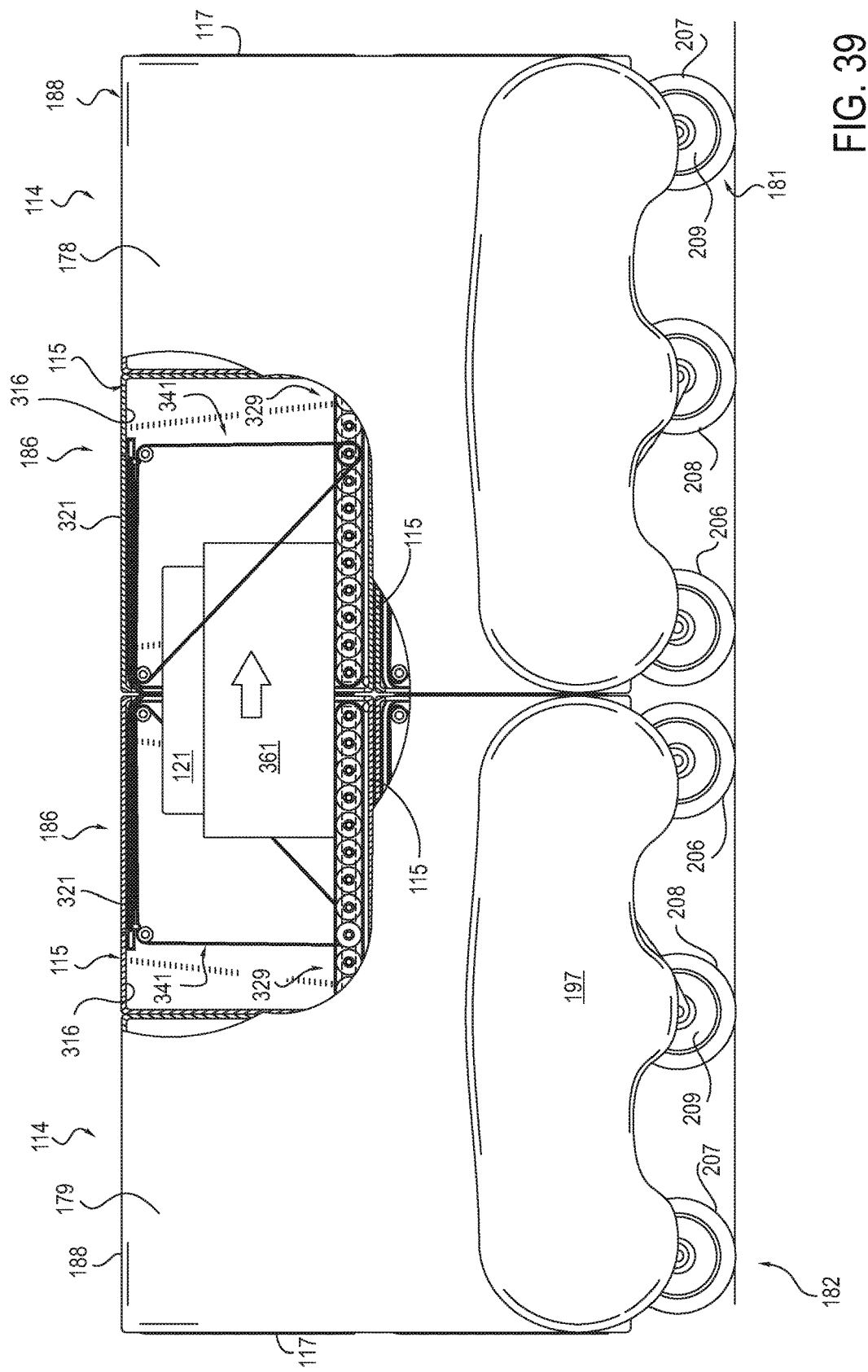
FIG. 39 is a one embodiment of a method for transferring an article from a first robot of FIG. 5 to a second robot of FIG. 5.

The pickup containers 116 and recipient containers 117 of the invention can be of any suitable type, for example any stationary container 115 located at the first or pickup location, at the second or drop off location, at another location within transportation network 101 or at any other location. As illustrated in FIG. 34, for example, a pickup container 116 or a recipient container 117 can optionally be a container 115 rigidly mounted to a rigid support 376, such as a post, extending upwardly from the ground. The container 115 can optionally be mounted atop the post 376, as shown in FIG. 34, or at any other location on the post 376. As illustrated in FIG. 35, for example, a pickup container 116 or a recipient container 117 can optionally be a container 115 rigidly mounted to a rigid support 377, such as a wall. The wall 377 can optionally be part of a building or part of any other structure, for example the wall of the home of the deliveree or user. The wall 377 can optionally be the outer wall of the structure, such that the container 115 extends into the structure. The majority of the container 115 can extend inside, or be located in, the structure. In any embodiment, front end 306 of the container 115 can optionally be substantially flush with the outer surface of wall 337. In any embodiment, the container 115 can optionally include a second or other opening (not shown) into the interior 316 of the container that can optionally be accessed from inside the structure, for example by the deliveree or user. Such second or other opening can optionally be lockable, and for example include a door, or be not lockable. Such second or other opening can optionally be inside the building, so as to permit access to the container 115 from within the building.

In any embodiment or possible step where a human, which for example can optionally be the deliveree, an agent of the deliveree or purchaser of the one or more articles 121, is authorized or directed to retrieve the transportation container 361 in the recipient container 117, the computer network 136 can provide the human with an identifier of the recipient container 117, the location of the recipient container 117 and a code or key to access or unlock the recipient container so as to permit the article 121 to be removed from the container 117. The code or key can be static or dynamic. In any embodiment, the human communicates with the computer network 136 after arriving at the recipient container 117 to unlock the container, for example to unlock door latch 349 of the container 115. In any embodiment, a physical key can optionally be utilized by the human to gain entry to the recipient container 117. The human can then manually open door 321 of the container 117 in any suitable manner or utilizing any suitable door opening apparatus, for example by utilizing latch 343' to disengage the door from cable portion 362a and thus permit the door to be manually opened by the human. In any embodiment, the human can activate transport mechanism 329 of the container 117 to facilitate removal of the transportation container 361 from the recipient container 117. After the transportation container 361 has been removed from the recipient container 117, the human can manually close door 321 of the container and reengage latch 343' with cable portion 362aIn any embodiment, the closing of the door 321 can serve to automatically engage latch 343' with cable 362, activate door latch 349 or both so that the container 117 is then locked and tamperproof. The human can remove the one or more articles 121 from the transportation container 361. In any embodiment, the human retains the transportation container 361 for use at a later time with system 113. In any embodiment, the human leaves the transportation container 361 within the recipient container 117 for retrieval by a robot 114 of the system at a later time.

In any method of the invention, the delivery of the transportation container 361 by robot 114 can optionally include dropping off or placing the transportation container 361 containing the article 121 onto a support surface such as the ground, for example using computer vision. Such delivery by robot 114 of the transportation container 361, including any step or part thereof, can be accomplished without human assistance, with human assistance, semi-autonomously or autonomously. The drop off location can optionally be determined by any suitable algorithm included in computer network 136, for example an observation by sensors 162 carried by robot 114 of various potential drop off locations at the second location and comparing them to categories of rated drop off locations stored in computer network 136. In any method of the invention, computer network 136 determines which highest rated drop off location is available and directs the robot 114 to drop the transportation container 361 at such location.

In one possible step, the drop off location can optionally be a specific or precise location at the second location designated by the user, for example included in the request of the user. The specific or precise location, as noted above, can optionally be a specific or precise location on the ground at the second location as well as on other surfaces or in containers 115 at the second location. In any method of the invention, sensors 162 of robot 114 compare images of the terrain at and around the second location with the photograph or other image provided by the user, for example image 367 with indicator 368 thereon provided with the user's request, to locate or determine at the second location the precise drop off location shown by indicator 368 or otherwise identified by the user on its photograph or other image. Robot 114 can optionally be directed by computer network 136, including robot computer 156, to drop the article or transportation container 361 at such precise location. In any embodiment, the drop off location has been indicated by the deliveree by any other suitable means or manner.

Computer network 136 can cause or direct robot 114 to drop off or place the transportation container 361 on the ground at the specified location or otherwise at the second location, for example free of human assistance. The routine for robot 114 dropping the transportation container 361 onto the ground or other support surface can be performed in any suitable manner, for example similar to the routine discussed above with respect to the pickup by robot 114 of transportation container 361 left for pickup on the ground or other support surface. In any embodiment, the transport mechanism of the at least one container 186, for example transport mechanism 329 of one of containers 115 of the at least one container 186, can optionally be used in this regard. In any embodiment, one of the lower containers 115 of the robot 114, for example one of containers 115 sitting directly on base 281 of the chassis 187, can optionally be utilized when the transportation container 361 is to be dropped off on the ground or on another support surface at the second location.

Figure 33:
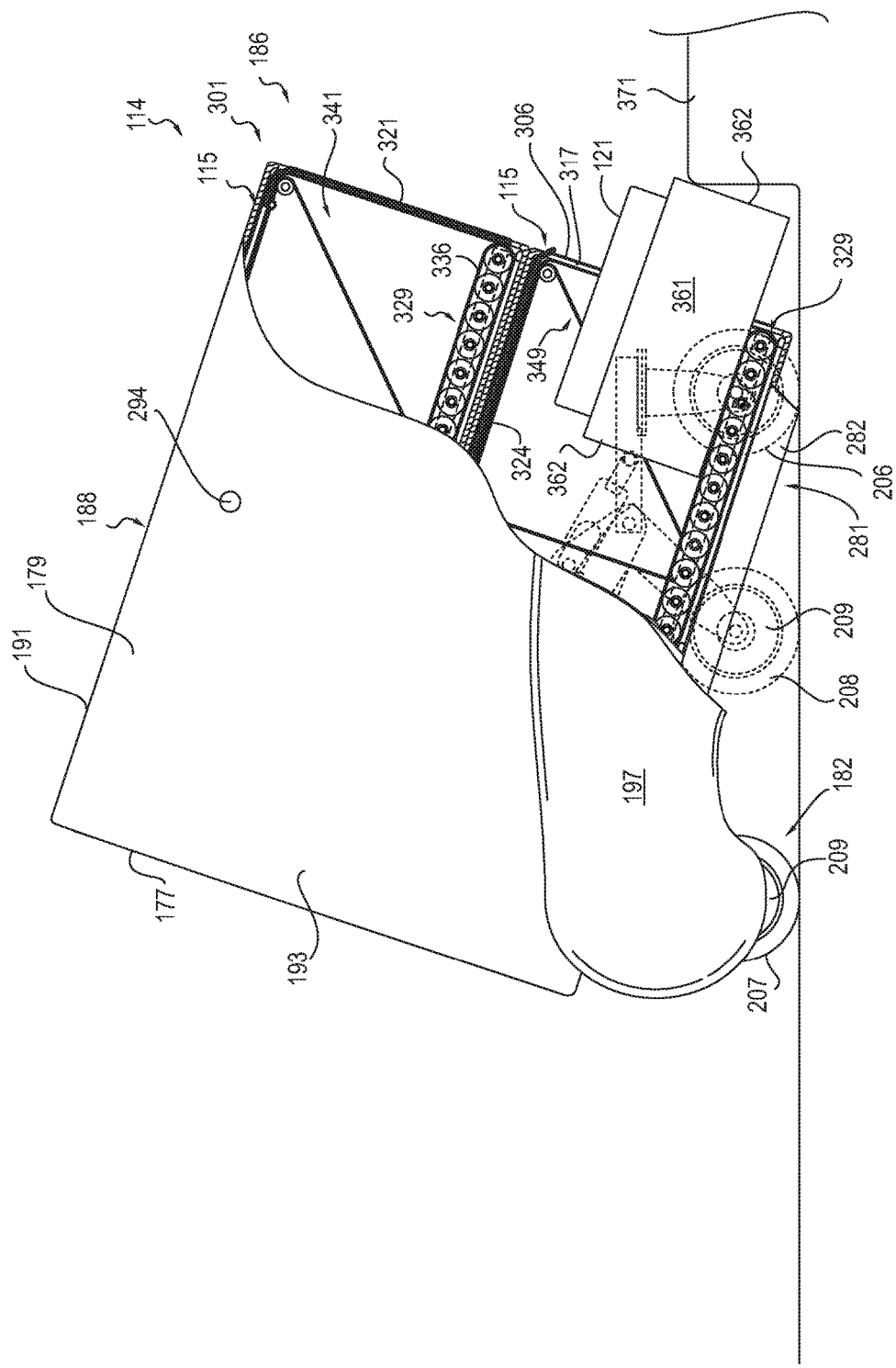
FIG. 33 is a side elevation view of another step of one method of the robot of FIG. 5, partially cut away, picking up an article from the ground.

In one possible step of such method, the container 115 can optionally be positioned by robot 114 so that front end 306 of one of the containers 115 is nearby or on the drop off location. For example, first and second wheel assemblies 181, 182, including pivot assemblies 217, 227 thereof, can optionally be used to maneuver robot 114 so that the front end 306 of the container 115 is adjacent or nearby the drop off location. Attachment assembly 249 of the robot, including first and second translational adjustment mechanisms 252, 253 and first and second pivot assemblies 261, 262, can optionally be used to lower chassis 187 towards or onto the ground. If desired, the chassis 187 can optionally be tilted so that one end 282, 283 of the base 281 of the chassis is closer to the ground than the other end, for example the first end 282 of the base 281 as illustrated in FIGS. 32-33. Once door 321 of the appropriate transport container 115 of robot 114 is opened, for example by door opening mechanism 341, transport mechanism 329 within the transport container 115 can optionally be utilized to move the transportation container 361 out of the interior 316 of the robot, for example out of opening 317 of interior 316 of the transport container 115, and onto the ground at the drop off location. The robot 114 can optionally be moved rearwardly during this process to facilitate the transportation container 361 being moved out of the container 115, being dropped or placed on the ground at the drop off location, or both. The drop off or unloading process can optionally be controlled by computer network 136, including robot computer 156, which can utilize input from one or more of sensors 162 and weight sensor 356.

Upon delivery of the transportation container 361 to the drop off location, and the one or more articles therein, door 321 of the container 115 can optionally be closed and robot 114 directed by computer network 136 to another location. In one possible step of the method, signals received by computer network 136 from weight sensors 356 in the transport container 115 can optionally be utilized to conform that the transportation container 361 is no longer in the container 115 of the robot 114. In one possible step of the method, computer network 136 can record the delivery by robot 114 of the transportation container 361 from the transport container 115 of the robot to the drop off location. A human, for example the deliveree or purchaser, can remove the one or more articles 121 from the transportation container 361. In any embodiment, the human retains the transportation container 361 for use at a later time with system 113.

System 113 can optionally include delivery of transportation container 361 by robot 114 at other locations that do not include a container 115. Computer network 136 can cause or direct the robot 114 to deliver the transportation container 361 at such other locations, for example free of human assistance. For example, the second or drop off location can optionally be inside of any suitable structure, for example a building. In any embodiment, the drop off location can optionally include a support surface for receiving the transportation container 361. In any method of the invention, robot 114 can deliver transportation container 361 to an opening 381 provided in a wall 382 of a structure (see FIG. 36). Such delivery by robot 114 of the transportation container 361, including any step or part thereof, can be accomplished without human assistance, with human assistance, semi-autonomously or autonomously. Such delivery can optionally be accomplished with the assistance of computer vision. The opening 381 can access the interior of the structure. Computer network 136 and robot computer 156 can verify the correctness of the opening 381 in any suitable manner, for example by visualizing the opening 381 with robot cameras 293, 294 and comparing the images received from such cameras with an image or other data associated with the opening stored in computer network 136. In any embodiment, such verification can optionally be accomplished by computer network 136 wirelessly or otherwise communicating, for example through robot transceiver 163, with a transmitting device (not shown) previously verified by system 113 as being associated with the opening 381.

In any embodiment, the opening 381 can have a size approximating the size, for example not less than the size, of the opening 317 of the transport container 115. Wall 382 can optionally include a support surface 383, for example the horizontal surface forming the bottom of opening 381, for receiving the transportation container 361. In any embodiment, support or receiving surface 383 extends to a downwardly-inclined ramp 384 having a base wall 386 at the end thereof for forming a receptacle 387 for receiving the transportation container 361 from opening 382. A suitable support 387 can optionally be provided for supporting the receptacle 388 above the ground.

In one possible step, robot 114 can approach and register or align container opening 317 of the robot with the opening 381 in the wall 382 in any suitable manner, for example in any of the manner manners and methods discussed above for registering or aligning a transport container 115 with an opening 317 or transport mechanism 329 of a pickup container 116 or a recipient container 117. In one possible step, opening 317 of the transport container 115 can optionally be pushed up flush with opening 381 in wall 382 as part of such alignment and registration. In one possible step, robot 114 aligns or registers transport mechanism 329 of the transport container 115, which can optionally be a conveyor system, with support or bottom surface 383 of the opening 381. In one possible step, the alignment of the transport mechanism 329 with bottom surface 383 can result in the top surface of the conveyor belt 336 of the container 115 being substantially parallel with surface 383 for permitting transportation containers moved off of or delivered by the belt 336 of the transport container 115 to be received by the surface 383. In any embodiment, the front of the conveyor belt 336 of the transport container is relatively close to the surface 383 so as to facilitate or permit a transportation container 361 moving off the conveyor belt to be received by the bottom surface 383 of the opening 381. In any embodiment, the top surface of the conveyor belt 336 of the transport container 115 can optionally be substantially horizontally aligned with bottom surface 383 so as to facilitate a transfer of a transportation container 361 from the conveyor belt into the opening 381.

In one possible step, the positioning of the transport container 115 with respect to the opening 381 can optionally be controlled by computer network 136, including robot computer 156, which can utilize input from one or more of sensors 162. In any embodiment, one or both of cameras 293, 294 on the approaching end 176 or 177 of robot 114 can optionally be utilized by computer network 136 to visualize opening 381 and to compare the input sensor signals received from the cameras 293, 294 with stored images or other data with respect to the opening 381 or similar openings or structures and utilize algorithms stored in the computer network 136 to move the front end 306 of transport container 115 into registration or alignment with the opening 381. In any embodiment, sensor input signals from radar or other distance sensors of robot 114 and from IMU sensor 296 can optionally be utilized by the computer network 136 in such registration and alignment step.

In one possible step, transportation container 361 can optionally be transferred or moved by transport mechanism 329 of the transport container 115 from the robot into the opening 381. In any embodiment, computer network 136 can direct the door opening mechanism 341 of the transport container 115 to open door 321 of the container so as to permit communication between the interior 316 of the container and the opening 381. Computer network 136 can further direct the transport mechanism 329 to be activated so as to move transportation container 361 from the interior of the transport container 115 of robot 114 into opening 381. In any embodiment, transport mechanism 329, for example the top of belt 336 of the transport mechanism, can optionally be horizontally aligned with support surface 383 by robot 114. In any embodiment, the top of belt 336 and support surface 383 can optionally be approximately in the same plane. Transport mechanism 329 can continue moving transportation container 361 out of the container 115 and into the opening 381 until the transportation container 361 slides down ramp 384 into receptacle 387. Once the transportation container has been fully pushed through opening 383, for example as confirmed by one or more of sensors 162 of the robot 114, the computer network 136 can direct the doors 321 of transport container 115 to close and move robot 114 away from the opening 381 and wall 382. In one possible step of the method, computer network 136 can record the delivery of transportation container 361 by robot 114 through opening 381. A human, for example the deliveree or purchaser, can remove the one or more articles 121 from the transportation container 361. In any embodiment, the human retains the transportation container 361 for use at a later time with system 113.

System 113 can optionally include pickup or delivery of a transportation container 361 by robot 114 at other locations inside a building, for example inside a warehouse, factory, store, distribution center or any other building containing articles, or receipt of a transportation container 361 by robot 114 from such other locations inside a building. Computer network 136 can cause or direct the robot 114 to deliver the transportation container 361 at such other locations, for example free of human assistance. In any embodiment, the drop off or pick up location can optionally include a support surface inside of a building for receiving or delivering the transportation container 361. In any method of the invention, robot 114 can deliver transportation container 361 to a support surface inside of a building, or receives the transportation container from such support surface, that can optionally be in the form of any suitable transport mechanism, such as a conveyor system 401 (see FIG. 37). Such delivery or receipt by robot 114 of the transportation container 361, including any step or part thereof, can be accomplished without human assistance, with human assistance, semi-autonomously or autonomously. Such delivery by robot 114 can optionally be accomplished with the assistance of computer vision. In any embodiment, the conveyor system 401 can optionally include a motorized conveyor belt 402 movably carried on a plurality of rollers 403. The top surface of the conveyor belt 402 can optionally be substantially planar, for example horizontal. The conveyor system 401 can optionally be elevated above the ground or floor of the building by any suitable support structure 404. The conveyor system 401 has an end 406, for example formed by one end of conveyor belt 402, that can optionally be accessed by a transport container 115 of a robot 114.

Computer network 136 and robot computer 156 can verify the correctness of the drop off or pick up location, for example onto or from conveyor system 401, in any suitable manner, for example by visualizing the location, the building, the conveyor system 401 or any combination of the foregoing with robot cameras 293, 294 and comparing the images received from such cameras with an image or other data associated with the location stored in computer network 136. In any embodiment, such verification can optionally be accomplished by computer network 136 wirelessly or otherwise communicating, for example through robot transceiver 163, with a transmitting device (not shown) previously verified by system 113 as being associated with the drop off location.

In one possible step, robot 114 can approach and register or align container opening 317 of the robot with the conveyor system 401 in any suitable manner, for example in any of the manners and methods discussed above for registering or aligning a transport container 115 with an opening 317, or a transport mechanism 329 of a transport container 115, with a transport mechanism 329 of a pickup container 116 or a recipient container 117. In one possible step, the alignment of the container transport mechanism 329, which can each be a conveyor system, with the conveyor system 401 can result in the top surfaces of the conveyor belts 336, 402 being substantially parallel to each other for permitting transportation containers moved off of or delivered by the belt 336 of the transport container 115 to be picked up by or received by the conveyor belt 402 of the conveyor system 401. In any embodiment, the front of the conveyor belts 336, 402 can optionally be moved relatively close to each other so as to facilitate or permit a transportation container 361 moving off one conveyor belt to be picked up by the opposing conveyor belt. In any embodiment, the conveyor belts 336, 402 can optionally be substantially horizontally aligned with each other so as to facilitate a transfer of transportation container 361 between the two conveyor belts.

In one possible step, the positioning of the transport container 115 with respect to the conveyor system 401 can optionally be controlled by computer network 136, including robot computer 156, which can utilize input from one or more of sensors 162 of the robot. In any embodiment, one or both of cameras 293, 294 on the approaching end 176 or 177 of robot 114 can optionally be utilized by computer network 136 to visualize conveyor system 401 and to compare the input sensor signals received from the cameras 293, 294 with stored images or other data with respect to the conveyor system 401 or similar conveyor systems or structures and utilize algorithms stored in the computer network 136 to move the front end 306 of transport container 115, and transport mechanism 329 within the container, into registration or alignment with the conveyor system 401. In any embodiment, sensor input signals from radar or other distance sensors of robot 114 and from IMU sensor 296 can optionally be utilized by the computer network 136 in such registration and alignment step.

In one possible step, the transportation container 361 and the one or more articles therein can then be transferred or moved by the transport mechanism 329 of the transport container 115 and conveyor system 401 from the robot 114 to the conveyor system 401 or vice a versa. In any embodiment, computer network 136 can direct the door opening mechanism 341 of the transport container 115 to open door 321 of the transport container so as to permit the interior 316 of the transport container to communicate with conveyor system 401. Computer network 136 can further direct the transport mechanism 329 of the transport container and, for example by the robot transceiver 163, the conveyor system 401 to be activated so as to move transportation container 361 from the interior of transport container 115 on robot 114 to the conveyor system 401 or vice a versa (see FIG. 37). For example, transport mechanism 329 of the transport container 115 can serve to move the transportation container 361 out of the container 115 until the transportation container 361 touches and engages the conveyor belt 402 of the conveyor system 401, which can thereafter move the transportation container 361 fully onto the conveyor belt 402. Once the transportation container 361 has been fully received by conveyor system 401, or received from the conveyor system 401, the computer network 136 can direct the door 321 of the transport container 115 to close and move robot 114 away from the conveyor system 401. Such transfer, from the conveyor system of transport container 115 to the conveyor system 401, can be referred to as a conveyor system to conveyor system transfer. In one possible step of the method, signals received by computer network 136, for example through robot computer 156 and container computer 357, from weight sensors 356 in the transport container 115 can optionally be utilized to confirm that the transportation container 361 has been delivered by the robot 114 or received by the robot, as appropriate. In one possible step of the method, computer network 136 can record the delivery of transportation container 361 containing the article 121 by robot 114. Following delivery, the one or more articles 121 can optionally be removed from the transportation container 361 in any suitable manner, for example by a human or any suitable automated process. In any embodiment, the transportation container 361 can optionally be retained for use at a later time with system 113.

System 113, and a suitable vehicle or other robot thereof, can optionally be utilized for transferring articles within a building, for example a warehouse, factory, store, distribution center or any other building containing articles. In any embodiment, a vehicle or other type of robot 411 can be provided that can optionally be substantially identical to robot 114, and like reference numerals have been used to describe like components of robots 411 and 114 (see FIG. 38). Computer network 136 can cause or direct the vehicle or robot 411 to transfer articles at such locations, for example free of human assistance. In any embodiment, the drop off or pickup location can optionally include a support surface inside of the building for receiving a transportation container 361. In any method of the invention, robot 411 can deliver an article to a support surface inside of a building, or receives an article from such support surface, that can optionally be in the form of any suitable transport mechanism, such as conveyor system 412. Such delivery or pick up by robot 114 of an article, including any step or part thereof, can be accomplished without human assistance, with human assistance, semi-autonomously or autonomously. Such delivering or receiving can optionally be accomplished with the assistance of computer vision. In any embodiment, the conveyor system 412 can optionally include one or more motorized conveyor belts. In any embodiment, the conveyor system 412 can optionally include a first motorized conveyor belt 416, a second motorized conveyor belt 417 and a third motorized conveyor belt 418. Each of the conveyor belts 416, 417, 418 can optionally be movably carried by a plurality of rollers 419. The conveyor belts 416, 417, 418 can be arranged in any suitable configuration, and in any embodiment can optionally be in a stacked configuration with first conveyor belt 416 being a top conveyor belt, second conveyor belt 417 being a middle or intermediate conveyor belt below first conveyor belt 416 and third conveyor belt 418 being a bottom conveyor belt below second conveyor belt 417. The top surface of each of the conveyor belts can optionally be substantially planar, for example horizontal. The conveyor system for 12 can optionally be elevated above the ground or floor of the building by any suitable support structure 421. Each of the conveyor belts has an end 422 for accessing the belt.

Robot 411 can optionally include any suitable transport mechanism, for example any transport mechanisms discussed herein, for transferring an article or container 423 of any suitable type between the robot and conveyor system 412. In any embodiment, the transport mechanism of robot 411 can optionally be a conveyor system mounted on the exterior of the robot of any suitable type, which can be of any suitable shape or curvature. In any embodiment, an exterior conveyor system 426 that is be planar can optionally be provided on any suitable horizontal surface of the robot 411. In any embodiment, the exterior conveyor system 426 can optionally be located on a top surface 427 of the robot, for example the top surface of top portion 191 of the robot. In any embodiment, the exterior conveyor system 426 can optionally be a motorized conveyor system that can optionally include a conveyor belt 428 movably carried by a plurality of rollers 429. The conveyor system 426 can be of any suitable size and shape, and in any embodiment extends across at least a portion of the top of robot 411. In any embodiment, the conveyor system 426 extends across the entire length or width of the robot and in any embodiment, shown in FIG. 38, the exterior conveyor system 426 extends between first or front end 176 and second or rear end 177 of the robot 411. As such, each end of the exterior conveyor system is accessible at one and 176, 177 of the robot. The rollers 429 can optionally be coupled to or supported by top portion 191 of robot 411 by any suitable means, for example by a support 432 at each end of the conveyor system 426 extending between the system 426 and top surface 427 of the robot.

The exterior conveyor system 426 can optionally include a scale of any suitable type, for example for measuring the weight of the one or more articles 423 being carried by the system 426. In any embodiment, a scale for measuring the weight of the objects resting on conveyor belt 428 can optionally be provided. In any embodiment, such weight scale can optionally be formed from one or more sensors 433 disposed on supports 432 of the conveyor system 426. Each of such sensors 433 can be of any suitable type, for example a strain gauge. Such scales can optionally be coupled to computer network 136, either directly or indirectly.

Robot 411 can optionally include at least one container 186, which can optionally include a container assembly 301 provided with a plurality of transport containers 115. Each of the containers can optionally include a transport mechanism of any suitable type, such as transport mechanism 329. Each transport mechanism can optionally be at least partially, or totally, disposed inside the respective container 115.

In any method of operating robot 411, computer network 136 and robot computer 156 can verify the correctness of the drop off or pick up location, for example robot exterior conveyor system 426, in any suitable manner, for example any of the methods disclosed herein including the method disclosed with respect to conveyor system 401. In one aspect of such method, robot 411 can optionally approach and register or align exterior conveyor system 426 with conveyor system 412, for example first conveyor belt 416 of the system 412, in any suitable manner, for example any of the methods disclosed herein including the method disclosed with respect to conveyor system 401. In one aspect of such method, one or more articles 423 can optionally be transferred or moved between exterior conveyor system 426 of robot 411 and conveyor system 412, for example first conveyor belt 416 of the system 412, in any suitable manner, for example any the methods disclosed herein including the method disclosed with respect to conveyor system 401. In one possible step of the method, signals received by computer network 136, for example through robot computer 156, from weight sensors 433 of the exterior conveyor system 426 can optionally be utilized to confirm that article 423 has been delivered or received by robot 411. In one possible step of the method, computer network 136 can record the delivery of article 423 by robot 411.

In any embodiment, at least one of the conveyor belts of system 412 can optionally be accessed by a transport container 115 of robot 411, and in any embodiment second conveyor belt 417 and third conveyor belt 418 can optionally be accessed by respective transport containers 115 of the robot, for transferring or moving one or more transportation containers 361 or articles 423 between the transport containers 115 and the conveyor belts 417, 418. Such accessing and transferring can be accomplished by any suitable means, including all or portion of any of the methods disclosed herein.

A vehicle or other robot of system 113 can stop at other locations between the first location and the second location, for picking up or delivering other articles or transportation containers in connection with other user requests or otherwise. Computer network 136 can cause or direct the robot to pick up or deliver articles or transportation container 361 at such other locations, for example free of human assistance. Such other articles or transportation containers can optionally be contained in any of the transport containers 115 of robot 114. In addition, such other articles can optionally be contained in a transportation container 361 which was arranged in tandem, for example end to end, within a transport container 115 of the robot 114 with another transportation container 361 previously delivered by the robot 114 from such transport container 115.

In any method of the invention, one or more articles or transportation containers can optionally be delivered by robot 114 to an intermediate location, for example to an intermediate container 115 such as an intermediate pickup container 116 or an intermediate recipient container 117, for later pickup by a second vehicle or other robot 114 for delivery by the second vehicle or other robot to the second location. The transfer of the one or more articles 121, or the one or more transportation containers 361 containing the articles, from the vehicle or robot 114 to an intermediate pickup container 116 or intermediate recipient container 117 can be in any suitable manner or method, for example any of the methods disclosed herein, such as discussed above with respect to the transfer of a transportation container 361 between a transport container 115 of a robot 114 and a container 115 of a pickup container 116 or recipient container 117. Computer network 136 can direct the second robot to pick up or receive the one or more articles or transportation containers from the intermediate container, for example by traveling over transportation network 101 to the intermediate container. Computer network 136 can direct or cause the transfer of the one or more articles 121, or the one or more transportation containers 361 containing the articles, from the intermediate container to the transport container 115 of the second robot 114 in any suitable manner or method, for example any of the methods disclosed herein, such as discussed above with respect to the transfer of a transportation container 361 between a transport container 115 of a robot 114 and a container 115 of a pickup container 116 or recipient container 117. Computer network 136 can navigate the second robot 114 over transportation network 101 from the intermediate location, which can be referred to as a second location, to the second location, which can be referred to as a third location. The computer network 136 can cause or direct the second robot 114 to deliver the one or more articles at the third location by any suitable means including any of those disclosed herein. The third location can be any of those disclosed herein, including an additional recipient container 117. The second robot 114 can deliver the one or more articles or transportation containers to the opening 317 or interior 316 of the additional recipient container 117 by any suitable means, including for example by use of the transport mechanism 329 of the transport container 115 as disclosed herein to remove the one or more articles or transportation containers from the transport container 115 of the second robot. The additional recipient container 117 can move the one or more articles or transportation containers into or inside the additional recipient container by any suitable means, including for example by use of the transport mechanism 329 of the additional recipient container 117. Any or all of the foregoing steps can optionally be performed free of human assistance.

In any method of the invention, a plurality of robots can optionally be utilized to deliver one or more articles from a first location to a final delivery location. For example, one or more articles or transportation containers can optionally be delivered by a first vehicle or other robot 114 directly to a second or additional vehicle or other type of robot 114 at an intermediate location (see FIG. 39). In this situation, the pickup container at the second or other location can optionally be a transport container 115 of the first robot and the recipient container at the second or other location can optionally be a transport container 115 of the second robot 114 The transfer of the one or more articles 121, or the one or more transportation containers 361 containing the articles, from the robot 114 to the second robot 114 can be in any suitable manner or method, for example any of the methods disclosed herein, such as discussed above with respect to the transfer of a transportation container 361 between a transport container 115 of a robot 114 and a container 115 of a pickup container 116 or recipient container 117. Computer network 136 can cause or direct the first robot 114 to deliver the one or more articles or transportation containers to the additional or second robot 114. The second robot 114 can transport or deliver the one or more articles or transportation containers to the second location, which can be referred to as a third location, for example under the direction of computer network 136. Such transport or delivery can optionally be, for example, over transportation network 101. Computer network 136 can cause the second robot to deliver the one or more articles or transportation containers to the third location by any suitable means including any of those disclosed herein. The third location can optionally be any of the second locations disclosed herein, including an additional recipient container 117. The second robot 114 can deliver the one or more articles or transportation containers to the opening 317 or interior 316 of the additional recipient container 117 by any suitable means, including for example by use of the transport mechanism 329 of the transport container 115 as disclosed herein. The additional recipient container 117 can move the one or more articles or transportation containers into or inside the additional recipient container by any suitable means, including for example by use of the transport mechanism 329 of the additional recipient container 117. Any or all of the foregoing steps can optionally be performed free of human assistance.

System 113 can optionally include other vehicles or robots for carrying one or more containers for transporting articles or transportation containers, such as articles 121 or transportation containers 361. Such vehicles or robots can optionally include conventional vehicles, for example cars and trucks and including cars and trucks that can optionally be operated by humans. In any embodiment, such vehicles or robots have human driver compartments for permitting onboard human drivers of the vehicles. Such vehicles or robots can dock with other vehicles or robots of system 113, including robot 114. In any embodiment, one or more transport containers 115 of robot 114 can dock with one or more transport containers 115 of such vehicles or robots.

Figure 40:
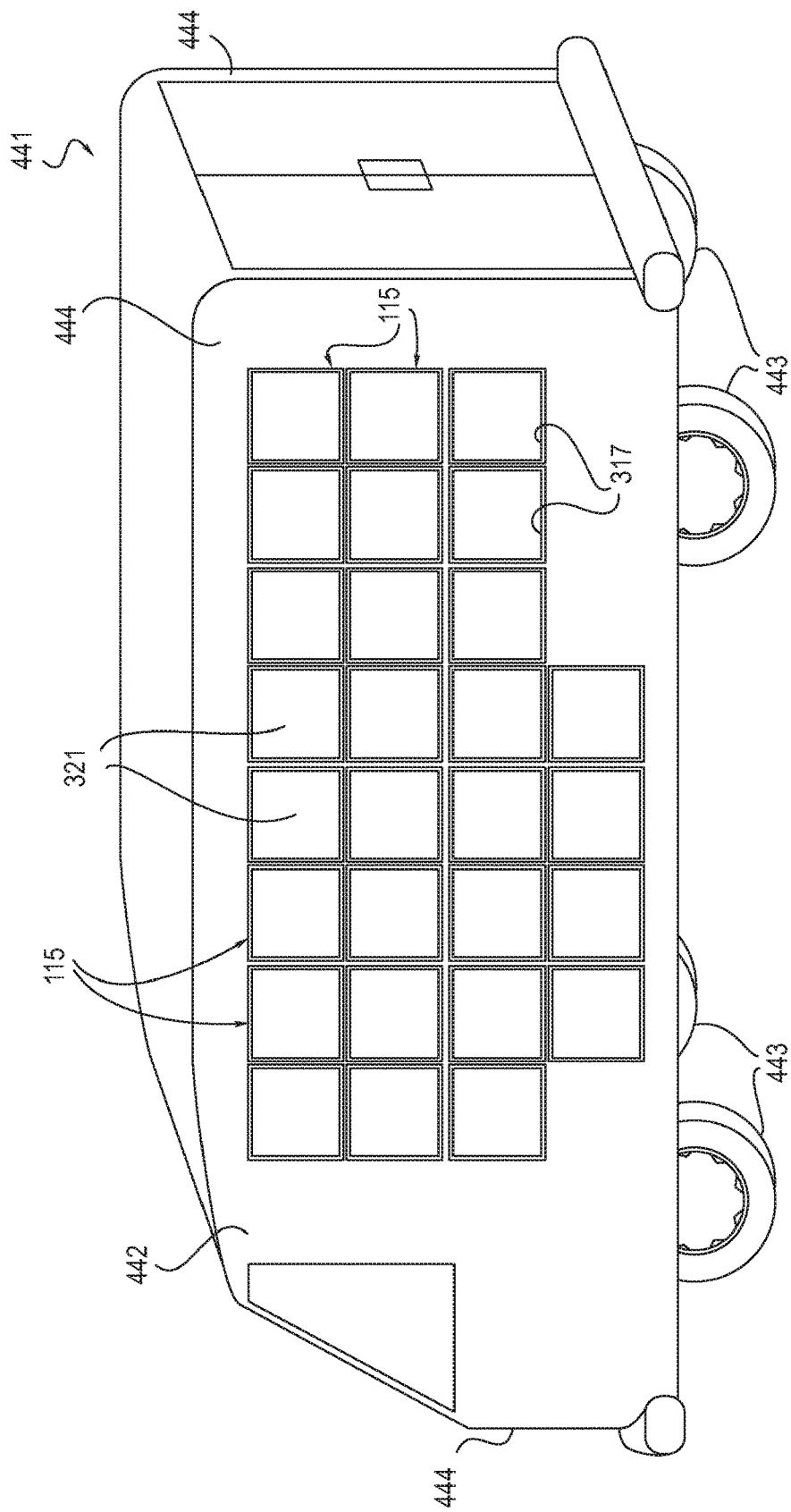
FIG. 40 is a perspective view of another embodiment of a robot for use in the robot delivery system of FIG. 1.
Figure 41:
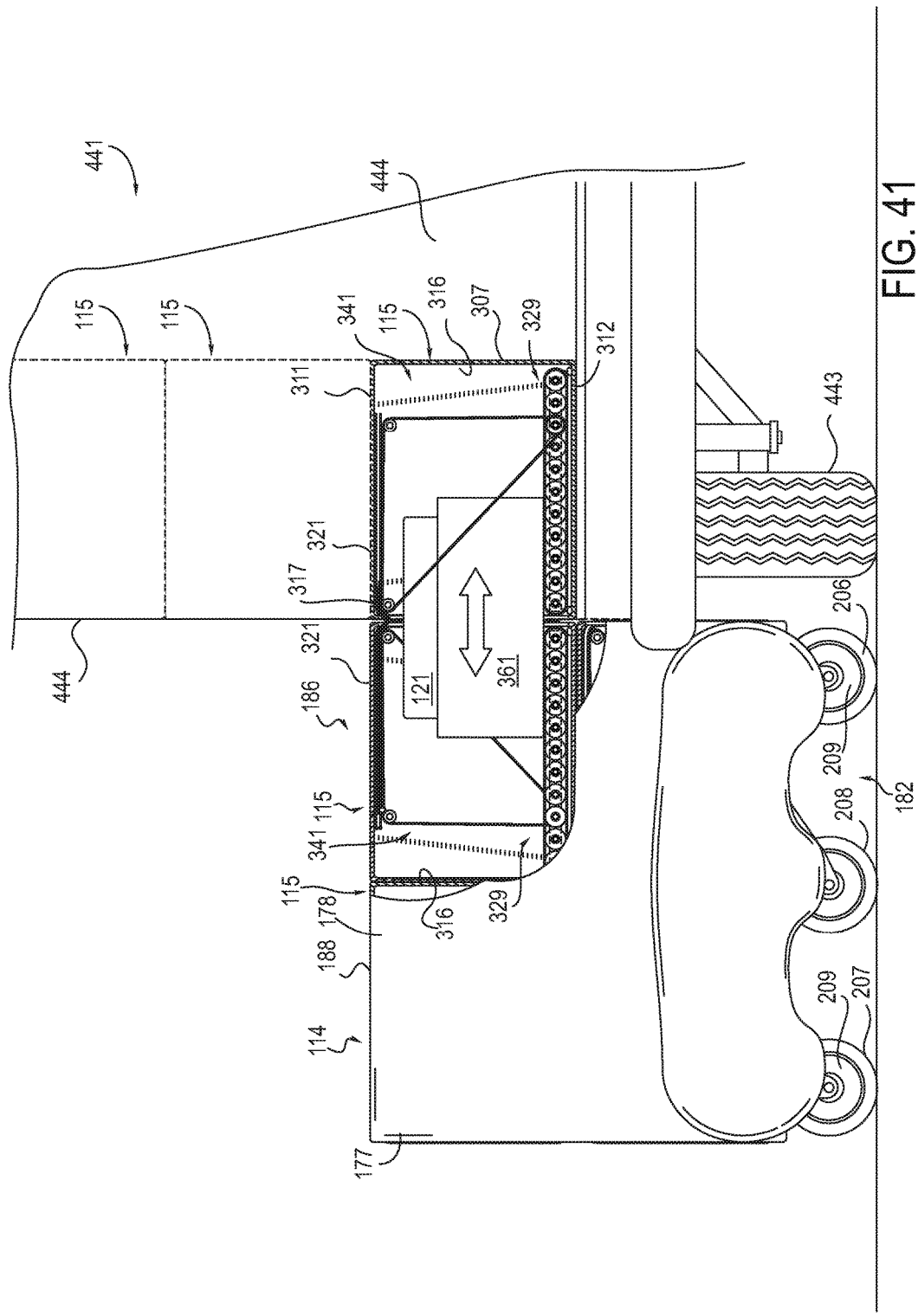
FIG. 41 is one embodiment of a method for transferring an article between the robot of FIG. 40 and the robot of FIG. 5.

Such an other vehicle or robot can optionally be a truck 441 having an optional cab 442 and a plurality of motorized wheels 443 (see FIGS. 40-41). The truck 441 can carry a plurality of the containers of the invention, for example a plurality of containers 115. In any embodiment, a plurality of containers 115 can optionally be stacked in rows and columns with respective openings 317 accessible from a side 444 of the truck 441. In any embodiment, openings 317 of the plurality of containers 115 can optionally be flush with the planar side of the truck 441. Such a plurality of containers 115 can optionally be provided on a first side of the truck 441, an opposite second side of the truck 441, the rear end of the truck 441, the front of the truck 441, or any combination of the foregoing.

The transfer of the one or more articles 121, or the one or more transportation containers 361 containing the articles, between truck 441 and robot 114 can be in any suitable manner or method, for example any of the methods disclosed herein, such as discussed above with respect to the transfer of a transportation container 361 between a transport container 115 of a robot 114 and a container 115 of a pickup container 116 or recipient container 117 (see FIG. 41).

Truck 441 can serve as a mobile warehouse that can be temporarily or permanently parked at any location in transportation network 101. Truck 441 can arrive at such temporary location with any or all of its transport containers 115 filled or otherwise occupied by transportation containers 361 for delivery by one or more robots 114 that can optionally be directed by computer network 136 to truck 441 to receive respective transportation containers 361. In any embodiment, truck 441 can serve as a way station for transportation containers 361 that are delivered to truck 441 by one robot 114 and thereafter retrieved from truck 441 by another robot 114 for delivery to a drop off or other location. In any embodiment, truck 441 has more transport containers 115 carried thereby than robot 114, for example multiples of the transport containers 115 of robot 114.

In one aspect of the invention, a transportation container 361 can optionally be moved between two transport containers 115 within a vehicle or other robot 114. In any embodiment or possible step, the transportation container 361 can optionally be moved internally within container assembly 301, for example by openings or doors (not shown) provided in respective adjoining walls of the two containers 115 and utilizing the respective transport mechanisms 329 of the containers. In any embodiment or possible step, an opening or door can optionally be provided in the back end 307 of each of two adjoining containers 115 and the transport mechanisms 329 of the containers can optionally be used to move a transportation container 361 between the containers. In one aspect of the invention, a transportation container 361 can optionally be moved between transport containers 115 of the robot 114 by unloading the transportation container 361 from the first transport container 115 in any suitable manner, for example as disclosed herein, and then reloading the transportation container 361 to the second transport container 115 in any suitable manner, for example as disclosed herein.

System 13 and the methods herein can optionally include delivery of the transportation container 361 by robot 114 to any location, for example locations that do not include a container 115, are not within a structure or are not at a structure (see for example FIGS. 42-47). For example, transportation container 361 can be delivered to any second or other location designated by a user, for example at a park, at a beach, at a street corner, at a shopping mall or at a parking lot. Computer network 136 can cause or direct the robot 114 to deliver the transportation container 361 at such other locations, for example free of human assistance. Such delivery by robot 114 of the transportation container 361, including any step or part thereof, can optionally be accomplished without human assistance, with human assistance, semi-autonomously or autonomously. Such delivery can optionally be accomplished with the assistance of computer vision. Computer network 136 and robot computer 156 can verify the correctness of the delivery location in any suitable manner, for example by visualizing the location with robot cameras 293, 294 and comparing the images received from such cameras with an image or other data associated with the delivery location stored in computer network 136.

The second or delivery location can be designated by the user in any suitable manner, including any manner or technique disclosed herein. For example, the user can optionally include three-dimensional coordinates or other information, for example any of the three-dimensional coordinates or other information disclosed herein, to which the transportation container 361 is to be delivered by robot 114 in a delivery request. For example, the user can touch an image displayed on a computing device, such as an image 367 viewable on display 148 of deliverer computing device 141 or deliveree computing device 142, to designate a precise location to which the container 361 should be delivered. Any suitable indicator, such as indicator 368, can optionally be created on the image, for example by the user touching the image or using a computer mouse, to indicate the precise delivery location and can optionally be used by computer network 136 in instructing and directing a robot to the delivery location (see FIGS. 42,44,46). Such image can be a two-dimensional image or a three-dimensional image, for example a three-dimensional virtual model. Such location can optionally be translated or converted into three-dimensional coordinates or other information, for example as disclosed herein, for use by computer network 136 in coordinating and directing robot 114 to such precise location.

Figure 42:
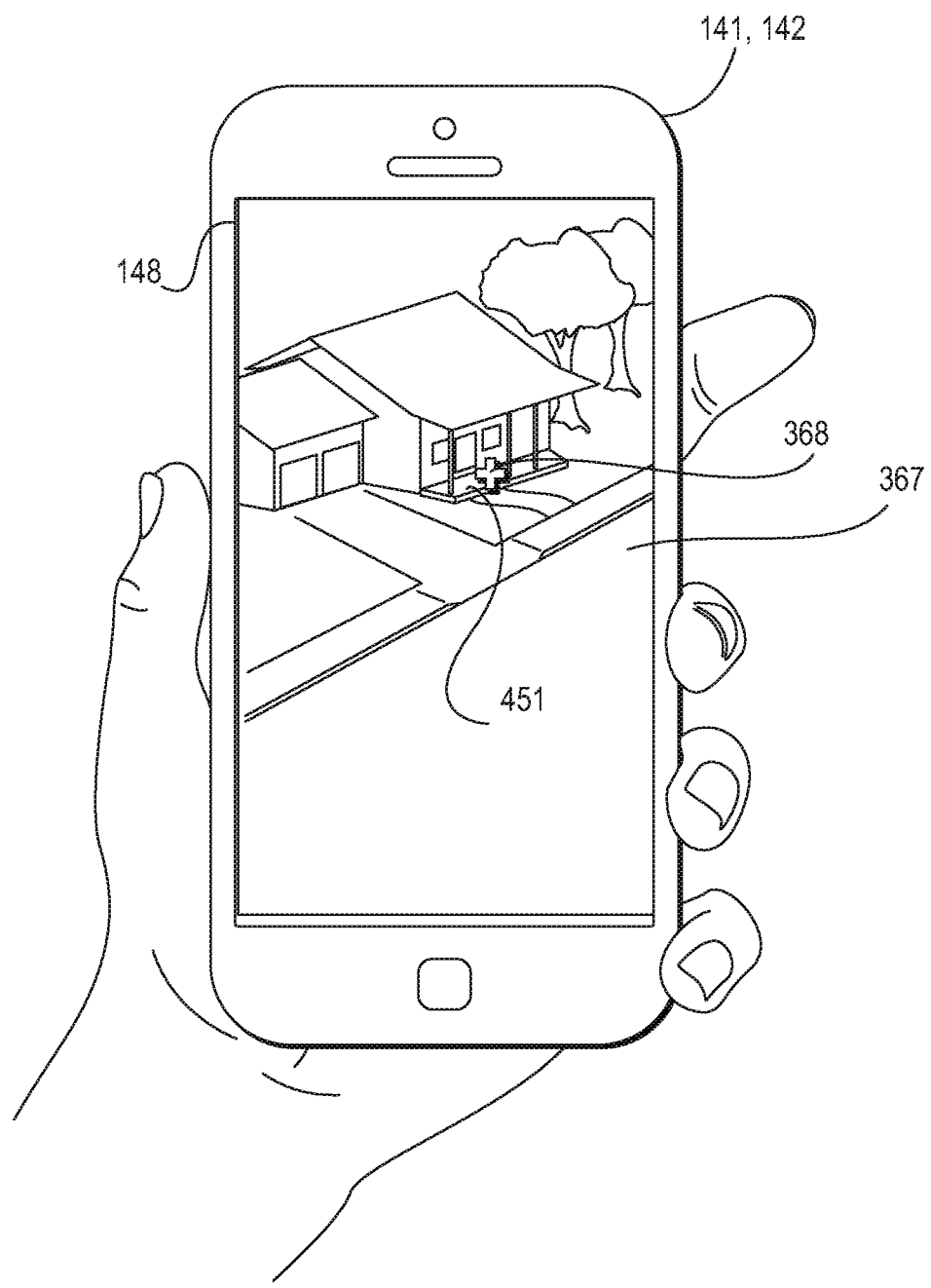
FIG. 42 is an illustration of another pickup or delivery location indicated on the display of a mobile computing device, for example in furtherance of the step of FIG. 30.
Figure 43:
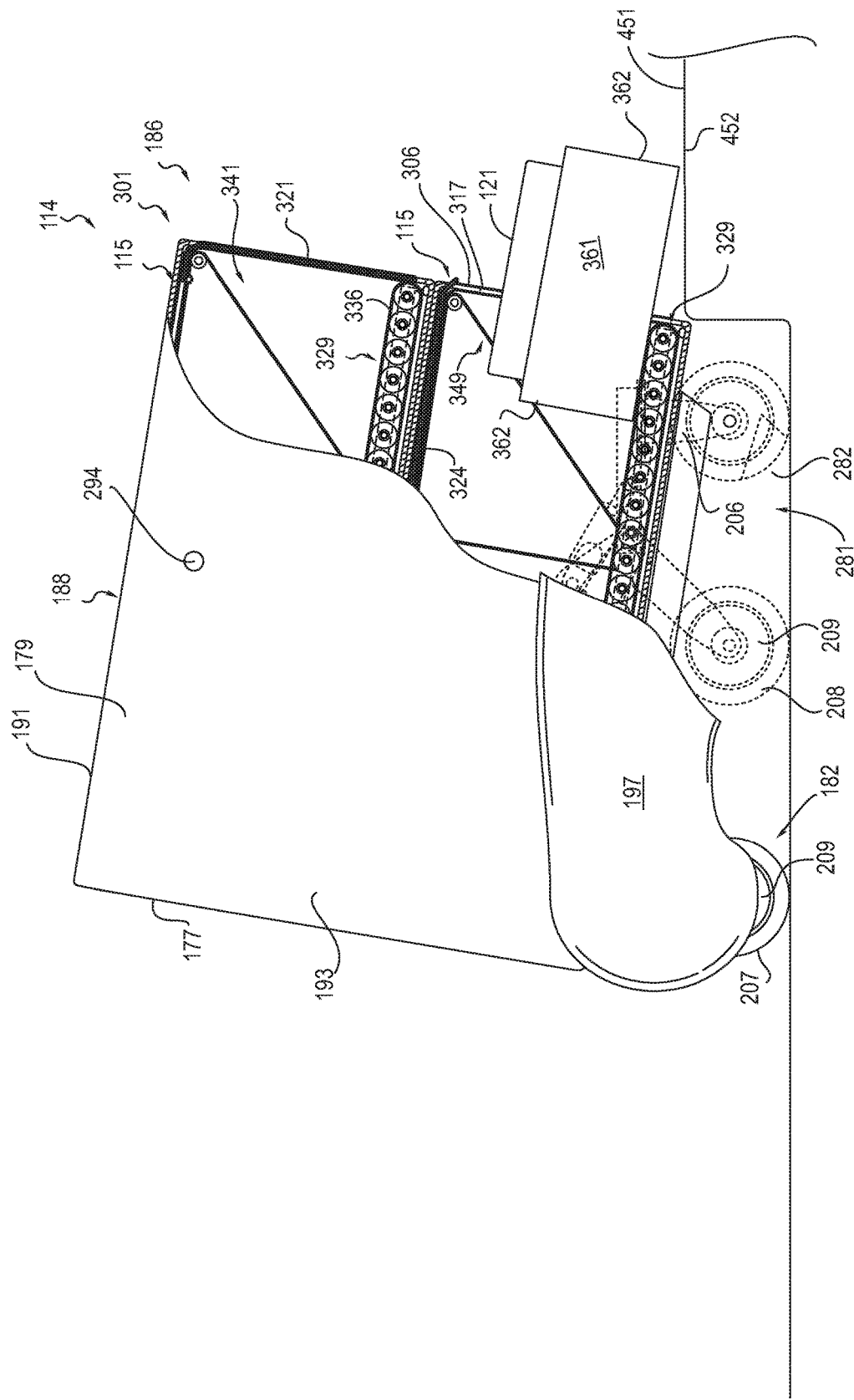
FIG. 43 is one embodiment of a method for delivering an article from a robot of FIG. 5 to a delivery location, for example the location designated in FIG. 42.

In any method of the invention, a robot 114 can deliver transportation container 361 to a step or other elevated surface relative to the ground, for example in front of a residence or other structure as shown in FIGS. 42-43. Such elevated surface, for example step 451, can be designated by the user in any suitable manner, for example in a request or otherwise. Such designation can optionally include three-dimensional coordinates or other information, for example any of such three-dimensional coordinates or other information disclosed herein, with respect to the precise delivery location 452. In one possible step, the user touches an image 367 visible on display 148 of a computing device 141, 142 to create an indicator 368 on the image 361 designating the precise delivery location 452 on the step 451 (see FIG. 42).

The method or routine for robot 114 dropping the transportation container 361 onto step 451 or other elevated surface can be performed in any suitable manner, for example similar to the method or routine discussed above with respect to the drop off or placement of a transportation container 361 by a robot onto the ground. In any embodiment, for example as illustrated in FIG. 43, the transport mechanism of the at least one container 186, for example transport mechanism 329 of one of containers 115 of the at least one container 186, can optionally be used in this regard. In any embodiment, one of the lower containers 115 of the robot 114, for example one of containers 115 sitting directly on base 281 of the chassis 187, can optionally be utilized when the transportation container 361 is to be dropped off on an elevated surface such as step 451 at the second or other location.

In one possible step of such method, the container 115 can optionally be positioned by robot 114 so that front end 306 of one of the containers 115 is nearby or slightly above the step 451. For example, first and second wheel assemblies 181, 182, including pivot assemblies 217, 227 thereof, can optionally be used to maneuver robot 114 so that the front end 306 of the container 115 is adjacent or nearby the step 451. Attachment assembly 249 of the robot, including first and second translational adjustment mechanisms 252, 253 and first and second pivot assemblies 261, 262, can optionally be used to lower or raise chassis 187 towards or adjacent the step 451, for example slightly above the delivery location 452 on the step 451. If desired, the chassis 187 can optionally be tilted so that one end 282, 283 of the base 281 of the chassis is lower than the other end, for example the first end 282 of the base 281 as illustrated in FIG. 43. Once door 321 of the appropriate transport container 115 of robot 114 is opened, for example by door opening mechanism 341, transport mechanism 329 within the transport container 115 can optionally be utilized to move the transportation container 361 out of the interior 316 of the robot, for example out of opening 317 of interior 316 of the transport container 115, and onto the step 451 at the delivery location 452. The robot 114 can optionally be moved rearwardly or forwardly during this process to facilitate the transportation container 361 being moved out of the container 115, being dropped or placed on the step 451 at the delivery location 452, or both. The drop off or unloading process can optionally be controlled by computer network 136, including robot computer 156, which can utilize input from one or more of sensors 162 and weight sensor 356 of the robot.

Upon delivery of the transportation container 361 to the delivery location 452, and the one or more articles therein, door 321 of the container 115 can optionally be closed and robot 114 directed by computer network 136 to another location. In one possible step of the method, signals received by computer network 136 from weight sensors 356 in the transport container 115 can optionally be utilized to conform that the transportation container 361 is no longer in the container 115 of the robot 114. In one possible step of the method, computer network 136 can record the delivery by robot 114 of the transportation container 361 from the transport container 115 of the robot to the delivery location 452. A human, for example the deliveree or purchaser, can remove the one or more articles 121 from the transportation container 361. In any embodiment, the human retains the transportation container 361 for use at a later time with system 113.

Figure 44:
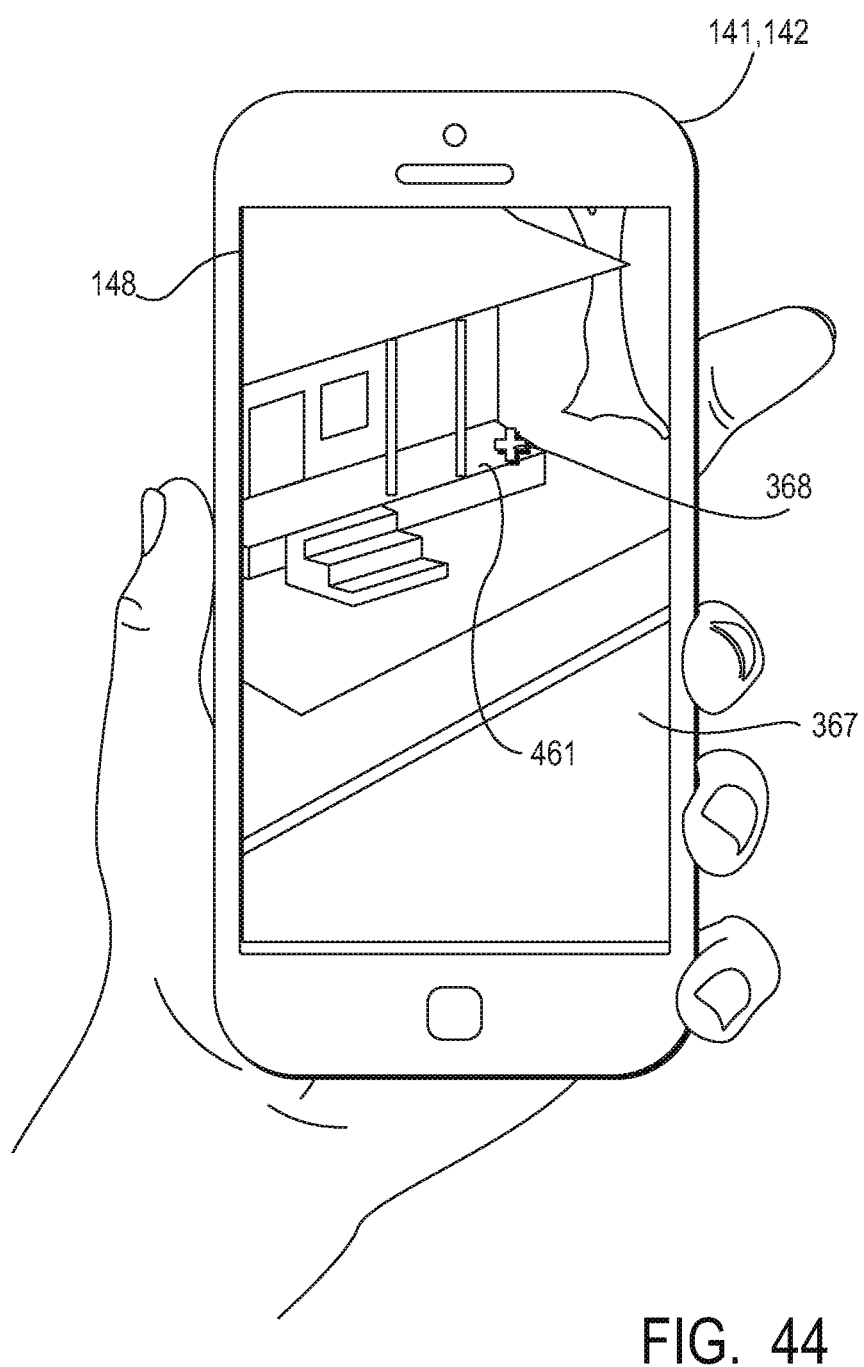
FIG. 44 is an illustration of a further pickup or delivery location indicated on the display of a mobile computing device, for example in furtherance of the step of FIG. 30.
Figure 45:
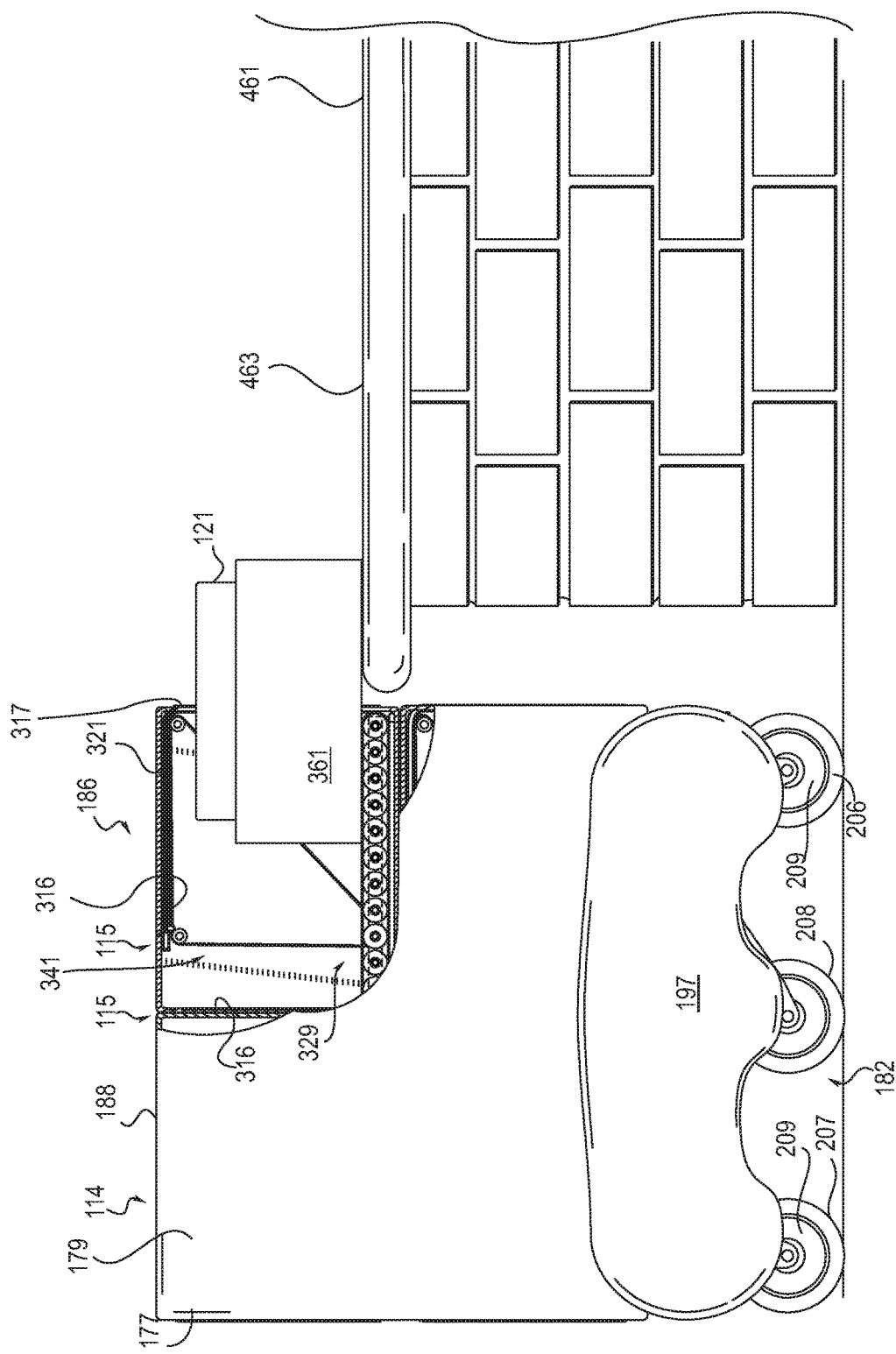
FIG. 45 is one embodiment of a method for delivering an article from a robot of FIG. 5 to a delivery location, for example the location designated in FIG. 44.
Figure 46:
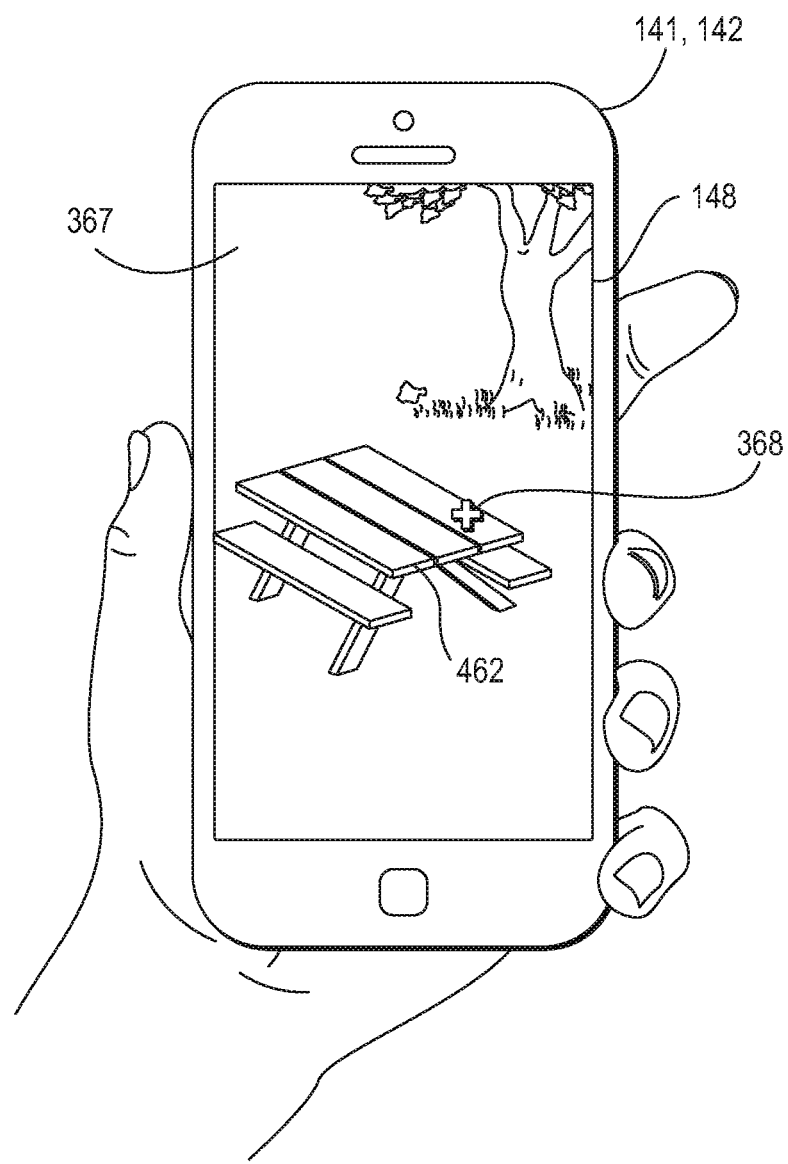
FIG. 46 is an illustration of yet another pickup or delivery location indicated on the display of a mobile computing device, for example in furtherance of the step of FIG. 30.

In any method of the invention, a robot 114 can deliver transportation container 361 to such other locations such as other elevated surfaces relative to the ground, for example to a ledge or porch, for example porch 461 shown in FIGS. 44-45, or a table, for example picnic table 462 shown in FIGS. 46-47. Such elevated surface, for example the top of porch 461 or picnic table 462, can be designated by the user in any suitable manner, for example in a request or otherwise. Such designation can optionally include three-dimensional coordinates or other information, for example any of such three-dimensional coordinates or other information disclosed herein, with respect to a precise delivery location on such surfaces, for example delivery location 463 on porch 461 or delivery location 464 on table 462. In one possible step, the user touches an image 367 visible on display 148 of a computing device 141, 142 to create an indicator 368 on the image 361 designating the precise delivery location, for example location 463 on porch 461 or location 464 on table 462 (see FIGS. 44,46).

The method or routine for robot 114 dropping off or depositing the transportation container 361 onto porch 461 or table 462, or other elevated surface, can be performed in any suitable manner, for example similar to the method or routine discussed above with respect to the drop off or placement of a transportation container 361 by a robot into opening 381 in wall 382 or onto conveyor system 401. In one possible step, robot 114 aligns or registers transport mechanism 329 of the transport container 115, which can optionally be a conveyor system, with the top surface of the porch 461 or table 462. In one possible step, the alignment of the transport mechanism 329 with the top surface of the porch or table can result in the top surface of the conveyor belt 336 of the container 115 being substantially parallel with or slightly elevated relative to the top surface of the porch or table for permitting the transportation container moved off of or delivered by the belt 336 of the transport container 115 to be received by such top surface. If desired, chassis 187 of the robot can optionally be tilted so that one end 282, 283 of the base 281 of the chassis is lower than the other end. In any embodiment, the front of the conveyor belt 336 of the transport container can optionally be relatively close to the top surface of the porch 461 or table 462 so as to facilitate or permit a transportation container 361 moving off the conveyor belt to be received by such top surface. In any embodiment, the top surface of the conveyor belt 336 of the transport container 115 can optionally be substantially horizontally aligned with the top surface of the porch 461 or table 462 so as to facilitate a transfer of a transportation container 361 from the conveyor belt onto the top surface of the porch or table.

In one possible step, the positioning of the transport container 115 with respect to the top surface of the porch 461 or table 462 can optionally be controlled by computer network 136, including robot computer 156, which can utilize input from one or more of sensors 162. In any embodiment, one or both of cameras 293, 294 on the approaching end 176 or 177 of robot 114 can optionally be utilized by computer network 136 to visualize the porch 461 or table 462 and to compare the input sensor signals received from the cameras 293, 294 with stored images or other data with respect to the porch or table or structures and utilize algorithms stored in the computer network 136 to move the front end 306 of transport container 115 into registration or alignment with the top surface of the porch 461 or table 462. In any embodiment, sensor input signals from radar or other distance sensors of robot 114 and from IMU sensor 296 can optionally be utilized by the computer network 136 in such registration and alignment step.

In one possible step, transportation container 361 can optionally be transferred or moved by transport mechanism 329 of the transport container 115 from the robot 114 to the delivery location, for example the delivery location 463 on porch 461 or the deliver 464 on table 462. In any embodiment, computer network 136 can direct the door opening mechanism 341 of the transport container 115 to open door 321 of the container so as to permit communication between the interior 316 of the container and the top surface of the porch or table. Computer network 136 can further direct the transport mechanism 329 to be activated so as to move transportation container 361 from the interior of the transport container 115 of robot 114 onto such top surface. In any embodiment, transport mechanism 329, for example the top of belt 336 of the transport mechanism, can optionally be horizontally aligned with the top surface of the porch 462 or table 462 by robot 114. In any embodiment, the top of belt 336 and the top surface of the elevated surface, for example the top surface of the porch or table, can optionally be approximately in the same plane. Once the transportation container 361 has been fully delivered from the transport container 115 of the robot 114, for example as confirmed by one or more of sensors 162 of the robot 114, the computer network 136 can direct the doors 321 of transport container 115 to close and move robot 114 away from the porch 461 or table 462. In one possible step of the method, computer network 136 can record the delivery of transportation container 361 by robot 114 to the delivery location 463,464. A human, for example the deliveree or purchaser, can remove the one or more articles 121 from the transportation container 361. In any embodiment, the human retains the transportation container 361 for use at a later time with system 113.

The transportation containers of the invention can optionally be reused within system 113, for example after the delivery of a transportation container 361 to the second location and the removal of the one or more articles transported therein to the second location. In any embodiment, the empty transportation container 361 can optionally be placed on the ground or another surface at the second location. In any embodiment, the empty transportation container 361 can optionally be returned to the recipient container 117 at the second location for reuse. The empty transportation container 361 can be picked up in any suitable manner at the second location by a vehicle or robot 114 of system 113, for example the vehicle or robot 114 that delivered the transportation container 361 to the second location or another one of a plurality of vehicles or robots from a fleet of vehicles or robots of system 113. Computer network 136 can direct or cause any such second vehicle or robot 114 to be navigated over transportation network 101 to the second location. The method and manner of pickup by the vehicle or robot 114 at the second location can be of any suitable type, including any of the methods and manners disclosed herein. The empty transportation container 361 can optionally be moved, for example under the direction of computer network 136, from the recipient container 117 to the transport container 115 of the vehicle or robot 114 at the second location by any suitable method or manner including any of those disclosed herein. The transport container 115 of the vehicle or robot can optionally be registered or aligned with the recipient container 117, for example as disclosed above. The vehicle or robot 114 can navigated, under a further step controlled by computer network 136, from the second location to a third location, which can be of any suitable type including any of those disclosed herein such as a pickup container 116, a recipient container 117, a transport container 115 of another vehicle or robot 114, a container 115 of truck 441, a surface of any suitable type or the ground. The vehicle or robot 114 can deliver the empty transportation container 361 to the third location, for example by any of the methods or manners disclosed herein. In any method of the invention, the empty transportation container 361 can optionally be removed from the transport container 115 of the vehicle or robot at the third location by any suitable method or manner including any of those disclosed herein for reuse in system 113. Such method or process can be accomplished without human assistance, with human assistance, semi-autonomously or autonomously.

In any method of the invention, one or more additional articles 121 can optionally be placed in the transportation container 361 at the second location, for example for delivery to a third location. The second location can be of any suitable type, for example any of the pickup locations disclosed herein including a pickup container 116, a surface of any suitable type or the ground. In any method of the invention, the transportation container 361 can optionally be transported or delivered to a third location and one or more additional articles 121 placed in the transportation container 361 at the third location, for example for delivery to a fourth location. The third location can be of any suitable type, for example any of the pickup locations disclosed herein including a pickup container 116, a surface of any suitable type or the ground.

The one or more additional articles 121 can be of any suitable type, for example any of the articles disclosed herein including articles for delivery by system or products purchased by a user of system 113 for subsequent delivery. The transportation container 361 with the one or more additional articles therein can be picked up in any suitable manner at the pickup location, that is the respective second or third location, by a second vehicle or robot 114 of system 113, for example one of a plurality of vehicles or robots from a fleet of vehicles or robots of system 113. The second vehicle or robot 114 can deliver the transportation container 361 to the delivery location, that is the respective third or fourth location. The second vehicle or other robot 114 can optionally be different or distinct from the first vehicle or robot 114 utilized to deliver the transportation container 361 from the first location to the second location.

The method and manner of pickup by second vehicle or robot 114 can be of any suitable type, including any of the methods and manners disclosed herein. For example, in any method the transportation container 361 can optionally be picked up from the ground or another surface by the second vehicle or robot 114. In any method, the transportation container 361 can optionally be placed in a pickup container 116 at the pickup location. Computer network 136 can direct or cause the second vehicle or robot 114 to be navigated over transportation network 101 to the pickup location. The transportation container 361 can optionally be moved, for example under the direction of computer network 136, from the pickup container 116 to the transport container 115 of the second vehicle or robot 114 at the pickup location by any suitable method or manner including any of those disclosed herein. The transport container 115 can optionally be registered or aligned with the pickup container 116, for example as disclosed above. The second vehicle or robot 114 can optionally be navigated, under a further step controlled by computer network 136, from the pickup location to the delivery location, which can be of any suitable type including any of those disclosed herein such as a recipient container 117, a surface of any suitable type or the ground. The transportation container 361 can optionally be moved, for example under the direction of computer network 136, from the transport container 115 of the second vehicle to the recipient container 117 at the delivery location by any suitable method or manner including any of those disclosed herein. The transport container 115 can optionally be registered or aligned with the recipient container 117, for example as disclosed above. Following delivery, the one or more articles 121 can optionally be removed from the transportation container 361 in any suitable manner, for example by a human or any suitable automated process. In any embodiment, the transportation container 361 can optionally be retained for use at a later time with system 113, including for example in the recipient container 117. Such method or process can be accomplished without human assistance, with human assistance, semi-autonomously or autonomously.

The utilization of a transportation container can increase the efficiency of system 113, including the pickup, transportation and drop off of articles being transported and delivered by the system. The utilization of a plurality of transportation containers of a standardized size and shape can contribute to such efficiency. In addition, the sizing of the standardized transportation containers to approximate the size of any or all of the pickup, recipient and transport containers of the invention can contribute to such efficiency. The utilization of a transportation container with an open top can facilitate loading and unloading of the transportation container. Increases in efficiency can result in reductions in cost of system 113 and the methods disclosed herein.

In one aspect of the invention, a computer-implemented method is provided that can include receiving a request from a user to pick up a product at a first location, directing a robot configured to travel on roads, bike paths and sidewalks to pick up the product at the first location, navigating the robot over an outdoor transportation network that can include roads, bike paths and sidewalks from the first location to the second location, and causing the robot to deliver the product free of human assistance at the second location.

The navigating step can include accessing a virtual map to chart a course over the outdoor transportation network from the first location to the second location. The causing step can include causing the robot to place the product on the ground at the second location. The receiving step can include receiving from the user a specified location on the ground at the second location where the product should be delivered and the causing step can include causing the robot to place the product on the ground at the specified location. The causing step can include causing the robot to remove the product from within the robot for delivery to the second location. The robot can have a transport container for housing the product during transport and the causing step can include causing the robot to open the transport container and remove the product from the container for delivery to the second location. The robot can have a delivery mechanism for removing the product from within the robot for delivery to the second location. The causing step can include causing the robot to deliver the product to an interior of a recipient container at the second location. The causing step can include causing the robot to remove the product from within the robot, and the method can include placing the product in the recipient container. The recipient container can be associated with the user. The causing step can include causing the robot to deliver the product to an additional robot configured to travel on roads, bike paths and sidewalks at the second location, and the method can include navigating the additional robot over the outdoor transportation network from the second location to the third location and causing the additional robot to deliver the product free of human assistance at the third location. The additional robot can deliver the product to an interior of a recipient container at the third location. The causing step can include causing the robot to deliver the product to a recipient container at the second location, and the method can include directing an additional robot configured to travel on roads, bike paths and sidewalks to pick up the product free of human assistance from the recipient container at the second location, navigating the additional robot over the outdoor transportation network from the second location to the third location, and causing the additional robot to deliver the product free of human assistance at the third location. The method can include causing the robot to receive the product from a pickup container free of human assistance at the first location. The receiving step can include purchasing the product by the user. The method can include charging the user for delivering the product at the second location. The recipient container can have an interior and a door for accessing the interior and the causing step can include directing the door to open for permitting delivery of the product to the interior of the recipient container. The transport container can have an interior and an opening communicating with the interior of the transport container and the recipient container can have an interior and an opening communicating with the interior of the recipient container and the causing step can include causing the robot to align the opening of the transport container with the opening of the recipient container. The robot can have a first assembly for causing the transport container to translate in three orthogonal directions relative to the recipient container and a second assembly for causing the transport container to rotate about three orthogonal axes relative to the recipient container for permitting alignment of the opening of the transport container with the opening of the recipient container. The robot can have a delivery mechanism for removing the product from within the transport container for delivery to the recipient container.

In one aspect of the invention, a computer-implemented method is provided that can include receiving a request from a user to pick up an article at a first location, directing a robot configured to travel along roads, bike paths and sidewalks and having a transport container to receive the article within the transport container at the first location, navigating the robot over an outdoor transportation network that can include roads, bike paths and sidewalks from the first location to the second location, causing the robot to remove the article from the transport container and deliver the article to a recipient container at the second location and causing the recipient container to move the article inside the recipient container at the second location.

The robot can be a wheeled vehicle free of a human driver compartment. The robot can have a delivery mechanism inside the transport container for removing the article from the transport container for delivery to the second location. The delivery mechanism can be a conveyor mechanism. The robot can open the transport container. The robot can autonomously remove the article from the transport container and deliver the article to the recipient container. The causing the robot to deliver step can include causing the robot to deliver the article to an additional robot at the second location, the recipient container at the second location can be a transport container of the additional robot, and the method can include navigating the additional robot over the outdoor transportation network from the second location to a third location, causing the additional robot to deliver the article to an additional recipient container at the third location and causing the additional recipient container to move the article inside the additional recipient container. The method can include directing an additional robot having an additional transport container to receive the article within the additional transport container from the recipient container at the second location, navigating the additional robot over the outdoor transportation network from the second location to a third location, causing the additional robot to remove the article from the additional transport container and deliver the article to an additional recipient container at the third location and causing the additional recipient container to move the article inside the additional recipient container. The method can include causing the transport container of the robot to receive the article from a pickup container at the first location and causing the transport container to move the article inside the transport container at the first location. The pickup container can have a delivery mechanism for removing the article from the pickup container for delivery to the transport container of the robot. The receiving step can include purchasing the article by the user. The transport container can have an interior and an opening communicating with the interior of the transport container and the recipient container can have an interior and an opening communicating with the interior of the recipient container and the causing the robot to deliver step can include causing the robot to align the opening of the transport container with the opening of the recipient container. The robot can have a first assembly for causing the transport container to translate in three orthogonal directions relative to the recipient container and a second assembly for causing the transport container to rotate about three orthogonal axes relative to the recipient container for permitting alignment of the opening of the transport container with the opening of the recipient container. The recipient container can have an interior and a door for accessing the interior and the door can be directed to open for permitting the recipient container to move the article to the interior of the recipient container. The recipient container can be directed through the robot. The recipient container can be powered through the robot. The method can include directing the robot to autonomously translate the transport container in at least one of a vertical direction and a sideways direction and to autonomously pivot the transport container about at least one axis so as to align the transport container with the recipient container. The robot can be a driverless wheeled vehicle.

In one aspect of the invention, a computer-implemented method is provided that can include receiving a request from a user to pick up a product at a first location, causing a robot configured to travel on roads, bike paths and sidewalks to pick up the product free of human assistance at the first location, and navigating the robot over an outdoor transportation network that can include roads, bike paths and sidewalks from the first location to the second location.

The method can include causing the robot to deliver the product free of human assistance at the second location. The method can include charging the user for delivering the product at the second location. The causing step can include causing the robot to pick up the product from the ground at the first location. The causing step can include causing the robot to place the product inside the robot at the first location. The robot can have a transport container for housing the product during transport and the causing step can include causing the robot to open the transport container and place the product inside the transport container. The robot can have a receiving mechanism for placing the product inside the robot. The causing step can include causing the robot to retrieve the product from a pickup container at the second location. The robot can have a transport container for housing the product during transport and the causing step can include retrieving the product from the pickup container and placing the product in the transport container. The pickup container can have an interior and a door for accessing the interior and the causing step can include directing the door to open for permitting retrieval of the product from the interior of the pickup container. The transport container can have an interior and an opening communicating with the interior of the transport container and the pickup container can have an interior and an opening communicating with the interior of the pickup container and the causing step can include causing the robot to align the opening of the transport container with the opening of the pickup container. The robot can have a first assembly for causing the transport container to translate in three orthogonal directions relative to the pickup container and a second assembly for causing the transport container to rotate about three orthogonal axes relative to the pickup container for permitting alignment of the opening of the transport container with the opening of the pickup container. The receiving step can include purchasing the product by the user. The navigating step can include accessing a virtual map to chart a course over the outdoor transportation network from the first location to the second location.

In one aspect of the invention, a computer-implemented method is provided that can include receiving a request from a user to pick up an article at a first location, navigating a robot configured to travel on roads, bike paths and sidewalks and having a closeable transport container to the first location, causing the robot to open the closeable transport container and move the article inside the transport container at the first location and navigating the robot over an outdoor transportation network that can include roads, bike paths and sidewalks from the first location to the second location for delivering the article to the second location.

The method can include causing a pickup container at the first location to deliver the article from the pickup container to the transport container at the first location. The pickup container can have a transport mechanism for removing the article from the pickup container for delivery to the transport container at the first location. The transport mechanism can be inside the pickup container. The pickup container can be a closeable pickup container and the causing the pickup container step can include opening the pickup container. The transport container can have an interior and an opening communicating with the interior of the transport container and the pickup container can have an interior and an opening communicating with the interior of the pickup container, and the method can include causing the robot to align the opening of the transport container with the opening of the pickup container. The robot can have a first assembly for causing the transport container to translate in three orthogonal directions relative to the pickup container and a second assembly for causing the transport container to rotate about three orthogonal axes relative to the pickup container for permitting alignment of the opening of the transport container with the opening of the pickup container. The causing the robot step can include causing the robot to pick up the article from the ground at the first location. The transport container can have a transport mechanism for moving the article inside the transport container. The robot can be wheeled vehicle free of a human driver compartment. The receiving step can include purchasing the article by the user. The navigating step can include accessing a virtual map to chart a course over the outdoor transportation network from the first location to the second location.

In one aspect of the invention, a computer-implemented method is provided that can include receiving a request from a user to deliver an article from a first location to the second location, placing the article in a pickup container at the first location, navigating a robot configured to travel along roads, bike paths and sidewalks and having a transport container to the first location, autonomously moving the article from the pickup container to the transport container at the first location and additionally navigating the robot over an outdoor transportation network from the first location to the second location for delivering the article to the second location.

The pickup container can be a closeable pickup container and the transport container can be a closeable transport container and the autonomous moving step can include autonomously opening the closeable pickup container and autonomously opening the closeable transport container. The additionally navigating step can include autonomously navigating the robot over an outdoor transportation network from the first location to the second location. The robot can autonomously navigate to the first location. The robot can be a wheeled vehicle.

In one aspect of the invention, a system for delivering a product from a first location to a second location is provided that can include a robot configured to travel on roads, bike paths and sidewalks for transporting the product from the first location to the second location, the robot having a transport container for housing the product during transport, a recipient container at the second location for receiving the product at the second location, at least one computer configured to navigate the robot over an outdoor transportation network that can include roads, bike paths and sidewalks from the first location to the second location, the robot having a product transport mechanism controlled by the at least one computer for removing the product from the transport container and delivering the product to the recipient container.

The product transport mechanism can be at least partially disposed inside the transport container. The transport container can include a side door and a door opening assembly controlled by the at least one computer for opening and closing the side door. The door opening assembly can be disposed inside the transport container. The robot can include a plurality of transport containers and a plurality of respective product transport mechanisms. The recipient container can include a receiving transport mechanism controlled by the at least one computer for moving the product received from the robot inside the recipient container. The receiving transport mechanism can be at least partially disposed inside the recipient container. The recipient container can include a side door and a door opening assembly controlled by the at least one computer for opening and closing the side door. The door opening assembly can be disposed inside the recipient container. The recipient container can have an opening and the transport container can have an opening and the robot can include an orientation assembly for registering the opening in the transport container with the opening in the recipient assembly. The orientation assembly can include a first assembly for causing the transport container to translate in three orthogonal directions relative to the recipient container and a second assembly for causing the transport container to rotate about three orthogonal axes relative to the recipient container for permitting alignment of the opening of the transport container with the opening of the recipient container. The transport container can have at least one first electrical connector and the recipient container can have at least one second electrical connector for cooperatively engaging with the at least one first electrical connector to permit the transport container to provide power to the recipient container. The recipient container can be a transport container of an additional robot. The robot can have a pickup assembly that can be controlled by the at least one computer and can include the product transport mechanism for picking up the product free of human assistance at the first location. The system can include a pickup container at the first location, and the product transport mechanism can be configured to receive the product from the pickup container and move the product inside the transport container. The pickup container can include a delivering transport mechanism controlled by the at least one computer for removing the product from the pickup container and delivering the product to the transport container. The delivering transport mechanism can be at least partially disposed inside the pickup container. The pickup container can include a side door and a door opening assembly controlled by the at least one computer and disposed inside the pickup container for opening and closing the side door. The pickup container can be a transport container of an additional robot. The at least one computer can include a computer carried by the robot and a cloud-based computer. The at least one computer can include a smartphone configured for communication with the cloud-based computer.

In one aspect of the invention, a system for delivering an article from a first location to a second location is provided and can include a robot configured to travel on roads, bike paths and sidewalks for transporting the article from the first location to the second location, the robot having a closeable transport container for housing the article during transport, a closeable recipient container at the second location for receiving the article, at least one computer configured to navigate the robot over an outdoor transportation network that can include roads, bike paths and sidewalks from the first location to the second location, the robot having a robot article transport mechanism controlled by the at least one computer for removing the article from the transport container at the second location and the recipient container having a recipient article transport mechanism for moving the article inside the recipient container.

The first article transport mechanism can be at least partially disposed inside the transport container. The transport container can include a side door and a door opening assembly controlled by the at least one computer for opening and closing the side door. The door opening assembly can be disposed inside the transport container. The robot can include a plurality of transport containers and a plurality of respective robot article transport mechanisms. The recipient transport mechanism can be at least partially disposed inside the recipient container. The recipient container can include a side door and a door opening assembly controlled by the at least one computer for opening and closing the side door. The door opening assembly can be disposed inside the recipient container. The robot can be a driverless vehicle and the recipient container can have an opening and the transport container can have an opening and the driverless vehicle can include an orientation assembly for registering the opening in the transport container with the opening in the recipient assembly. The orientation assembly can include a first assembly for causing the transport container to translate in three orthogonal directions relative to the recipient container and a second assembly for causing the transport container to rotate about three orthogonal axes relative to the recipient container for permitting alignment of the opening of the transport container with the opening of the recipient container. The transport container can have a least one first electrical connector and the recipient container can have at least one second electrical connector for cooperatively engaging with the at least one first electrical connector to permit the transport container to provide power to the recipient container. The recipient container can be a transport container of an additional robot. The robot can have a pickup assembly that can be controlled by the at least one computer and can include the robot article transport mechanism for picking the article up off the ground free of human assistance at the first location. The system can include a pickup container at the first location, and the robot article transport mechanism can be configured to receive the article from the pickup container and move the article inside the transport container. The pickup container can include a pickup article transport mechanism controlled by the at least one computer for removing the article from the pickup container and delivering the article to the transport container. The pickup article transport mechanism can be at least partially disposed inside the pickup container. The pickup container can include a side door and a door opening assembly controlled by the at least one computer and disposed inside the pickup container for opening and closing the side door. The pickup container can be a transport container of an additional robot. The at least one computer can include a computer carried by the robot and a cloud-based computer. The at least one computer can include a smartphone configured for communication with the cloud-based computer.

In one aspect of the invention, a method for transporting a plurality of articles from a first location to a second location is provided that can include receiving a transportation container of a standardized size and shape for being carried within a transport container of any of a plurality of robots from a fleet of robots, each of the plurality of robots being configured to travel along roads, bike paths and sidewalks and being free of a human driver compartment, placing the plurality of articles in the transportation container, placing the transportation container in a pickup location at the first location, navigating a first robot from the fleet of robots to the first location, autonomously moving the transportation container from the pickup location to the transport container of the first robot at the first location, navigating the first robot over an outdoor transportation network that can include roads, bike paths and sidewalks from the first location to the second location, and autonomously moving the transportation container from the transport container to a recipient location at the second location.

The transportation container can be made from a material selected from the group consisting of cardboard, paperboard, fiberboard, plastic and metal. The transportation container can have the shape of a parallelepiped. The transportation container can have four interconnected side walls joined to a bottom wall. The transportation container can be free of a top. The step of autonomously moving the transportation container from the pickup location to the transport container can include autonomously picking the transportation container up off the ground at the first location. The pickup location can be inside a pickup container and wherein the step of autonomously moving the transportation container from the pickup location to the transport container can include autonomously moving the transportation container from the pickup container to the transport container. The transportation container can be autonomously placed on the ground at the second location. The recipient location can be inside a recipient container and the transportation container can be autonomously moved from the transport container to the recipient container. The transport container can be a closeable transport container and each autonomous moving step can include autonomously opening the transport container. The transport container can have a transport mechanism for moving the transportation container into and out from the transport container. The method can include receiving payment for the purchase of the plurality of articles.

In one aspect of the invention, a method for transporting a plurality of articles from a first location to a second location is provided that can include receiving an open transportation container of a standardized size and shape for being carried within a transport container of any of a plurality of robots from a fleet of robots, each of the plurality of robots being configured to travel along roads, bike paths and sidewalks and being free of a human driver compartment, placing the plurality of articles in the transportation container, placing the transportation container in a pickup container at the first location, navigating a first robot from the fleet of robots to the first location, autonomously moving the transportation container from the pickup container to the transport container of the first robot at the first location, navigating the first robot over an outdoor transportation network that can include roads, bike paths and sidewalks from the first location to the second location, and autonomously moving the transportation container from the transport container to a recipient container at the second location.

The recipient container can be a closeable recipient container and the recipient container can be autonomously opened. The method can include removing the plurality of articles from the open transportation container. The method can include receiving the open transportation container at a third location, placing a second plurality of articles in the transportation container at the third location, placing the transportation container in a pickup container at the third location, navigating a second robot from the fleet of robots to the third location, autonomously moving the transportation container from the pickup container to the transport container of the second robot at the third location, navigating the second robot over the outdoor transportation network from the third location to a fourth location, and autonomously moving the transportation container from the transport container of the second robot to a recipient container at the fourth location. The method can include removing the plurality of articles from the open transportation container at the fourth location. The method can include placing an additional article in the transportation container at the second location, placing the transportation container in recipient pickup container at the second location, navigating a second robot from the fleet of robots to the second location, autonomously moving the transportation container from the pickup container at the second location to the transport container of the second robot, navigating the second robot over the outdoor transportation network from the second location to a third location, and autonomously moving the transportation container from the transport container of the second robot to a recipient container at the third location. The removing step can include removing the plurality of articles from the open transportation container to create an empty transportation container, placing the empty transportation container in the recipient container at the second location, navigating a second robot from the fleet of robots to the second location, autonomously moving the empty transportation container from the recipient container to the transport container of the second robot at the second location, navigating the second robot over the outdoor transportation network from the second location to a third location, and removing the empty transportation container from the transport container of the second robot at the third location for later reuse. The removing step can include autonomously removing the empty transportation container from the transport container of the second robot at the third location.

In one aspect of the invention, a computer-implemented method is provided that can include receiving a request from a buyer to purchase a product, the request including the location of the buyer, directing the request to a plurality of vendors within a predetermined distance from the buyer for bidding, receiving a price quote from each of the plurality of vendors for the product, permitting the buyer to purchase the product from one of the plurality of vendors, and directing a robot configured to travel on roads, bike paths and sidewalks to pick up the product at a first location associated with the selected one of the plurality of vendors.

The price quote can include an indicator of the distance of each of the plurality of vendors from the location of the buyer. The step of receiving a price quote can include receiving a confirmation from each of the plurality of vendors that the product is in stock. The indicator of the distance of each of the plurality of vendors from the location of the buyer can be selected from the group consisting of the location of each of the plurality of vendors and the distance of each of the plurality of vendors from the location of the buyer. The step of directing the robot can include causing the robot to pick up the product free of human assistance at the first location. The method can include navigating the robot over an outdoor transportation network that can include roads, bike paths and sidewalks from the first location to a second location associated with the buyer. The method can include causing the robot to deliver the product free of human assistance at the second location. The method can include charging the buyer for delivering the product at the second location. The charge to the buyer can be altered or increased as a function of demand for the product.

In one aspect of the invention, a computer-implemented method for delivering a purchased product with a robot is provided that can include receiving a request from a buyer to purchase a product, directing the request to a plurality of vendors of the product, receiving a response from each of the plurality of vendors for the product, each response including at least the price of the product, evaluating each response against a plurality of features of each of the plurality of vendors, selecting the response from one of the plurality of vendors as a function of the evaluating step and directing the robot to pick up the product from the one of the plurality of vendors of the selected response.

The evaluating step can include evaluating each response against a plurality of features of the respective vendor using a ranking regression method to provide an aggregate value for each of the respective vendors. The selecting step can include selecting the response from one of the plurality of vendors as a function of the aggregate value for each of the plurality of vendors. The selecting step can include selecting the response from the one of the plurality of vendors selected from the group consisting of vendor with the highest aggregate value and the vendor with the lowest aggregate value. The ranking regression method can include assigning a numerical value to each of the plurality of features of the respective vendor, the aggregate value for the respective vendor being a function of the numerical value of each of the features of the respective vendor. The aggregate value for the respective vendor can be the sum of the numerical values of each of the plurality of features of the respective vendor. The numerical value can be a cost-based value. The ranking regression method can include training a neural network with a set of example vendors to provide a trained neural network and assigning a numerical value to each of the plurality of features of the respective vendor, the aggregate value for the respective vendor being computed by applying the trained neural network to the plurality of features of the vendor. The ranking regression method can include training a kernel method with a set of example vendors to provide a plurality of support vectors and a weight for each of the plurality of support vectors and assigning a numerical value to each of the plurality of features of the respective vendor, the aggregate value for the respective vendor being computed by applying the plurality of support vectors and the weights to the plurality of features of the vendor. The ranking regression method can include training a decision tree with a set of example vendors to provide a trained decision tree and assigning a numerical value for each of the plurality of features, the aggregate value for the respective vendor being computed by applying the trained decision tree to the plurality of features of the vendor. The plurality of features are selected from the group consisting of the price of the product, the speed of the response from the vendor, a confirmation from the vendor that the product is in stock, the distance from the product of the vendor to the buyer, an estimate of the travel time between the product of the vendor and the buyer, an estimate of the delivery time of the product to the buyer, the brand of the product of the vendor, the rating of the vendor from previous buyers, the name of the vendor, the time to pick up the product of the vendor by the robot, any combination of the foregoing and all of the foregoing.

In one aspect of the invention, a computer-implemented method for delivering a purchased product with one of a plurality of robots from a fleet of robots is provided that can include receiving a request from a buyer to purchase a product, directing the request to at least one vendor of the product, receiving a response from the vendor, evaluating a plurality of the robots for picking up the product against a plurality of features of the plurality of robots, selecting one of the plurality of robots as a function of the evaluating step and directing the selected one of the plurality of a robot to pick up the product from the vendor.

The evaluating step can include evaluating a plurality of the robots for picking up the product against a plurality of features of the plurality of robots using a ranking regression method to provide an aggregate value for each of the respective robots. The selecting step can include selecting one of the plurality of robots as a function of the aggregate value for each of the plurality of robots. The ranking regression method can include a step selected from the group consisting of training a neural network, training a kernel method and training a decision tree. The plurality of features are selected from the group consisting of the distance of a robot from the product of the vendor, the load capacity of the robot, the remaining battery life of the robot, the estimated travel time of the robot to the product of the vendor, any combination of the foregoing and all of the foregoing.

In one aspect of the invention, a computer-implemented method is provided that includes receiving a request from a buyer to purchase a product, directing the request to a plurality of vendors of the product, receiving a reply from each of the plurality of vendors for the product, providing the buyer with a response that can include with respect to each of the plurality of vendors the price of the product of the vendor and at least one product purchase factor selected from the group consisting of the distance of the product of the vendor from the buyer, an estimate of travel time between the product of the vendor and the buyer, an estimate of the delivery time of the product to the buyer, the speed of the response from the vendor, a confirmation from the vendor that the product is in stock, a consumer rating of the vendor, the name of the vendor, the brand of the product and the time to pick up the product of the vendor by a robot, permitting the buyer to select one of the plurality of vendors as a function of the price of the product and the at least one product purchase factor and purchase the product from the selected one of the plurality of vendors, and directing the robot to pick up the product from the selected one of the plurality of vendors.

The response can include at least two product purchase factors selected from the group consisting of the distance of the product of the vendor from the buyer, an estimate of travel time between the product of the vendor and the buyer, an estimate of the delivery time of the product to the buyer, the speed of the response from the vendor, a confirmation from the vendor that the product is in stock, a consumer rating of the vendor, the name of the vendor, the brand of the product and the time to pick up the product of the vendor by a robot and the permitting step can include permitting the buyer to select one of the plurality of vendors as a function of the price of the product and the at least two product purchase factors. The response can include at least three product purchase factors selected from the group consisting of the distance of the product of the vendor from the buyer, an estimate of travel time between the product of the vendor and the buyer, an estimate of the delivery time of the product to the buyer, the speed of the response from the vendor, a confirmation from the vendor that the product is in stock, a consumer rating of the vendor, the name of the vendor, the brand of the product and the time to pick up the product of the vendor by a robot and the permitting step can include permitting the buyer to select one of the plurality of vendors as a function of the price of the product and the at least three product purchase factors. The method can include charging the buyer for the product. The method can include altering the price of the product to the buyer as a function of the demand for the product.

In one aspect of the invention, a computer-implemented method is provided that can include receiving a request from a user to deliver a product from a first location to a second location, the request including a photo of the second location and an indicator on the photo identifying a precise drop off location for the product, directing at least one robot to pick up the product at the first location, navigating the at least one robot over an outdoor transportation network from the first location to the second location, and causing the at least one robot to deliver the product to the drop off location.

The at least one robot can be configured to travel on roads, bike paths and sidewalks and the outdoor transportation network can include roads, bike paths and sidewalks. The navigating step can include accessing a virtual map to chart a course over the outdoor transportation network from the first location to the second location. The navigating step can include comparing terrain at the second location observed by the at least one robot with the photo to enable the at least one robot to deliver the product to the drop off location. The at least one robot can have at least one camera for observing terrain at the second location. The causing step can include causing the at least one robot to place the product on the ground at the drop off location. The causing step can include causing the at least one robot to remove the product from within the at least one robot for delivery to the drop off location. The at least one robot can have a transport container for housing the product during transport and the causing step can include causing the at least one robot to open the transport container and remove the product from the container for delivery to the drop off location. The method can include causing the at least one robot to receive the product from a pickup container free of human assistance at the first location. The receiving step can include purchasing the product by the user. The method can include charging the user for delivering the product to the drop off location. The directing step can include directing a first robot to pick up the product at the first location, the navigating step can include navigating the first robot over an outdoor transportation network from the first location to an intermediate location, causing the first robot to deliver the product free of human assistance to the intermediate location, causing a second robot to pick up the product free of human assistance at the intermediate location and navigating the second robot over the outdoor transportation network from the intermediate location to the second location, and the second robot can deliver the product to the drop off location.

In one aspect of the invention, a non-transitory computer-readable storage medium is provided that can store computer-executable instructions to, display a photograph on a display, permit a user to touch the photograph on the display to identify a location on the photograph and request a third party to deliver a product to the location identified on the photograph.

The computer-executable instructions can be configured to purchase the product from the third party. The computer-executable instructions can be configured to operate on a smartphone and receive the photograph from a camera on the smartphone.

In one aspect of the invention, a computer-implemented method is provided that can include receiving a request from a user to deliver an article from a first location to a second location, the request including an image of the second location and an indicator on the image identifying a precise delivery location for the article, providing a three-dimensional virtual model that can include the second location, registering the indicator on the image to a precise location on the three-dimensional virtual model to obtain a three-dimensional delivery location, directing at least one robot to pick up the article at the first location, navigating the at least one robot over an outdoor transportation network from the first location to the second location, and causing the at least one robot to deliver the article free of human assistance to the three-dimensional delivery location.

The three-dimensional delivery location can include three-dimensional coordinates of the delivery location. The registering step can include registering the image to the three-dimensional virtual model. The request can include a plurality of images, further comprising utilizing the plurality of images in the creation of the three-dimensional virtual model. The plurality of images are a plurality of photographs. The plurality of images can include a video. The method can include obtaining a plurality of depth sensor signals of the second location and utilizing the plurality of depth sensor signals in the creation of the three-dimensional virtual model. The request can include the plurality of depth sensor signals. The image can be a photograph. The request can include a three-dimensional orientation associated with the image. The method can include touching a computer screen displaying the image to create the indicator on the image identifying the precise delivery location.

In one aspect of the invention, a computer-implemented method is provided that can include receiving a request from a user to deliver an article from a first location to a second location, the request including a three-dimensional delivery location for the article, directing at least one robot to pick up the article at the first location, navigating the at least one robot over an outdoor transportation network from the first location to the second location, and causing the at least one robot to deliver the article free of human assistance to the three-dimensional delivery location.

The method can include providing a three-dimensional virtual model that can include the second location to the user and indicating on the three-dimensional model the three-dimensional delivery location. The indicating step can include touching a computer screen displaying the three-dimensional virtual model to indicate the three-dimensional delivery location on the three-dimensional virtual model. The method can include utilizing a plurality of images of the second location provided by the user in the creation of the three-dimensional virtual model. The method can include utilizing a plurality of depth sensor signals provided by the user in the creation of the three-dimensional virtual model. The three-dimensional delivery location can include three-dimensional coordinates of the delivery location.

In one aspect of the invention, a non-transitory computer-readable storage medium is provided that can store computer-executable instructions useable by a mobile computing device having a display to, permit a user of the device to display a three-dimensional virtual model on the display, permit the user to touch the displayed three-dimensional virtual model to identify a three-dimensional delivery location of an article and request a third party to deliver an article to the three-dimensional delivery location.

The computer-executable instructions can permit the user to purchase the article from the third party. The mobile computing device can be selected from the group consisting of a smartphone, a tablet, a notebook, a laptop, a watch, a mobile computer and a smart wearable item with a camera. The computer-executable instructions can permit the user to scan a location with a sensor of the device to produce the three-dimensional virtual model. The sensor of the device can be a camera.

The foregoing methods of the invention do not require all of the steps disclosed or discussed herein. Methods of the invention can be provided that include less than all or some of the steps disclosed herein or other or additional steps not disclosed herein. Steps of such methods need not be performed in the order disclosed herein, but instead can be performed in any other or suitable order. Steps of one method of the invention can be mixed or added to steps of other methods of the invention.

I claim:

1. A system for delivering an article from a first location to a second location, comprising a robot configured to navigate an outdoor transportation network for transporting the article from the first location to the second location, the robot having a closeable transport container for housing the article during transport, a closeable recipient container at the second location for receiving the article, at least one computer in the system configured to navigate the robot over the outdoor transportation network from the first location to the second location, the robot having a robot article transport mechanism controlled by the at least one computer for removing the article from the transport container at the second location and the recipient container having a recipient article transport mechanism for moving the article inside the recipient container.

2. The system of claim 1, wherein the robot article transport mechanism is at least partially disposed inside the transport container.

3. The system of claim 1, wherein the transport container includes a side door and a door opening assembly controlled by the at least one computer for opening and closing the side door.

4. The system of claim 3, wherein the door opening assembly is disposed inside the transport container.

5. The system of claim 1, wherein the robot includes a plurality of transport containers and a plurality of respective robot article transport mechanisms.

6. The system of claim 1, wherein the recipient transport mechanism is at least partially disposed inside the recipient container.

7. The system of claim 6, wherein the recipient container includes a side door and a door opening assembly controlled by the at least one computer for opening and closing the side door.

8. The system of claim 7, wherein the door opening assembly is disposed inside the recipient container.

9. The system of claim 1, wherein the robot is a driverless vehicle and the recipient container has an opening and the transport container has an opening and the driverless vehicle includes an orientation assembly for registering the opening in the transport container with the opening in the recipient assembly.

10. The system of claim 9, wherein the orientation assembly includes a first assembly for causing the transport container to translate in three orthogonal directions relative to the recipient container and a second assembly for causing the transport container to rotate about three orthogonal axes relative to the recipient container for permitting alignment of the opening of the transport container with the opening of the recipient container.

11. The system of claim 9, wherein the transport container has a least one first electrical connector and the recipient container has at least one second electrical connector for cooperatively engaging with the at least one first electrical connector to permit the transport container to provide power to the recipient container.

12. The system of claim 1, wherein the recipient container is a transport container of an additional robot.

13. The system of claim 1, wherein the robot has a pickup assembly that is controlled by the at least one computer and includes the robot article transport mechanism for picking the article up off the ground free of human assistance at the first location.

14. The system of claim 1, further comprising a pickup container at the first location, wherein the robot article transport mechanism is configured to receive the article from the pickup container and move the article inside the transport container.

15. The system of claim 14, wherein the pickup container includes a pickup article transport mechanism controlled by the at least one computer for removing the article from the pickup container and delivering the article to the transport container.

16. The system of claim 15, wherein the pickup article transport mechanism is at least partially disposed inside the pickup container.

17. The system of claim 16, wherein the pickup container includes a side door and a door opening assembly controlled by the at least one computer and disposed inside the pickup container for opening and closing the side door.

18. The system of claim 14, wherein the pickup container is a transport container of an additional robot.

19. The system of claim 1, wherein the at least one computer includes a computer carried by the robot and a cloud-based computer.

20. The system of claim 19, wherein the at least one computer includes a smartphone configured for communication with the cloud-based computer.

21. A system for delivering an article from a first location to a second location, comprising a robot configured to navigate an outdoor transportation network for transporting the article from the first location to the second location, the robot having a closeable transport container for housing the article during transport, a closeable recipient container at the second location for receiving the article, at least one computer in the system configured to navigate the robot over the outdoor transportation network from the first location to the second location, the robot having a robot article transport mechanism controlled by the at least one computer for removing the article from the transport container at the second location and the recipient container having a recipient article transport mechanism controlled by the at least one computer for moving the article inside the recipient container.

22. The system of claim 21, wherein the robot article transport mechanism is fully disposed inside the transport container.

23. The system of claim 21, wherein the recipient transport mechanism is fully disposed inside the recipient container.

* * * * *